United States Patent
Smits

(10) Patent No.: US 10,325,376 B2
(45) Date of Patent: Jun. 18, 2019

(54) MACHINE VISION FOR EGO-MOTION, SEGMENTING, AND CLASSIFYING OBJECTS

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 16/223,043

(22) Filed: Dec. 17, 2018

(65) Prior Publication Data

US 2019/0147599 A1 May 16, 2019

Related U.S. Application Data

(63) Continuation of application No. 16/049,380, filed on Jul. 30, 2018, now Pat. No. 10,157,469, which is a
(Continued)

(51) Int. Cl.
*G06T 7/20* (2017.01)
*H04N 5/235* (2006.01)
(Continued)

(52) U.S. Cl.
CPC .................. *G06T 7/20* (2013.01); *G01P 3/36* (2013.01); *H04N 5/04* (2013.01); *H04N 5/2256* (2013.01);
(Continued)

(58) Field of Classification Search
CPC .......... G06T 7/20; H04N 5/2351; H04N 5/04; H04N 5/2256; H04N 13/0253; G01P 3/36
See application file for complete search history.

(56) References Cited

U.S. PATENT DOCUMENTS

| 4,019,262 A | 4/1977 | Breglia et al. |
| 4,340,274 A | 7/1982 | Spooner |

(Continued)

FOREIGN PATENT DOCUMENTS

| EP | 0722109 A1 | 7/1996 |
| JP | 11119184 A | 4/1999 |

(Continued)

OTHER PUBLICATIONS

Office Communication for U.S. Appl. No. 15/194,502 dated Jan. 3, 2019, pp. 1-15.
(Continued)

*Primary Examiner* — Carol Wang
(74) *Attorney, Agent, or Firm* — John W. Branch; Lowe Graham Jones PLLC

(57) ABSTRACT

Systems and methods for machine vision are presented. Such machine vision includes ego-motion, as well as the segmentation and/or classification of image data of one or more targets of interest. The projection and detection of scanning light beams that generate a pattern are employed. Real-time continuous and accurate spatial-temporal 3D sensing is achieved. The relative motion between an observer and a projection surface is determined. A combination of visible and non-visible patterns, as well as a combination of visible and non-visible sensor arrays is employed to sense 3D coordinates of target features, as well as acquire color image data to generate 3D color images of targets. Stereoscopic pairs of cameras are employed to generate 3D image data. Such cameras are dynamically aligned and calibrated. Information may be encoded in the transmitted patterns. The information is decoded upon detection of the pattern and employed to determine features of the reflecting surface.

17 Claims, 43 Drawing Sheets

Related U.S. Application Data continuation of application No. 15/098,285, filed on Apr. 13, 2016, now Pat. No. 10,043,282.

(60) Provisional application No. 62/285,373, filed on Oct. 26, 2015, provisional application No. 62/178,597, filed on Apr. 13, 2015.

(51) Int. Cl.
    *H04N 5/04*     (2006.01)
    *G01P 3/36*     (2006.01)
    *H04N 5/225*     (2006.01)
    *H04N 13/254*     (2018.01)

(52) U.S. Cl.
    CPC ......... *H04N 5/2351* (2013.01); *H04N 13/254* (2018.05)

(56) References Cited

U.S. PATENT DOCUMENTS

| | | | |
|---|---|---|---|
| 4,820,041 A | 4/1989 | Davidson et al. | |
| 4,988,187 A * | 1/1991 | Kuriyama | G02B 7/28 353/101 |
| 5,052,820 A | 10/1991 | McGinniss et al. | |
| 5,107,122 A | 4/1992 | Barkan et al. | |
| 5,115,230 A | 5/1992 | Smoot | |
| 5,218,427 A | 6/1993 | Koch | |
| 5,455,588 A | 10/1995 | Lew et al. | |
| 5,506,682 A | 4/1996 | Pryor | |
| 5,521,722 A | 5/1996 | Colvill et al. | |
| 5,559,322 A | 9/1996 | Jacoby et al. | |
| 5,572,251 A | 11/1996 | Ogawa | |
| 5,580,140 A | 12/1996 | Katz et al. | |
| 5,661,506 A | 8/1997 | Lazzouni et al. | |
| 5,812,664 A | 9/1998 | Bernobich et al. | |
| 5,914,783 A | 6/1999 | Barrus | |
| 5,930,378 A | 7/1999 | Kubota et al. | |
| 6,115,022 A | 9/2000 | Mayer, III et al. | |
| 6,195,446 B1 | 2/2001 | Skoog | |
| 6,307,526 B1 | 10/2001 | Mann | |
| 6,404,416 B1 | 6/2002 | Kahn et al. | |
| 6,545,670 B1 | 4/2003 | Pryor | |
| 6,670,603 B2 | 12/2003 | Shimada et al. | |
| 6,704,000 B2 | 3/2004 | Carpenter | |
| 6,710,767 B1 | 3/2004 | Hasegawa et al. | |
| 6,766,066 B2 | 7/2004 | Kitazawa | |
| 6,982,683 B2 | 1/2006 | Stanton | |
| 7,119,965 B1 | 10/2006 | Rolland et al. | |
| 7,144,117 B2 | 12/2006 | Kojima | |
| 7,182,465 B2 | 2/2007 | Fuchs et al. | |
| 7,232,229 B2 | 6/2007 | Peeters et al. | |
| 7,262,765 B2 | 8/2007 | Brown et al. | |
| 7,289,110 B2 | 10/2007 | Hansson | |
| 7,303,289 B2 | 12/2007 | Fujiwara | |
| 7,511,847 B2 | 3/2009 | Silverbrook et al. | |
| 7,554,652 B1 | 7/2009 | Babin et al. | |
| 7,787,134 B2 | 8/2010 | Kohnen et al. | |
| 7,911,444 B2 | 3/2011 | Yee | |
| 8,115,728 B2 * | 2/2012 | Feng | G09G 3/342 345/102 |
| 8,170,329 B2 | 5/2012 | Seko et al. | |
| 8,282,222 B2 | 10/2012 | Smits | |
| 8,297,758 B2 | 10/2012 | Choi et al. | |
| 8,430,512 B2 | 4/2013 | Smits | |
| 8,493,573 B2 | 7/2013 | Chinn et al. | |
| 8,573,783 B2 | 11/2013 | Smits | |
| 8,696,141 B2 | 4/2014 | Smits | |
| 8,711,370 B1 | 4/2014 | Smits | |
| 8,773,512 B1 | 7/2014 | Rafii | |
| 8,957,847 B1 | 2/2015 | Karakotsios et al. | |
| 8,994,780 B2 | 3/2015 | Moore | |
| 9,151,607 B2 | 10/2015 | Davies et al. | |
| 9,813,673 B2 | 11/2017 | Smits | |
| 2001/0043165 A1 | 11/2001 | Stanton | |
| 2002/0036765 A1 | 3/2002 | McCaffrey et al. | |
| 2002/0039138 A1 | 4/2002 | Edelson et al. | |
| 2002/0040971 A1 | 4/2002 | Ono | |
| 2002/0067466 A1 | 6/2002 | Covannon et al. | |
| 2002/0100884 A1 | 8/2002 | Maddock | |
| 2002/0145588 A1 | 10/2002 | McCahon et al. | |
| 2002/0149694 A1 | 10/2002 | Seo | |
| 2003/0010888 A1 | 1/2003 | Shimada et al. | |
| 2003/0045034 A1 | 3/2003 | Davis et al. | |
| 2003/0156260 A1 | 8/2003 | Putilin et al. | |
| 2003/0202234 A1 | 10/2003 | Taylor et al. | |
| 2003/0202679 A1 | 10/2003 | Rodriguez | |
| 2003/0214710 A1 | 11/2003 | Takahashi et al. | |
| 2003/0222849 A1 | 12/2003 | Starkweather | |
| 2004/0006424 A1 | 1/2004 | Joyce et al. | |
| 2004/0054359 A1 | 3/2004 | Ruiz et al. | |
| 2004/0114834 A1 | 6/2004 | Fisher | |
| 2004/0218155 A1 | 11/2004 | Schenk et al. | |
| 2005/0035943 A1 | 2/2005 | Kojima | |
| 2005/0052635 A1 | 3/2005 | Xie et al. | |
| 2005/0083248 A1 | 4/2005 | Biocca et al. | |
| 2005/0099664 A1 | 5/2005 | Yamaoka | |
| 2005/0159893 A1 | 7/2005 | Isaji et al. | |
| 2005/0195387 A1 | 9/2005 | Zhang et al. | |
| 2005/0219530 A1 | 10/2005 | Horibe et al. | |
| 2005/0273830 A1 | 12/2005 | Silver et al. | |
| 2006/0028374 A1 | 2/2006 | Fullerton | |
| 2006/0028622 A1 | 2/2006 | Nojima et al. | |
| 2006/0132447 A1 | 6/2006 | Conrad | |
| 2006/0132472 A1 | 6/2006 | Peeters et al. | |
| 2006/0132729 A1 | 6/2006 | Engle | |
| 2006/0197936 A1 | 9/2006 | Liebman | |
| 2006/0256133 A1 | 11/2006 | Rosenberg | |
| 2007/0046625 A1 | 3/2007 | Yee | |
| 2007/0053679 A1 | 3/2007 | Beniyama et al. | |
| 2007/0064242 A1 | 3/2007 | Childers | |
| 2007/0138371 A1 | 6/2007 | Marshall | |
| 2007/0182949 A1 | 8/2007 | Niclass | |
| 2007/0273610 A1 | 11/2007 | Baillot | |
| 2008/0018591 A1 | 1/2008 | Pittel et al. | |
| 2008/0266169 A1 | 10/2008 | Akita | |
| 2008/0291213 A1 | 11/2008 | Bhogal | |
| 2008/0316026 A1 | 12/2008 | Yenisch et al. | |
| 2008/0317077 A1 | 12/2008 | Hoving et al. | |
| 2009/0096994 A1 | 4/2009 | Smits | |
| 2009/0147239 A1 | 6/2009 | Zhu et al. | |
| 2009/0285590 A1 | 11/2009 | Orsley | |
| 2010/0002154 A1 | 1/2010 | Hua | |
| 2010/0008588 A1 * | 1/2010 | Feldkhun | G01B 11/2518 382/206 |
| 2010/0045967 A1 | 2/2010 | Moir | |
| 2010/0142856 A1 | 6/2010 | Takeuchi et al. | |
| 2010/0149518 A1 | 6/2010 | Nordenfelt et al. | |
| 2011/0001793 A1 | 1/2011 | Moriyama et al. | |
| 2011/0123113 A1 * | 5/2011 | Berretty | G06T 5/005 382/173 |
| 2011/0211243 A1 | 9/2011 | Smits | |
| 2011/0249157 A1 | 10/2011 | Fredembach et al. | |
| 2011/0304842 A1 | 12/2011 | Kao et al. | |
| 2012/0017147 A1 | 1/2012 | Mark | |
| 2012/0132713 A1 | 5/2012 | Chaum | |
| 2012/0134537 A1 | 5/2012 | Yoon et al. | |
| 2012/0140231 A1 | 6/2012 | Knox et al. | |
| 2012/0187296 A1 | 7/2012 | Hollander et al. | |
| 2012/0224019 A1 | 9/2012 | Samadani et al. | |
| 2012/0250152 A1 | 10/2012 | Larson et al. | |
| 2012/0274937 A1 | 11/2012 | Hays et al. | |
| 2012/0320013 A1 | 12/2012 | Perez et al. | |
| 2013/0003081 A1 | 1/2013 | Smits | |
| 2013/0021271 A1 | 1/2013 | Guo | |
| 2013/0079983 A1 | 3/2013 | Ehilgen et al. | |
| 2013/0088465 A1 | 4/2013 | Geller et al. | |
| 2013/0170006 A1 | 7/2013 | Kurashige et al. | |
| 2013/0176561 A1 | 7/2013 | Hidaka | |
| 2013/0215487 A1 | 8/2013 | Konuma et al. | |
| 2013/0229669 A1 | 9/2013 | Smits | |
| 2013/0239057 A1 | 9/2013 | Ubillos et al. | |
| 2013/0300637 A1 | 11/2013 | Smits et al. | |
| 2013/0300670 A1 | 11/2013 | Besperstov et al. | |

(56) References Cited

U.S. PATENT DOCUMENTS

| | | |
|---|---|---|
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0285818 A1 | 9/2014 | Holz |
| 2014/0307248 A1 | 10/2014 | Giger et al. |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0225783 A1 | 8/2015 | Mears et al. |
| 2015/0233703 A1 | 8/2015 | Martini et al. |
| 2015/0279114 A1 | 10/2015 | Yonekubo |
| 2015/0286293 A1 | 10/2015 | Gruhlke et al. |
| 2016/0011312 A1 | 1/2016 | Leyva |
| 2016/0014403 A1 | 1/2016 | Stroetmann |
| 2016/0041266 A1 | 2/2016 | Smits |
| 2016/0050345 A1 | 2/2016 | Longbotham et al. |
| 2016/0306044 A1 | 10/2016 | Smits |
| 2016/0335778 A1 | 11/2016 | Smits |
| 2017/0131090 A1 | 5/2017 | Bronstein et al. |
| 2018/0039852 A1 | 2/2018 | Nakumura et al. |

FOREIGN PATENT DOCUMENTS

| | | |
|---|---|---|
| JP | 2001045381 A | 2/2001 |
| JP | 2003029201 A | 1/2003 |
| JP | 2004132914 A | 4/2004 |
| JP | 2005519338 A | 6/2005 |
| JP | 2011197674 A | 10/2011 |
| JP | 2013097138 A | 5/2013 |
| KR | 10-2011-0115752 A | 10/2011 |
| KR | 101665938 B1 | 10/2016 |
| WO | 1992/18971 A1 | 10/1992 |
| WO | 2000/034818 A1 | 6/2000 |
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |
| WO | 2014141115 A2 | 9/2014 |
| WO | 2016033036 A2 | 3/2016 |

OTHER PUBLICATIONS

Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Savage, P., "GDC 2013: Valv's Michael Abrash on the challenges of VR—'a new world is emerging'," PCGamer, Apr. 2013, pp. 1-6.
European Search Report for European Patent Application No. 08837063.0 dated Nov. 19, 2010, pp. 1-8.
Communication Pursuant to Article 94(3) EPC in European Patent Application No. 08837063.0 dated Dec. 27, 2011, pp. 1-5.
Communication Pursuant to Article 94(3) EPC in European Patent Application No. 08837063.0 dated Oct. 22, 2012, pp. 1-6.
International Search Report and Written Opinion in International Patent Application No. PCT/US2008/079663 dated Apr. 30, 2009, pp. 1-5.
International Search Report and Written Opinion in International Patent Application No. PCT/US2011/026691 dated Oct. 24, 2011, pp. 1-7.
International Search Report in International Patent Application No. PCT/US2011/054751 dated Jan. 30, 2012, pp. 1.
International Preliminary Report on Patentability in International Patent Application No. PCT/US2008/079663 dated Jan. 25, 2010, pp. 1-11.
International Preliminary Report on Patentability issued in PCT/US2011/026691 dated Sep. 4, 2012, pp. 1-7.
International Preliminary Report on Patentability issued in PCT/US2011/054751 dated Apr. 9, 2013, pp. 1-7.
Official Communication for U.S. Appl. No. 12/249,899 dated Sep. 14, 2011, pp. 1-11.
Official Communication for U.S. Appl. No. 12/249,899 dated Mar. 13, 2012, pp. 1-12.
Official Communication for U.S. Appl. No. 12/249,899 dated Jun. 6, 2012, pp. 1-12.
Official Communication for U.S. Appl. No. 13/037,949 dated Nov. 2, 2012, pp. 1-12.
Official Communication for U.S. Appl. No. 13/037,949 dated Aug. 26, 2013, pp. 1-9.
Official Communication for U.S. Appl. No. 13/605,948 dated Dec. 31, 2012, pp. 1-10.
Official Communication for U.S. Appl. No. 13/858,762 dated Sep. 13, 2013, pp. 1-16.
Official Communication for U.S. Appl. No. 13/877,652 dated Mar. 12, 2015, pp. 1-20.
Official Communication for U.S. Appl. No. 14/046,374 dated Feb. 20, 2014, pp. 1-10.
European Supplementary Search Report for European Patent Application No. 11834848.1 dated Feb. 21, 2014, pp. 1-7.
Official Communication for U.S. Appl. No. 13/858,762 dated Jan. 31, 2014, pp. 1-15.
Official Communication for U.S. Appl. No. 14/048,954 dated Feb. 26, 2014, pp. 1-24.
Official Communication for U.S. Appl. No. 14/048,954 dated Oct. 22, 2014, pp. 1-8.
International Search Report and Written Opinion for application PCT/US2015/023184 dated Jun. 29, 2015, pp. 1-13.
Official Communication for U.S. Appl. No. 13/877,652 dated Aug. 18, 2015, pp. 1-21.
Official Communication for U.S. Appl. No. 14/636,062 dated Sep. 25, 2015, pp. 1-8.
Official Communication for U.S. Appl. No. 14/671,904 dated Sep. 22, 2015, pp. 1-15.
Official Communication for U.S. Appl. No. 14/636,062 dated Jun. 2, 2015, pp. 1-7.
International Search Report and Written Opinion for PCT/US2015/044691 dated Nov. 18, 2015, pp. 1-12.
Official Communication for U.S. Appl. No. 14/823,668 dated Oct. 30, 2015, pp. 1-12.
Official Communication for U.S. Appl. No. 14/636,062 dated Dec. 14, 2015, pp. 1-3.
Official Communication for U.S. Appl. No. 14/823,668 dated Feb. 24, 2016, pp. 1-15.
Official Communication for U.S. Appl. No. 14/671,904 dated Feb. 22, 2016, pp. 1-13.
Official Communication for U.S. Appl. No. 13/877,652 dated Feb. 10, 2016, pp. 1-22.
Official Communication for U.S. Appl. No. 14/636,062 dated Feb. 1, 2016, pp. 1-9.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, pp. 1-10.
Official Communication for U.S. Appl. No. 14/218,643 dated Jun. 23, 2016, pp. 1-11.
Official Communication for U.S. Appl. No. 13/877,652 dated Aug. 12, 2016, pp. 1-22.
Official Communication for U.S. Appl. No. 15/194,502 dated Aug. 19, 2016, pp. 1-12.
Official Communication for U.S. Appl. No. 14/636,062 dated Aug. 24, 2016, pp. 1-9.
International Search Report and Written Opinion for Application PCT/US2016/027386 dated Aug. 26, 2016, pp. 1-10.
Official Communication for U.S. Appl. No. 14/671,904 dated Sep. 28, 2016, pp. 1-14.
Official Communication for U.S. Appl. No. 14/218,643 dated Nov. 1, 2016, pp. 1-10.

(56) References Cited

OTHER PUBLICATIONS

Kanzawa, Y. et al., "Human Skin Detection by Visible and Near-Infrared Imaging," IAPR Conference on Machine Vision Applications, Jun. 13-15, 2011, Nara Japan, pp. 1-5.
Office Communication for U.S. Appl. No. 13/877,652 dated May 31 2017, pp. 1-23.
Office Communication for U.S. Appl. No. 15/194,502 dated Mar. 9, 2017, pp. 1-7.
International Search Report and Written Opinion for International Application No. PCT/US2016/067626 dated Mar. 16, 2017, pp. 1-12.
Office Communication for U.S. Appl. No. 14/671,904 dated May 5, 2017, pp. 1-11.
Office Communication for U.S. Appl. No. 15/411,959 dated May 11, 2017, pp. 1-9.
International Search Report and Written Opinion for International Application No. PCT/US2017/014616 dated May 1, 2017, pp. 1-11.
Official Communication for U.S. Appl. No. 15/384,227 dated Feb. 7, 2017, pp. 1-8.
Official Communication for U.S. Appl. No. 15/384,227 dated Jul. 19, 2017, pp. 1-5.
Official Communication for U.S. Appl. No. 14/671,904 dated Aug. 18, 2017, pp. 1-7.
Official Communication for U.S. Appl. No. 15/194,502 dated Aug. 15, 2017, pp. 1-7.
Official Communication for U.S. Appl. No. 15/411,959 dated Aug. 29, 2017, pp. 1-5.
Official Communication for U.S. Appl. No. 13/877,652 dated Dec. 6, 2017, pp. 1-8.
Official Communication for U.S. Appl. No. 15/799,149 dated Jan. 10, 2018, pp. 1-7.
Official Communication for U.S. Appl. No. 15/444,182 dated Feb. 14, 2018, pp. 1-8.
Official Communication for U.S. Appl. No. 15/194,502 dated Feb. 12, 2018, pp. 1-9.
Official Communication for U.S. Appl. No. 15/804,392 dated Feb. 9, 2018, pp. 1-10.
Official Communication for U.S. Appl. No. 15/804,909 dated Feb. 12, 2018, pp. 1-14.
Official Communication for U.S. Appl. No. 15/098,285 dated Apr. 19, 2018, pp. 1-69.
International Search Report and Written Opinion for International Patent Application No. PCT/US2017/068377 dated Apr. 17, 2018, pp. 1-12.
Office Communication for U.S. Appl. No. 15/411,959 dated May 11, 2017, pp. 1-8.
Office Communication for U.S. Appl. No. 15/694,532 dated Jul. 10, 2018, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49.
International Search Report and Written Opinion for International Patent Application No. PCT/US2017/059282 dated Aug. 10, 2018, pp. 1-10.
Office Communication for U.S. Appl. No. 15/444,182 dated Sep. 13, 2018, pp. 1-11.
Office Communication for U.S. Appl. No. 16/049,380 dated Sep. 27, 2018, pp. 1-40.
Office Communication for U.S. Appl. No. 16/140,485 dated Nov. 23, 2018, pp. 1-58.
International Search Report and Written Opinion in International Patent Application No. PCT/US18/32078 dated Nov. 16, 2018; pp. 1-16.

\* cited by examiner

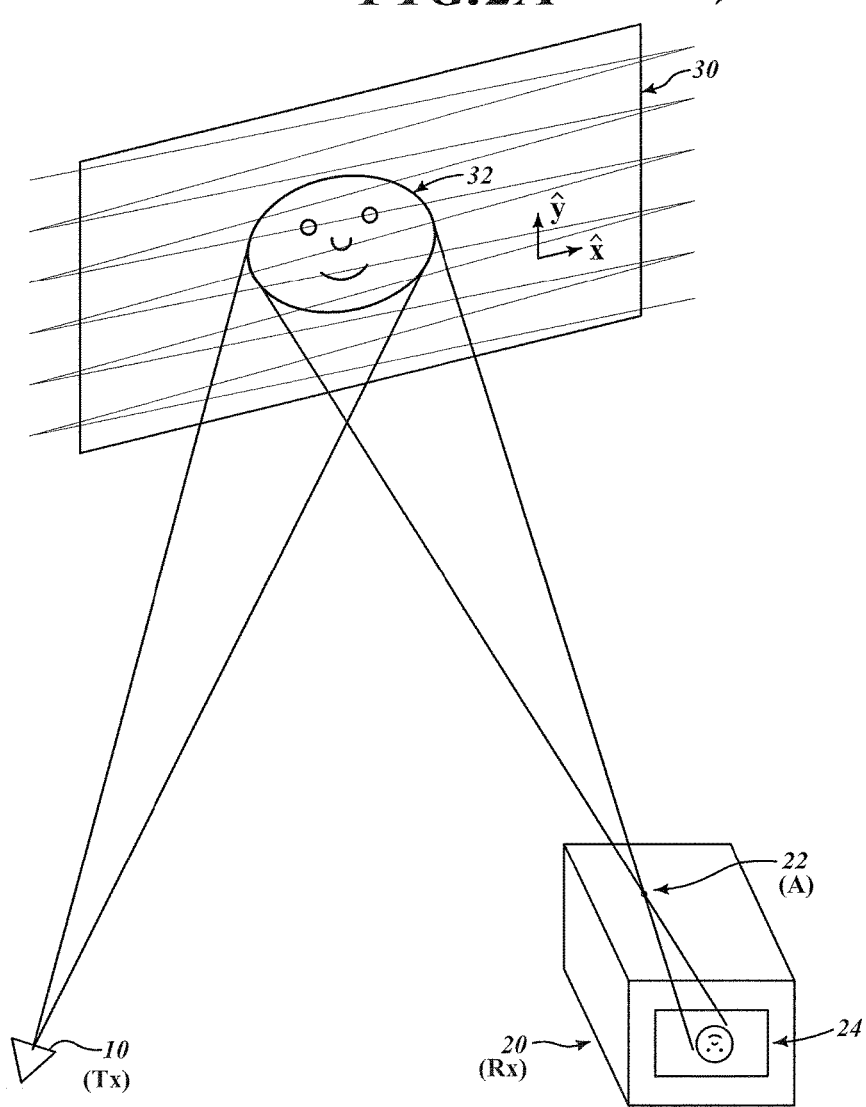

FIG.16A

De Bruijn Code
3 Color Binary $(2^3) - 1 = 7$

| Code# | R | G | B | |
|---|---|---|---|---|
| 0 | 0 | 0 | 0 | Black |
| 1 | 1 | 0 | 0 | Red |
| 2 | 0 | 1 | 0 | Green |
| 3 | 0 | 0 | 1 | Blue |
| 4 | 1 | 1 | 0 | Yellow (Red+Green) |
| 5 | 0 | 1 | 1 | Cyan (Blue+Green) |
| 6 | 1 | 0 | 1 | Magenta (Red+Blue) |
| 7 | 1 | 1 | 1 | White (Red+Green+Blue) |

| | | R | G | B | |
|---|---|---|---|---|---|
| | R | 1 | 0 | 0 | |
| Frame 1 | G | 0 | 1 | 0 | CODE |
| | B | 1 | 0 | 1 | |
| | | | | | + |
| | R | 0 | 1 | 1 | ⟵ |
| Frame 2 | G | 1 | 0 | 1 | |
| | B | 1 | 1 | 0 | ANTI CODE |
| + | | C | M | Y | |

| Frame 1+2 | 1 | 1 | 1 | |
|---|---|---|---|---|
| = | 1 | 1 | 1 | White Light |
| | 1 | 1 | 1 | |
| | W | W | W | |

| IFF Surface | | | | |
|---|---|---|---|---|
| Texture | R | ½ | | |
| e.g. | G | ½ | | |
| | B | 0 | | |

" Light "
yellow

⟵ Interlaced / Successive Codes
Sum to "White" illumination which can
be used to detect color surface textures

COLOR CODE + ANTI CODES

"Tick Marks"

3D Contrast Enhancement Employing Passive Detection & Active Illumination

A Real Time Camera Architecture

3 Phase 3 Color Beam Modulation

MACHINE VISION FOR EGO-MOTION, SEGMENTING, AND CLASSIFYING OBJECTS

CROSS-REFERENCE TO RELATED APPLICATIONS

This Utility Patent Application is a Continuation of U.S. patent application Ser. No. 16/049,380 filed on Jul. 30, 2018, now U.S. Pat. No. 10,157,469 issued on Dec. 18, 2018, which is a Continuation of U.S. patent application Ser. No. 15/098,285 filed on Apr. 13, 2016, now U.S. Pat. No. 10,043,282 issued on Aug. 7, 2018, which is based on a previously filed U.S. Provisional Patent Application U.S. Ser. No. 62/178,597 filed on Apr. 13, 2015, and further based on a previously filed U.S. Provisional Patent Application U.S. Ser. No. 62/285,373 filed on Oct. 26, 2015, the benefit of the filing dates of which are claimed under 35 U.S.C. § 120 and § 119(e), and the contents of which are each further incorporated in entirety by reference.

TECHNICAL FIELD

The present invention relates generally to machine-vision systems, and more particularly, but not exclusively, to employing machine vision to determine ego-motion, as well as segmenting and classifying targets of interest.

BACKGROUND

Various arrays of sensors, such as charge-coupled device sensors and avalanche photodiodes, are sensitive to the illumination of photons at frequencies spanning various windows of the electro-magnetic (EM) spectrum. Such sensors may be employed to detect light reflected from one or more surfaces and generate images of the surfaces. The surfaces may be surfaces of a target of interest, such as a remote object. Furthermore, to enhance the imaging of target, the target may be illuminated with one or more light sources. Illuminating the target provides a larger number of photons reflected from the target, which in turn provides a greater number of photons to detect. Detecting a greater number of photons reflected from the target may enhance the image of the target. It is for these and other concerns that the following disclosure is provided.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 2A illustrates an exemplary embodiment of a system that projects a two-dimensional (2D) image onto a surface that is consistent with the embodiments disclosed herein;

FIG. 16A illustrates encoding information within an RGB photon pattern that is consistent with the various embodiments;

FIGS. 16B-16C illustrates alternative embodiments for encoding information within an RGB photon pattern;

DETAILED DESCRIPTION OF THE INVENTION

Figure 1A:
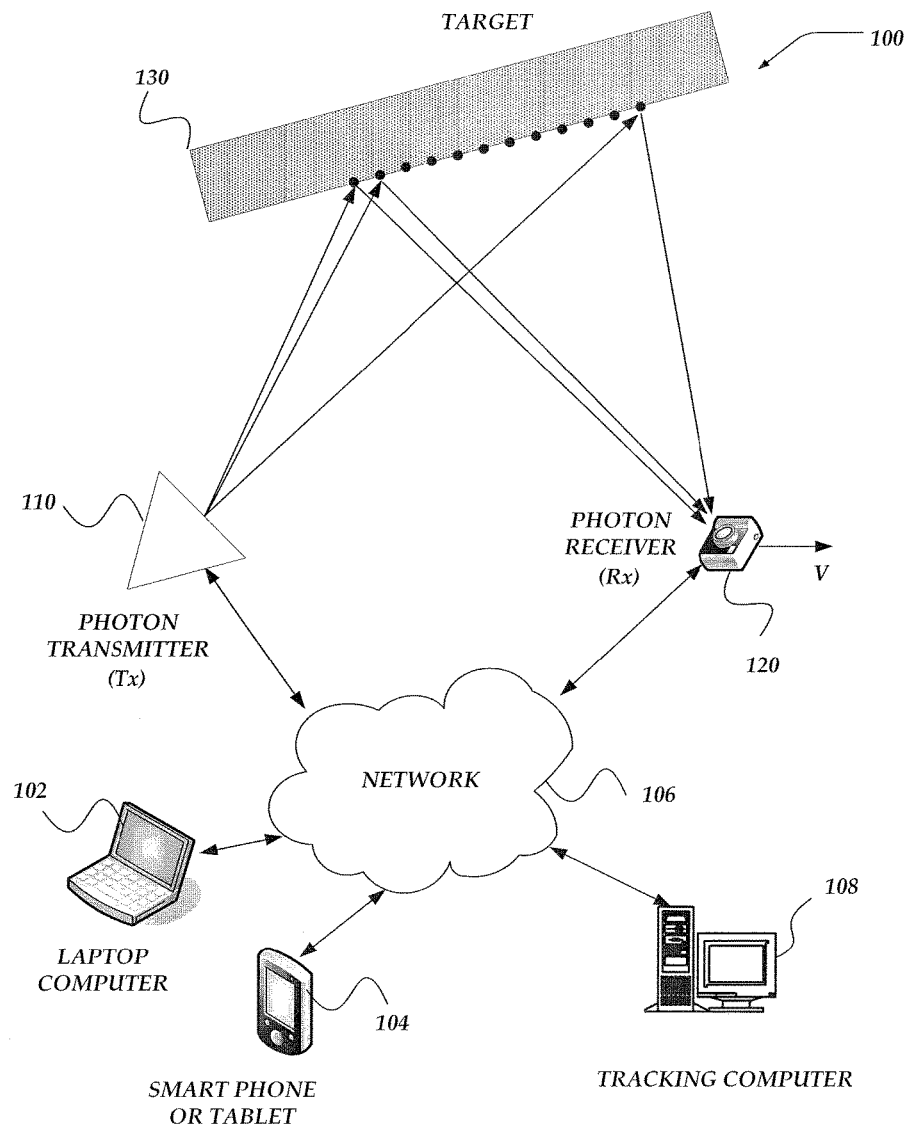
FIG. 1A is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of any frequency or wavelength within the EM spectrum. An outgoing light beam is a beam that is transmitted by any of the various embodiments disclosed herein. An incoming light beam is a beam that is detected by and of the various embodiments disclosed herein.

As used herein, the terms "photon pattern," "light pattern," or "pattern" may refer to the transmission or projection of one or more light beams on a surface. For instance, when one or more light beams illuminates one or more surfaces, a pattern is generated on the surface. Thus, transmitting one or more light beams may include transmitting one or more patterns. Furthermore, transmitting one or more patterns may include transmitting one or more light beams. A pattern may be reflected from the surface. Furthermore, the reflected pattern may be detected as described herein. Thus, detecting a reflected pattern may include detecting one or more light beams.

As used herein, the terms "light source," "photon source," or "source" refer to any device that is capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or any other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of any wavelength or frequency. Thus, a light source, for example a light source included in a photon transmitter, may transmit one or more light beams. In some embodiments, the photon source may transmit or project one or more patterns.

As used herein, the terms "photon detector," "light detector," "detector," "photon sensor," "light sensor," or "sensor" refer to any device that is sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of at least one photon. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include any photon-sensitive technology, such as active-pixel sensors (APS), charge-coupled devices (CCDs), Single Photon Avalanche Detector (SPAD) (operated in avalanche mode), photovoltaic cells, phototransistors, and the like. A photon detector may detect one or more incoming light beams. Thus, a sensor, for example a sensor array included in a photon receiver, may detect one or more light beams. In some embodiments, the sensor array may detect one or more patterns.

As used herein, the terms "target," "object," or "surface" may refer to any 1D, 2D, or 3D body that reflects or scatters at least a portion of incident light, EM waves, or photons. For instance, a target may scatter or reflect an outgoing light beam or pattern that is transmitted by any of the various embodiments disclosed herein. In the various embodiments described herein, one or more photon sources may be in relative motion to one or more of photon detectors and/or one or more targets. Similarly, one or more photon detectors may be in relative motion to one or more of photon sources and/or one or more targets. One or more targets may be in relative motion to one or more of photon sources and/or one or more photon detectors.

Briefly stated, various embodiments of systems and methods for machine vision are presented. Such machine vision includes but is otherwise not limited to ego-motion applications. For instance, the motion of a photon receiver, relative to at least one of a projection surface or photon transmitter, may be determined via the various embodiments disclosed. Furthermore, various embodiments disclosed enable the segmentation and/or classification of image data of one or more targets of interest. Such systems and methods may employ at least one of the projection and/or detection of one or more light beams. Such light beams may be scanning light beams. The one or more light beams may generate one or more light patterns.

As such, such embodiments enable real-time (or near real-time) continuous and accurate spatial-temporal 3D sensing. The various embodiment include determining the relative motion between an observer and a projection surface. For instance, a flying object may employ one or more photon receivers and a projected pattern to determine its motion relative to other structures, such as but not limited to one or more photon transmitters that project or transmit the pattern.

Some embodiments may employ a combination of visible and non-visible light beams or patterns, as well as a combination of visible and non-visible sensor arrays to sense 3D coordinates of target features, as well as acquire color image data to generate 3D color images of targets of interest. Various embodiments include separate visible and non-visible cameras to enable such 3D sensing. Various embodiments of processes may provide a calibration of the separate cameras. Methods of triangulation, time-of-flight, or combinations thereof may be employed to three-dimensionally track a target in real-time, or at least near real time.

Various embodiments may encode information within the one or more transmitted light beams or patterns. The information may be spatially or temporally encoded within the transmitted patterns. Such encoded information may include information about the transmission of the patterns. Such information may be decoded and employed by the detecting photon receiver to determine various features or properties of the target that reflected the pattern.

Characteristics of the transmitted pattern may be dynamically updated, adjusted, or modulated depending upon one or more surfaces that reflect the pattern towards the detecting photon receiver. For instance, a continuous light beams or patterns may be employed when scanning a field of view, but when the scanning pattern is incident on a target, the continuous pattern may be transitioned to a pulsed pattern to enable 3D ranging of the target.

Various embodiments may employ stereoscopic visions to generate 3D image data of a scene or target. Such embodiments may dynamically enhance the contrast of the scene by employing actively illumination. Some embodiments may actively and dynamically provide alignment between the left and right cameras employed to enable stereoscopic vision. Such embodiment may be advantageous in systems that include high vibratory motion that may mis-align the cameras, or in scenarios where the offset between the left and right cameras is unknown, or is otherwise variable.

Some embodiments may actively vary the type or amount of transmitted illumination of a target to enhance the resolution of texture of the target. For instance, highly textured portions of the target, or portions of the target that include a high amount of contrast, may actively be illuminated with one or more illuminating patterns or light beams. Smoother portions of the target, or portions of the target with less contrast, may be imaged with less illumination, or imaged with the available ambient light. Various embodiments may include the fast segmentation of image data via the near-instantaneous detection of one or more target edges. Furthermore, the segmented image data may be classified by employing various embodiments discussed herein. Various embodiments may employ 2D or 3D foveation.

Illustrated Operating Environment

FIG. 1A shows components of one embodiment of an environment in which various embodiments of the invention may be practiced. Not all of the components may be required to practice the invention, and variations in the arrangement and type of the components may be made without departing from the spirit or scope of the invention. As shown, system 100 of FIG. 1 includes network 106, photon transmitter 110, photon receiver 120, target 130, and tracking computer device 108. In some embodiments, system 100 may include one or more other computers, such as but not limited to laptop computer 102 and/or mobile computer, such as but not limited to a smartphone or tablet 104. In some embodiments, photon transmitter 110 and/or photon receiver may include one or more components included in a computer, such as but not limited to any of computer 102, 104, or 108.

System 100, as well as other systems discussed herein, may be a sequential-pixel photon projection system. In at least one embodiment system 100 is a sequential-pixel laser projection system that includes visible and/or non-visible photon sources. Various embodiments of such systems are described in detail in at least U.S. Pat. Nos. 8,282,222, 8,430,512, 8,696,141, 8,711,370, U.S. Patent Publication No. 2013/0300,637, and U.S. Patent Publication No. 2016/0041266. Note that each of the U.S. patents and U.S. patent publications listed above are herein incorporated by reference in the entirety.

Target 130 may be a three-dimensional target. Target 130 is not an idealized black body, i.e. it reflects or scatters at least a portion of incident photons. As shown by the velocity vector associated with photon receiver 120, in some embodiments, photon receiver 120 is in relative motion to at least one of photon transmitter 110 and/or target 130. For the embodiment of FIG. 1A, photon transmitter and target 130 are stationary with respect to one another. However, in other embodiments, photon transmitter 120 and target 130 are in relative motion. In at least one embodiment, photon receiver 120 may be stationary with respect to one or more of photon transmitter 110 and/or target 130. Accordingly, each of photon transmitter 110, target 130, and photon receiver 120 may be stationary or in relative motion to any other of photon transmitter 110, target 130, and photon receiver 120. Furthermore, as used herein, the term "motion" may refer to translational motion along one or more of three orthogonal special dimensions and/or rotational motion about one or more corresponding rotational axis.

Photon transmitter 110 is described in more detail below. Briefly, however, photon transmitter 110 may include one or more photon sources for transmitting light or photon beams. A photon source may provide continuous or pulsed light beams of a predetermined frequency, or range of frequencies. The provided light beams may be coherent light beams. A photon source may be a laser. For instance, photon transmitter 110 may include one or more visible and/or non-visible laser source. In one embodiment, photon transmitter 110 includes at least one of a red (R), a green (G), and a blue (B) laser source to produce a RGB image. In some embodiment, photon transmitter includes at least one non-visible laser source, such as a near-infrared (NIR) laser. Photon transmitter 110 may be a projector. Photon transmitter 110 may include any of the features, components, or functionality of a computer device, including but not limited to mobile computer 200 of FIG. 1B and/or network computer 300 of FIG. 1C.

Photon source may include photo-diodes. Photon transmitter 110 also includes an optical system that includes optical components to direct, focus, and scan the transmitted, or outgoing light beams. The optical systems aim and shape the spatial and temporal beam profiles of outgoing light beams. The optical system may collimate, fan-out, or otherwise manipulate the outgoing light beams. At least a portion of the outgoing light beams are aimed at and are reflected by the target 130. In at least one embodiment, photon transmitter 110 includes one or more photon detectors for detecting incoming photons reflected from target 130, i.e. transmitter 110 is a transceiver.

Photon receiver 120 is described in more detail below. Briefly, however, photon receiver 120 may include one or more photon-sensitive, or photon-detecting, arrays of sensor pixels. An array of sensor pixels detects continuous or pulsed light beams reflected from target 130. The array of pixels may be a one dimensional-array or a two-dimensional array. The pixels may include SPAD pixels or other photo-sensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by photon transmitter 110 and relatively insensitive to other frequencies. Photon receiver 120 also includes an optical system that includes optical components to direct, focus, and scan the received, or incoming, beams, across the array of pixels. In at least one embodiment, photon receiver 120 includes one or more photon sources for emitting photons toward the target 130, i.e. receiver 120 is a transceiver. Photon receiver 120 may be a camera. Photon receiver 120 may include any of the features, components, or functionality of a computer device, including but not limited to mobile computer 200 of FIG. 1B and/or network computer 300 of FIG. 1C.

Various embodiment of tracking computer device 108 are described in more detail below in conjunction with FIGS. 1B-1C, i.e. tracking computer device 108 may be an embodiment of mobile computer 200 of FIG. 1B and/or network computer 300 of FIG. 1C. Briefly, however, tracking computer device 108 includes virtually any computer device enabled to perform the various tracking processes and/or methods discussed herein, based on the detection of photons reflected from one or more surfaces, including but not limited to surfaces of target 130. Based on the detected photons or light beams, tracking computer device 108 may alter or otherwise modify one or more configurations of photon transmitter 110 and photon receiver 120. It should be understood that the functionality of tracking computer device 108 may be performed by photon transmitter 110, photon receiver 120, or a combination thereof, without communicating to a separate device.

In some embodiments, at least some of the tracking functionality may be performed by other computers, including but not limited to laptop computer 102 and/or a mobile computer, such as but not limited to a smartphone or tablet 104. Various embodiments of such computers are described in more detail below in conjunction with mobile computer 200 of FIG. 1B and/or network computer 300 of FIG. 1C Network 106 may be configured to couple network computers with other computing devices, including photon transmitter 110, photon receiver 120, tracking computer device 108, laptop computer 102, or smartphone/tablet 104. Network 106 may include virtually any wired and/or wireless technology for communicating with a remote device, such as, but not limited to, USB cable, Bluetooth, Wi-Fi, or the like. In some embodiments, network 106 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computer 103-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between photon transmitter 110, photon receiver 120, and tracking computer device 108, as well as other computing devices not illustrated.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

As discussed in detail below, photon transmitter 110 may provide an optical beacon signal. Accordingly, photon transmitter 110 may be a transmitter (Tx). Photon transmitter 110 may transmit a photon beam onto a projection surface of target 130. Thus, photon transmitter 110 may transmit and/or project an image onto the target 130. The image may include a sequential pixilation pattern. The discreet pixels shown on the surface of target 130 indicate the sequential scanning of pixels of the image via sequential scanning performed by photon transmitter 110. Photon receiver (Rx) 120 may be an observing system which receives the reflect image. As noted, photon receiver 120 may be in motion relative (as noted by the velocity vector) to the image being projected. The relative motion between photon receiver 120 and each of the photon transmitter 110 and target 130 may include a relative velocity in any direction and an arbitrary amplitude. In system 100, photon transmitter 110 and the image on the surface are not in relative motion. Rather, the image is held steady on the surface of target 130. However, other embodiments are not so constrained, the photon transmitter 110 may be in relative motion to target 130. The projected image may be anchored on the surface by compensating for the relative motion between the photon transmitter 110 and the target 120.

Illustrative Mobile Computer

Figure 1B:
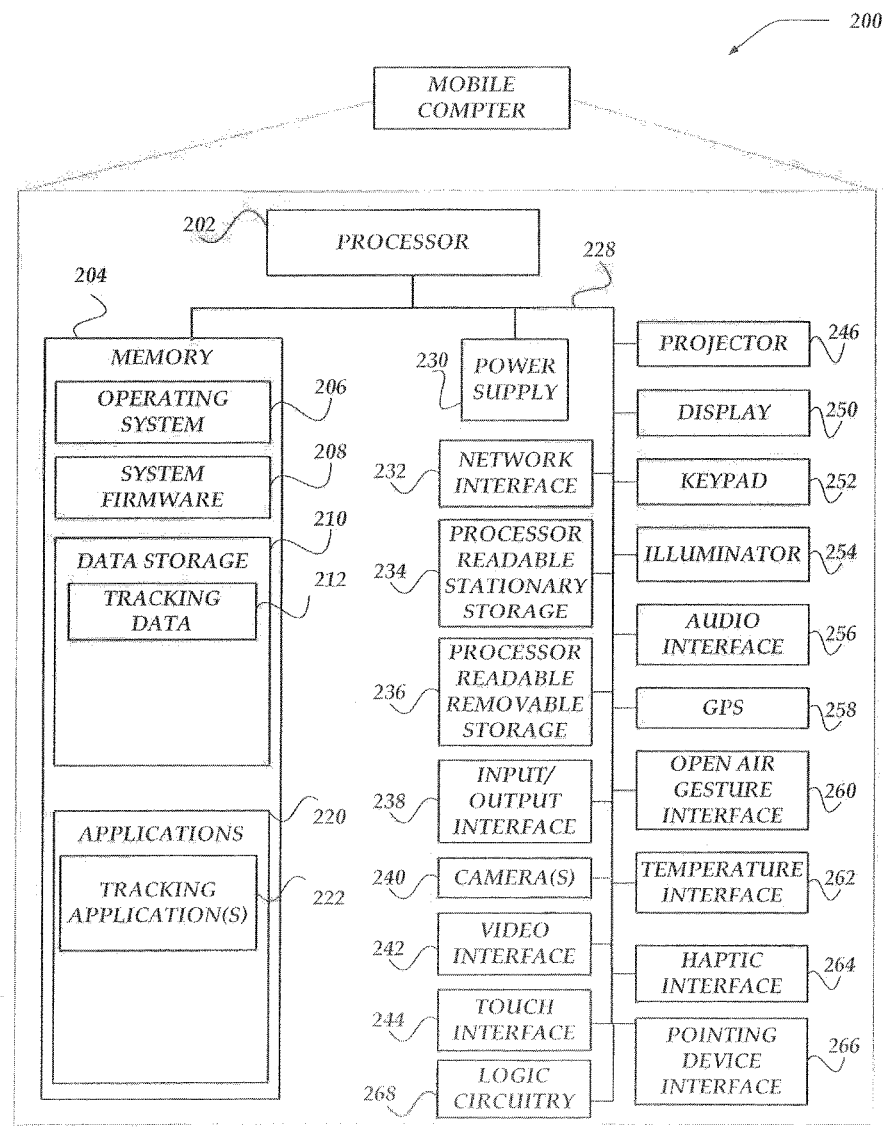
FIG. 1B shows an embodiment of a mobile computer that may be included in a system such as that shown in FIG. 1A.

FIG. 1B shows one embodiment of mobile computer 200 that may include many more or less components than those shown. Mobile computer 200 may represent, for example, at least one embodiment of laptop computer 102, smartphone/tablet 104, and/or tracking computer 108 of system 100 of FIG. 1A. Thus, mobile computer 200 may be a mobile device (e.g., a smart phone or tablet), a stationary/desktop computer, or the like.

Mobile computer 200 may include processor 202, such as a central processing unit (CPU), in communication with memory 204 via bus 228. Mobile computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Mobile computer 200 may optionally communicate with a base station (not shown), or directly with another computer. And in one embodiment, although not shown, an accelerometer or gyroscope may be employed within mobile computer 200 to measuring and/or maintaining an orientation of mobile computer 200.

Additionally, in one or more embodiments, the mobile computer 200 may include logic circuitry 268. Logic circuitry 268 may be an embedded logic hardware device in contrast to or in complement to processor 202. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to mobile computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile computer 200 may also comprise input/output interface 238 for communicating with external peripheral devices or other computers such as other mobile computers and network computers. Input/output interface 238 may enable mobile computer 200 to communicate with any other computer. Other peripheral devices that mobile computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile computer 200. For example, the haptic interface 264 may be employed to vibrate mobile computer 200 in a particular way when another user of a computer is calling. Temperature interface 262 may be used to provide a temperature measurement input and/or a temperature changing output to a user of mobile computer 200. Open air gesture interface 260 may sense physical gestures of a user of mobile computer 200, for example, by using single or stereo video cameras, radar, a gyroscopic sensor inside a computer held or worn by the user, or the like. Camera 240 may be used to track physical eye movements of a user of mobile computer 200.

GPS transceiver 258 can determine the physical coordinates of mobile computer 200 on the surface of the Earth, which typically outputs a location as latitude and longitude values. Physical coordinates of a mobile computer that includes a GPS transceiver may be referred to as geolocation data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 200 on the surface of the Earth. It is understood that under different conditions, GPS transceiver 258 can determine a physical location for mobile computer 200. In at least one embodiment, however, mobile computer 200 may, through other components, provide other information that may be employed to determine a physical location of the mobile computer, including for example, a Media Access Control (MAC) address, IP address, and the like.

In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200. In a least one embodiment, a localization of at least a portion of any applications included in mobile computer 200 is performed based on at least the geo-location data or other data acquired by GPS transceiver 258 or other sensors included in mobile computer 200. For instance, time zone parameters, currency type, units, language parameters, and the like are set or otherwise configured in various portions of software included in one or more mobile computers. Furthermore, any process discussed herein, including but not limited to any process discussed in the context of any flowchart described herein, may be localized as such.

Human interface components can be peripheral devices that are physically separate from mobile computer 200, allowing for remote input and/or output to mobile computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile computer 200. The memory may also store operating system 206 for controlling the operation of mobile computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by mobile computer 200 to store, among other things, applications 220 and/or other data. For example, data storage 210 may store tracking data 212. Data storage 210 may further include program code, data, algorithms, and the like, for use by a processor, such as processor 202 to execute and perform actions. In one embodiment, at least some of data storage 210 might also be stored on another component of mobile computer 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by mobile computer 200, transmit, receive, and/or otherwise process instructions and data. Applications 220 may include tracking applications 222.

Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, mobile computer 200 may be enabled to employ various embodiments, combinations of embodiments, processes, or parts of processes, as described herein.

Illustrative Network Computer

Figure 1C:
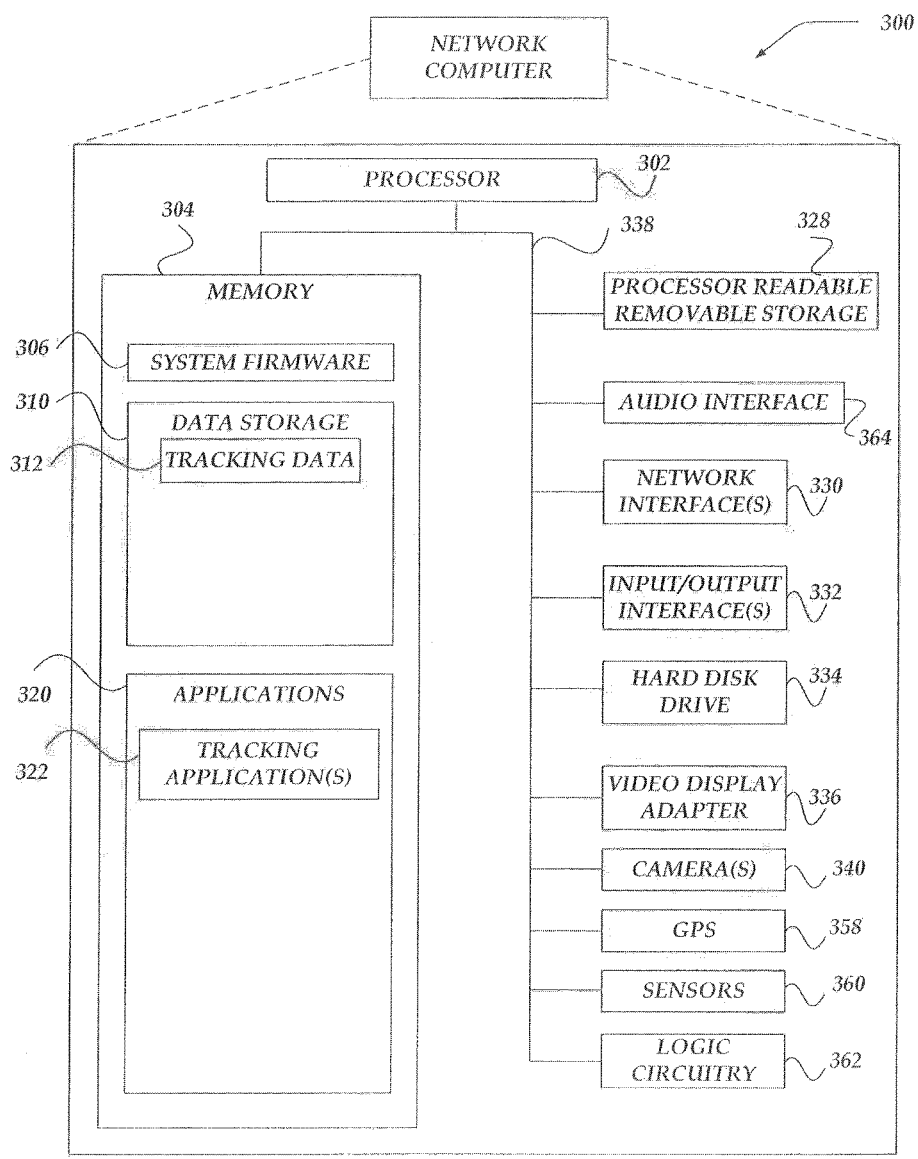
FIG. 1C illustrates an embodiment of a network computer that may be included in a system such as that shown in FIG. 1A.

FIG. 1C shows one embodiment of network computer 300, according to one embodiment of the invention. Network computer 300 may represent, for example, at least one embodiment of laptop computer 102, smartphone/tablet 104, and/or tracking computer 108 of system 100 of FIG. 1A. Network computer 300 may be a desktop computer, a laptop computer, a server computer, a client computer, and the like.

Network computer 300 may include processor 302, such as a CPU, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

Additionally, in one or more embodiments (not shown in the figures), the network computer may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the network computer may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), and the like.

As illustrated in FIG. 1C, network computer 300 also can communicate with the Internet, cellular networks, or some other communications network (either wired or wireless), via network interface unit 330, which is constructed for use with various communication protocols. Network interface unit 330 is sometimes known as a transceiver, transceiving device, or network interface card (NIC). In some embodiments, network computer 300 may communicate with any other computer via the network interface unit 320.

Figure 3:
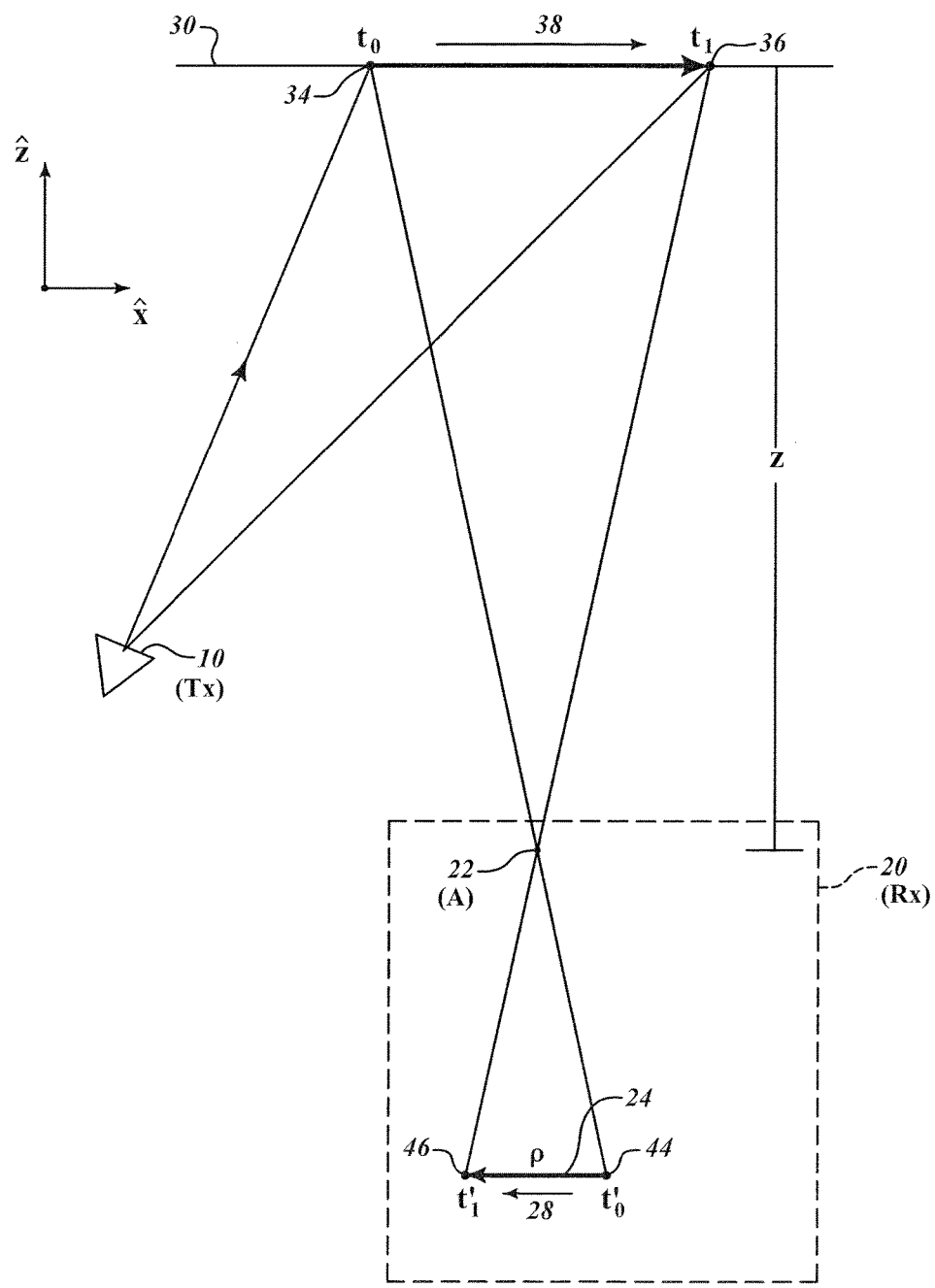
FIG. 3 illustrates an exemplary embodiment of a system that projects two pixels of an image onto a surface and the photon receiver is stationary with respect to the projection surface.

Network computer 300 also comprises input/output interface 332 for communicating with external devices, such as a various sensors or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 may store system firmware 306 for controlling the low-level operation of network computer 300 (e.g., BIOS). In some embodiments, memory 304 may also store an operating system for controlling the operation of network computer 300.

Although illustrated separately, memory 304 may include processor readable storage media 328. Processor readable storage media 328 may be referred to and/or include computer readable media, computer readable storage media, and/or processor readable storage device. Processor readable removable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, tracking data 312 and/or other data. For example, data storage 310 may further include program code, data, algorithms, and the like, for use by a processor, such as processor 302 to execute and perform actions. In one embodiment, at least some of data storage 310 might also be stored on another component of network computer 300, including, but not limited to processor-readable storage media 328, hard disk drive 334, or the like.

Applications 320 may include computer executable instructions that can execute on processor 302 to perform actions. In some embodiments, one or more of applications 320 may be part of an application that may be loaded into mass memory and run on an operating system Applications 320 may include tracking applications 322.

GPS transceiver 358 can determine the physical coordinates of network computer 300 on the surface of the Earth, which typically outputs a location as latitude and longitude values. Physical coordinates of a network computer that includes a GPS transceiver may be referred to as geo-location data. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 358 can determine a physical location for network computer 300. In at least one embodiment, however, network computer 300 may, through other components, provide other information that may be employed to determine a physical location of the mobile computer, including for example, a Media Access Control (MAC) address, IP address, and the like.

In at least one embodiment, GPS transceiver 358 is employed for localization of the various embodiments discussed herein. For instance, the various embodiments may be localized, via GPS transceiver 358, to customize the linguistics, technical parameters, time zones, configuration parameters, units of measurement, monetary units, and the like based on the location of a user of network computer 300. In a least one embodiment, a localization of at least a portion of any application included in network computer 300 is performed based on at least the geo-location data or other data acquired by GPS transceiver 358 or other sensors included in network computer 300. For instance, time zone parameters, currency type, units, language parameters, and the like are set or otherwise configured in various portions of software included in one or more network computers. Furthermore, any process discussed herein, including, but not limited to any process discussed in the context of any flowchart described herein, may be localized as such.

Audio interface 364 may be arranged to produce and receive audio signals such as the sound of a human voice. For example, audio interface 354 may be coupled to a speaker and microphone (not shown) to enable telecommunication with others and/or generate an audio acknowledgement for some action. A microphone in audio interface 364 can also be used for input to or control of network computer 300, e.g., using voice recognition, detecting touch based on sound, and the like. Likewise, a camera 340 may be included with network computer 300 to capture image and/or video data. Other sensors 360 may be included to sense a location, or other environment component.

Additionally, in one or more embodiments, the network computer 300 may include logic circuitry 362. Logic circuitry 362 may be an embedded logic hardware device in contrast to or in complement to processor 302. The embedded logic hardware device would directly execute its embedded logic to perform actions, e.g., an Application Specific Integrated Circuit (ASIC), Field Programmable Gate Array (FPGA), and the like.

So, in some embodiments, network computer 300 may be enabled to employ various embodiments, combinations of embodiments, processes, or parts of processes, as described herein. \

Sequential-Pixel Projection Systems

FIG. 2A illustrates an exemplary embodiment of a system that projects a two-dimensional (2D) image 32 onto a surface 30 that is consistent with the embodiments disclosed herein. System 2 includes a photon transmitter 22 and a photon receiver 22. System 2 may include similar features as system 100 of FIG. 1A. For instance, surface 30 may be a surface of a target, such as but not limited to target 130 of system 100.

FIG. 2A illustrates an exemplary embodiment of a photon transmitter 10 projecting a two-dimensional (2D) image 32 onto the surface 30 and a photon receiver 22 that observes the image 32 that is consistent with the embodiments disclosed herein. System 2 may include similar features to system 100 of FIG. 1A. In FIG. 2, photon transmitter 10 scans a sequential-pixel pattern to form image 32. Photon transmitter 10 projects a known pattern formed by sequential pixels on the remote surface 30. Accordingly, surface 30 may be a projection surface. Each pixel is formed by an instantaneous position of the one or more photon beams on surface 30. The photon beams are reflected towards and detected by photon receiver 20 to detect and reproduce the image 32.

Photon receiver 20 includes an aperture 22, a photon sensor 24, and other optical elements. The aperture 22 may be a camera-like aperture that collects the reflected photons with collimation optics. The collected photons may be projected, via optical elements, onto the sensor 24. The sensor may be a high-resolution sensor, such as but not limited to digital camera array, a charge-coupled device (CCD), a single photon avalanche device (SPAD), or the like. Each projected pixel on the surface 30 corresponds to at least one pixel in the sensor 24. Note that at any one time, at any nanosecond, the photon entering the aperture 22 correspond to a single pixel. Pixel by pixel, over a time of millions of nanoseconds (several milliseconds), a full image 32 is formed in the sensor 24. Thus, system 2 may be a sequential-pixel laser projection system.

Within photon transmitter 10, a low cost dual axis microelectromechanical system (MEMS) scanning device or mirror may be employed to scan the photon beam across surface 30. Such MEMS scanning devices may scan up to 50,000 lines per second (using a 25 kHz resonant mirror system).

During a scan of an image 32, photon sources of primary colors (such as but not limited to RGB laser sources) are modulated in intensity for periods as short as 1 nanosecond, projecting image pixels of millions of colors. When system 2 scans 50,000 lines per second, a single line of image pixels is scanned in less than 20 microseconds. Such a scanning frequency may be enabled by a 25 kHz scanning mirror. At a scanning frequency of 50,000 lines per second, the optics of photon transmitter 10 enables a different color spot (image pixel) on each of 20,000 locations in a single line (equivalent of 20 k resolution, or 5 times greater than the horizontal resolution of 4 k television).

Image 32, or another projected image created from a succession of scan lines, may include an embedded coded sequence. Such a coded sequence may be accomplished by modulating the photon sources in photon transmitter 10. For instance, the photon sources may be multi-color, binary, or greyscale, monochrome, visible (VIS), NIR, or the like. Accordingly, the projected image may include a dense spatio-temporal intensity modulation. A remote observer (such as photon receiver 20) may detect and sequence the reflected light forming the image on the target or projection surface. The detected light may be decoded to determine the position, velocity, rotation, acceleration, and the like of the projection surface or target, relative to the observed image.

One key aspect of system 2 is that each projected image pixel (smallest dimensionless image element) need be only illuminated (only exists) for a very short time interval (as little as 1 nanosecond). Accordingly, in various embodiments, photon transmitter 10 may project "tracer" photon beams or bullets, that illuminate points on the target for very short amounts of time (as little as 1 nanosecond). These tracer beams may be non-visible (such as NIR tracer beams). In at least one embodiment, the tracer beam is a visible RGB beam. Various applications of tracer beams are discussed in at least U.S. Pat. No. 8,282,222 and U.S. Patent Publication No. 2016/0041266, both of which are incorporated by reference above.

A nanosecond flash is one million times shorter in duration than a very fast exposure image acquired by a traditional Single Lens Reflect (SLR) cameras (typically around 1 millisecond). Accordingly, each pixel may be exposed with a temporal sharpness equivalent to a billion frames per second. Thus, system 2 enables the projection and detection of an image with enhanced temporal accuracy, yielding picture elements with a sharpness that is not affected by relative to between the observer and the projection surface or target. Accordingly, images projected by system 2 are not blurred, when the observer is in relative motion to the projection surface.

Accordingly, no matter how unsteady the observer's perspective (i.e. the perspective of photon receiver 20), the individual pixels observed by the observer (i.e. a fast moving photon receiver 20) are as crisp as seen as from the stationary image transmitter 10. In other words, high-speed motion of the photon projector 20 relative to the photon transmitter 10 and the projection surface 30 only warps (distorts) image 32, but does not blur individual pixels. Thus, system 2 may be deployed in applications where an observer may be subject to high velocity or vibratory motion, such as but not limited to a helicopter.

A projected image, such as but not limited to image 32, when viewed as a whole, is a sum of the image pixels that visible to an observer. As discussed above, the observer may be in high-speed motion relative to at least one of the photon transmitter 10 or the projection surface 30. When such an image is projected by a photon transmitter that includes a fast diode, laser modulated light source, image 32 may be distorted via two separate mechanisms (however as noted above, image 32 remains unblurred regardless of the observer's motion).

The first distortion mechanism includes normal frame level distortion as experienced by all projection imaging systems, due to key stoning, the observer's perspective variations, and the spatial structure (shape, angle, non-flatness) of the projection surface. The second distortion mechanism is unique to a sequential-pixel project system, such as but not limited to system 2. Since each image pixel is projected and viewed at a slightly different moment, relative to the motion between the photon transmitter 10, projection surface 30, and the observer of photon receiver 20, the individual image pixels may be displaced during the projection of a single scan.

Furthermore, a sequential-pixel projection system may scan rapidly in one direction (the scan line direction. FIG. 2A includes a coordinate system, where the x and y orthogonal directions are shown in projection surface 30, where the x direction is substantially horizontal and the y direction is substantially vertical. The z direction is orthogonal to each of the x and y directions. As shown in system 2, the scan direction is horizontal along the x direction. Furthermore, the scanning is back and forth in two successive opposing fast sweep directions (in the +x direction and a return scan (along the next successive scan line, above or below the proceeding scan line along the −x direction). Such back and forth scanning is enabled by a pico-projector with a fast 25 kHz resonant MEMS mirror scan mechanism.

Accordingly, a first scan line is scanned from left to right in less than 20 microseconds and a second scan line is scanned in the opposite direction within the next 20 microseconds. The last pixel in the first scan line flashes for as little as one nanosecond, but 20 nanoseconds later than the first pixel in the scan line. Thus, the last pixel in a 60 frames per second photon projector may be displayed more than 16 million nanoseconds (16 ms) later than the first.

When the observer is moving at a high speed with respect to the projected image, within a single image there can be significant spatial shift in the positions of such "later" image pixels as compared to the ones that were displayed earlier.

The greater the motion of the observer in the frame interval, the greater the shift of the later pixels from the transmitted spatial locations within the frame, their original frame position.

In traditional projection systems a sequence of images is displayed, and observed frame-by-frame. To accurately determine motion or depth (or range in the z direction) the projection of multiple image frames is required by a traditional projection system. Furthermore, the observed motion is only time-wise coarsely observed. In a typical 60 frame per second video system, rapid, instantaneous motion events occurring within the 16 millisecond frame interval may end up lost due to blurred pixels (caused by long shutter or strobe times). Additionally, when short strobes are used to reduce pixel blur, motion may be missed entirely. Accordingly, these traditional projection systems may fail to respond precisely to short burst-like un-predictable events.

In contrast, in sequential-pixel projection systems, such as but not limited to system 2, as well as the other systems described herein, a single image frame may include sufficient information to determine motion, with nanosecond precision and accuracy. Such systems, as discussed herein, sequentially project image pixels to render an image, such as but not limited to image 32. In at least some embodiments, the projected photon beams include densely coded structured light patterns. These codes or patterns enable the precise and accurate determination of motion of both of the photon receiver and the projection surface. By decoding the embedded codes and/or detecting and/or observing the intra-frame displacement of the sharply rendered individual image pixels, the two separate motions (projection surface motion and photon receiver motion) may be de-convoluted to determine each motion, relative to a ground or zero-motion reference.

Furthermore, foreground objects (such as flying objects) may discriminated from background objects. For instance, the observed pixel displacements (of a reflected image beam) associated with a flying object may be different than the pixel displacements associated with the image reflecting from background object.

Projecting an image beam on a background object (such as but not limited to a wall or building surface) may provide a ground reference, a zero-motion reference, or a "ground truth" reference. Such a ground reference may provide a determination of the photon receiver's trajectory in 3D space and in 6 degrees of freedom (3 translation and 3 rotational). Additionally, when the beam is scanned from the background object to the foreground object, the motion of the foreground object may be determined within a single frame, or even a sub-frame, concurrently with determining the motion of the observer. Such foreground objects include, but are not otherwise limited to moving balls, missiles, objects in the path of a vehicle, and the like.

Whether the image beam is projected on a background object, foreground object, or a combination thereof, the distortion (or warping) of the detected reflected image may be employed for precise and accurate beaconing functionality of the system. As discussed throughout, the image distortion is due to the shifting (but not blurring) of the pixels received at the photon receiver. Such beaconing functionality enables the precise and accurate determination of ego-motion. Accordingly, the various systems and methods discussed herein may be deployed in high speed flying objects (such as but not limited to missile and/or drones). Accordingly, systems embedded on such may determine the spatial trajectory of the object. For instance, see U.S. Pat. No. 8,711,370 (incorporated above) for ego-motion application.

Figure 2B:
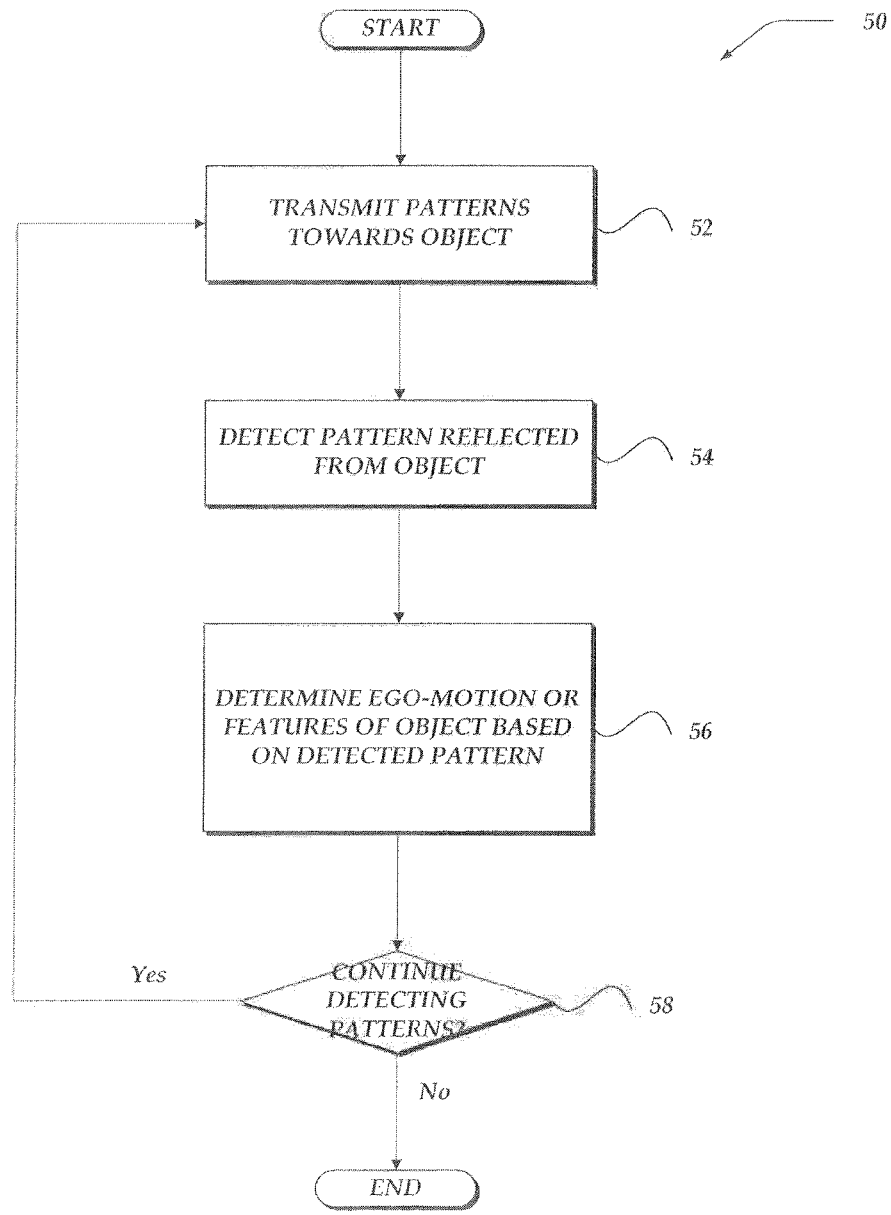
FIG. 2B shows a logical flow diagram generally showing one embodiment of a machine vision process that is consistent with the various embodiments.

FIG. 2B shows a logical flow diagram generally showing one embodiment of a machine vision process that is consistent with the various embodiments. Process 50 may begin, after a start block, at block 52, where one or more patterns are transmitted towards a object. The object may be a relatively stationary object, such as but not limited to the surface of the earth, or a structure on the earth. The object may be a target. The patterns may be generated from one or more light beams. Accordingly, the patterns may be light patterns. The patterns may be 1D, 2D, or 3D patterns. As discussed herein, the one or more patterns may be scanning patterns transmitted by one or more of the various embodiments of photon transmitters discussed herein. The one or more patterns may include one or more tracer beams, tracer bullets, pinprick beams, tracer patterns, and the like as discussed throughout.

The one or more patterns may include visible patterns, non-visible patterns (such as NIR), or any combination of wavelengths of electromagnetic (EM) radiation. The one or more patterns may be scanned in one or more directions as discussed herein. Transmitting the one or more patterns may include projecting the one or more scanning patterns on the object. The object may be a target of interest. Furthermore, the object may include one or more projection surfaces that reflect the one or more scanning patterns. The one or more photon transmitters may include one or more components or features of a computer, as discussed herein. Furthermore, the photon transmitters may include one or more visible and non-visible light sources, such as but not limited to RGB laser diodes, NIR laser diodes, and the like.

At block 54, at least a portion of the one or more patterns are detected upon reflection from the one or more projection surfaces of the object. The patterns may be detected by one or more photon receivers as discussed herein. In various embodiments, the one or more photon receivers may include two stereoscopic photon receivers in epipolar alignment. The one or more receivers may include one or more sensor arrays as discussed herein. Furthermore, the one or more sensor arrays may generate one or more sensor signals based on the detection of the one or more reflected patterns.

In at least one embodiment, at block 54, one or more patterns are detected that were not transmitted from the one or more photon transmitters. For instance, ambient light, or light from photon sources other than the one or more photon transmitters, may reflected from the object at detected by the one or more photon receivers at block 54.

At block 56, at least one of a ego-motion or features of the object may be determined. The ego-motion may include the motion of the photon receiver, relative to the object or the photon transmitters. Determining features of the object may include classifying and/or segmenting the object. Features of the object may include a relative position, velocity, or acceleration of the object determined based on the one or more detected patterns. In at least one embodiment, at least one or more features or structures of the object is determined based on the one or more detected patterns. Any of these determinations may be in at least one of two spatial dimensions or three spatial dimensions. Accordingly, these determinations may be 2D or 3D determinations. Features or structures of the object may include texture, 3D structures, edges, relative size, and the like.

Any of these determinations may be based on at least the one or more sensor signals generated by the one or more sensor arrays. The relative position, velocity, or acceleration of the object may be relative to at least one of the one or more photon receivers, photon transmitters, or the like.

At decision block 58, it is determined whether to continue to detecting patterns. If so, process 50 returns to block 52 to transmit one or more patterns towards the object. In at least one embodiment, one or more feedback loops may be employed when transmitting one or more additional patterns towards the object. The one or more feedback loops may include feedback between the one or more photon receivers and the one or more photon transmitters, as discussed herein. Various feedback loops are discussed throughout, including but not limited in conjunction with process 60 of FIG. 2C. If detecting patterns is not continued at decision block 58, process 60 may terminate or return a calling process.

Figure 2C:
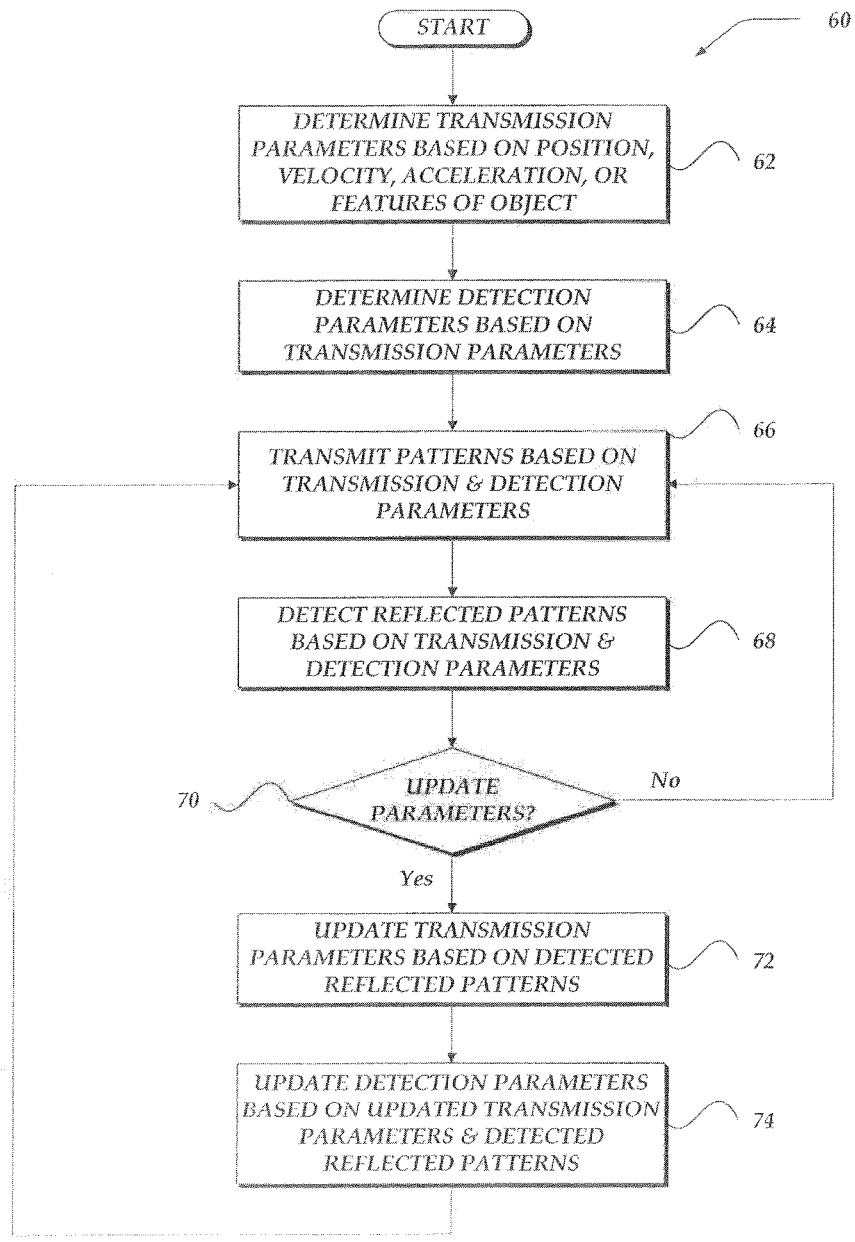
FIG. 2C shows a logical flow diagram generally showing one embodiment of a process for providing feedback between one or more photon transmitters and one or more photon transceivers.

FIG. 2C shows a logical flow diagram generally showing one embodiment of a process for providing feedback between one or more photon transmitters and one or more photon transceivers. Process 60 begins after a start block at block 62, where one or more transmission parameters are determined. The one or more transmission parameters may be based on at least an approximate, or previously determined, relative position, velocity, acceleration of the object. The transmission parameters may be determined based on various features or structures of the object, such as size, texture, or the like.

Transmission parameters may include virtually any parameter, value, metric, or other information associated with the transmission of the one or more pattern as discussed throughout. Accordingly, the one or more transmission parameters may include any parameter, value, metric, or information regarding the control and/or operation of one or more photon transmitters.

The one or more transmission parameters may include, but are not otherwise limited to scanning parameters, such as but not limited to one or more scanning directions, one or more scanning frequencies (or rates), one or more 1D or 2D scanning patterns, one or more parameters regarding a rotation of the scanning pattern, such as but not limited to rotation potentiation and angular frequency of rotation. Transmission parameters may include instantaneous outgoing angles, such as azimuthal and vertical scanning angles, and the like. Transmission parameters may include frequency, or combination of frequencies, of photons included in the one or more pattern. Transmission parameters may include information to encode in the one or more pattern.

At block 64, one or more detection parameters may be determined based on at least the one or more transmission parameters. In at least one embodiment, the one or more detection parameters may be based on at least an approximate, or previously determined, relative position, velocity, acceleration of the object. The transmission parameters may be determined based on various features or structures of the object, such as size, texture, or the like.

Detection parameters may include virtually any parameter, value, metric, or other information associated with the detections of the one or more pattern as discussed throughout. Accordingly, the one or more detection parameters may include any parameter, value, metric, or information regarding the control and/or operation of one or more photon receivers.

The one or more detection parameters may include, but are not otherwise limited to values and timing requirements regarding biasing rows, columns, or individual pixels within one or more sensor arrays included in the one or more photon receivers. The detection parameters may include controlling and operating a rolling shutter included in a photon receiver. The detection parameters may include timing or angular information about the one or more pattern. In at least one embodiment, the detection parameters may include, or at least be based on information encoded in the one or more pattern.

At block 66, one or more light pattern are transmitted based on at least the transmission parameters. In at least one embodiment, transmitting the one or more light pattern may be based on the one or more detection parameters. The one or more light pattern may be transmitted via one or more photon transmitters. In some embodiments, the one or more photon transmitters may be operated or controlled based on the one or more transmission parameters. In some embodiments, the one or more photon transmitters may be operated or controlled based on the one or more detection parameters. Transmitting one or more lights pattern are discussed throughout, such as but not limited to in conjunction with block 3202 of process 3200 of FIG. 32. The light pattern may be transmitted towards a target, object, or one or more projection surfaces.

At block 68, the one or more light pattern are detected upon reflection from the object. In various embodiments, detecting the reflected light pattern may be based on at least a portion of the detection parameters and/or a portion of the transmission parameters. The one or more light pattern may be detected via one or more photon receivers. In some embodiments, the one or more photon receivers may be operated or controlled based on the one or more transmission parameters. In some embodiments, the one or more photon receivers may be operated or controlled based on the one or more detection parameters. Detecting the one or more lights pattern are discussed throughout, such as but not limited to in conjunction with block 3204 of process 3200 of FIG. 32.

At decision block 70, it is determined whether any of the transmission and/or detections parameters are to be updated. For instance, in various embodiments that employ one or more feedback loops, at least a portion of the transmission and/or detection parameters may be updated based on at least the detections of the reflected light pattern and/or the transmission of the lights pattern, as discussed throughout. If the transmission and/or detections parameters are not to be updated, process 60 flows back to block 66 to transmit additional one or more light pattern towards the object based on at least a portion transmission and/or detection parameters. If at least a portion of the parameters are to be updated, process 60 flows to block 72.

At block 72, one or more of the transmission parameters are updated. Updating transmission parameters are discussed throughout. However briefly here, the one or more transmission parameters may be updated based on (or at least an approximation of) at least a relative position, velocity, acceleration, size, feature, structure, or the like of the object. For instance, at least an approximation of a relative position, velocity, size, or the like may be determined based on the detection of the one or more reflected pattern. Accordingly, updating the one or more transmission parameters may be based on detecting the reflected pattern.

At block 74, one or more of the detection parameters may be updated. Updating detections parameters are discussed throughout. However briefly here, the one or more detections parameters may be updated based on (or at least an approximation of) at least a relative position, velocity, acceleration, size, feature, structure, or the like of the object. Accordingly, updating the one or more detection parameters may be based on detecting the reflected pattern. In some embodiments, updating the one or more detection parameters may be based on the updated transmission parameters.

In at least one embodiment, updating the one or more detection parameters may be based on a comparison between the updated transmission parameters and the transmission parameters prior to being updated at block 72. Process 60 flows back to block 66 to transmit additional one or more light pattern towards the object based on at least a portion updated transmission and/or detection parameters.

FIG. 3 illustrates an exemplary embodiment of a system that projects two pixels of an image onto a surface and the photon receiver is stationary with respect to the projection surface FIG. 3 may be a top view of the system 2 of FIG. 2. In FIG. 3, system 2 projects two image pixels 34/36 of an image onto the surface 30 that is consistent with the embodiments disclosed herein. A coordinate system is shown in FIG. 3. The coordinate systems of FIGS. 2-3 are used throughout. As in FIG. 2, system 2 includes photon transmitter 10 and photon receiver 20. Photon receiver 20 includes aperture 22 and sensor array 24. In the embodiment shown in FIG. 3, photon receiver 20 is not in motion relative to photon transmitter 10. The two image pixels 34/36 may be included in an image, such as but not limited to image 32 of FIG. 2. The two image pixels include a first image pixel 34 and a second image pixel 36.

As discussed in the context of FIG. 2, photon transmitter 10 may be a sequential-pixel photon projector or transmitter (Tx) that scans an optical pattern including a line of the image from left to right. Scanning arrow 38 shows the scanning direction. First image pixel 34 arrives at surface 30 at a first time (t0) and the second image pixel 36 arrives at surface 30 at a second time (t1), where t1>t0. The two pixels may be adjacent pixels and/or sequential pixels, but need not be. The optical paths (rays) for each of the pixels are shown as being transmitted by photon transmitter 10, reflected via surface 30, and received by photon receiver 20 (Rx). Because first pixel 34 and second pixel 36 are pixels within the projected image, first and second pixels 34/36 may be image pixels. Note that the first and second pixels 34/36 form a 1D pattern within the project image.

The reflected patterns are collected via aperture 22 and projected onto sensor array 24. Photons (which are reflected from surface 30 and correspond to first image pixel 34) illuminate the first sensor pixel 44 arrives at sensor 24 at a third time (t'0). Photons (which are reflected from surface 30 and correspond to second image pixel 36) illuminate the second sensor pixel 46 arrives at sensor 24 at a fourth time (t'1), where t'1>t'0. Note that due to the Time of Flight (TOF) of the reflected pixels, t'0>t0 and t'1>t1. For instance, as indicated by FIG. 3, photon receiver 20 is a distance of Z away (along the z-axis) from surface 30. Thus, Z represents the range or depth of the target or projection surface 30. The TOF between surface 30 and photon receiver 20 is approximately c/Z, where c is the speed of light (approximately a foot per nanosecond). By successive measurements and the application of photogrammetry methods, the effect of this TOF delay may be accounted for. Additionally, the TOF is approximately the same for both photon beams, rays, or patterns and may be factored out.

The two reflected photon patterns (corresponding to image pixels 34 and 36) illuminate at least two sensor pixels (44 and 46 respectively) in a pixel array of sensor 24. Because the pixels that are illuminated in the sensor array of sensor 24 sense or detect the reflected image pixels 34/36, the illuminated pixels may be sensor pixels. Accordingly, at t=t'0, the reflected ray from first image pixel 34 strikes corresponding first sensor pixel 44. At t=t'1, the reflected ray from second image pixel 36 strikes corresponding second sensor pixel 46.

The two illuminated sensor pixels 44/46 in sensor 24 are displaced by a sensor pixel displacement P due to the scanning of photon transmitter 10. Displacement arrow 28 shows the direction of the sensor pixel displacement. Note that the scanning direction of scanning arrow 38 is opposing the direction of sensor pixel displacement of displacement arrow 28.

Figure 4:
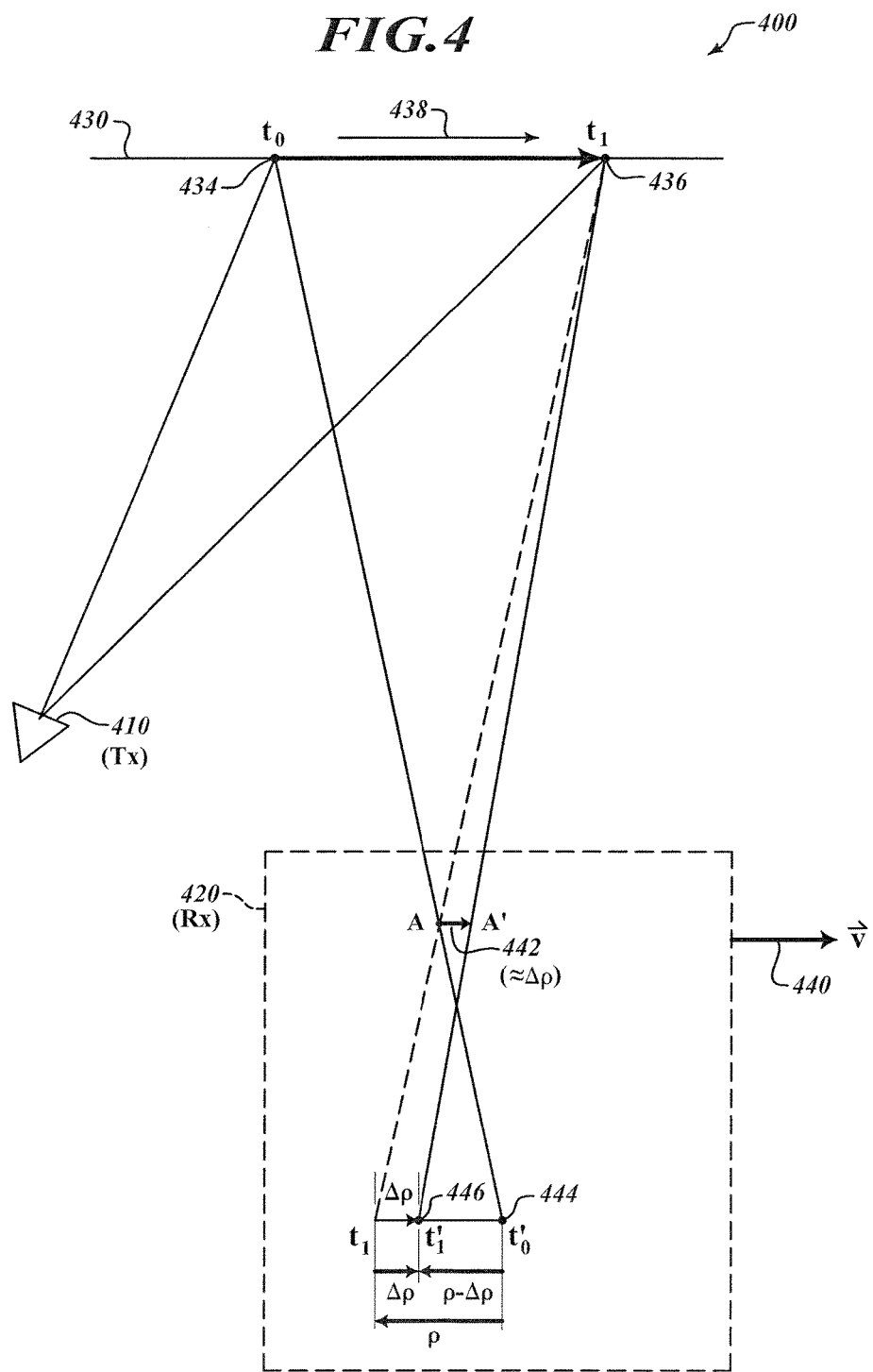
FIG. 4 illustrates an exemplary embodiment of a system, wherein the motion of the photon receiver, relative to the projection surface is parallel with and in the same direction as the scanning direction.

FIG. 4 illustrates an exemplary embodiment of a system 400, wherein the motion of the photon receiver 420, relative to the projection surface 430 is parallel with and in the same direction as the scanning direction. System 400 may include similar features, components, or functionality of system 100 or system 2 of FIGS. 1A-3. For instance, system 400 includes photon transmitter 410 and photon receiver 420 and may be a sequential-pixel projection system.

The scanning direction in system 400 is represented by scanning arrow 438. The direction of the motion of the photon receiver 420, relative to the projection surface 430 (of a target or object) is represented by the velocity vector 440. Velocity vector 440 is approximately parallel with and in the same direction of scanning arrow 438. Accordingly, the view shown for system 400 in FIG. 4 is similar to that of system 2 shown in FIG. 3, except for the relative motion between projection surface 430 and photon receiver 420.

At time t0, first image pixel 434 is reflected from the projection surface 430 of a target or object. At time t'0, the reflected ray from first image pixel 434 strikes a first sensor pixel 444. Note that the position of the aperture of photon receiver 420 at t=t0 is at A. At time t1, second image pixel 436 is reflected from projection surface 430. At time t'1, the reflected ray from second image pixel 436 strikes a second sensor pixel 446. Note that due to photon receiver's 420 translation, as indicated by velocity vector 440, relative to projection surface 430, and in the same direction as the scanning direction 438, the position of the aperture at t'1 is at A'. Thus, the position of the aperture is shifted a distance ΔP in the direction of the velocity vector 440, as shown by the arrow 442.

The hashed line shows the scattered (or reflected) beam from the second image pixel 436 if no relative motion between the photon receiver 420 and the projection surface 430 occurred (such as the case of system 300 of FIG. 3). However, due to the relative motion, the sensor pixel displacement between first sensor pixel 444 and second sensor pixel 446 is shortened by ΔP, such that the sensor pixel displacement is shortened to P−ΔP. Thus, the net effect of relative motion in the same direction as the scanning direction is that an observer of image data generated by the sensor pixels of the photon receiver 420 would observe a shortening, or contraction, of the dimension, along the scanning direction, within the image data. Note that the shortening or contracting effect is greater at greater relative velocities, and occurs at both relativistic and non-relativistic velocities.

Figure 5:
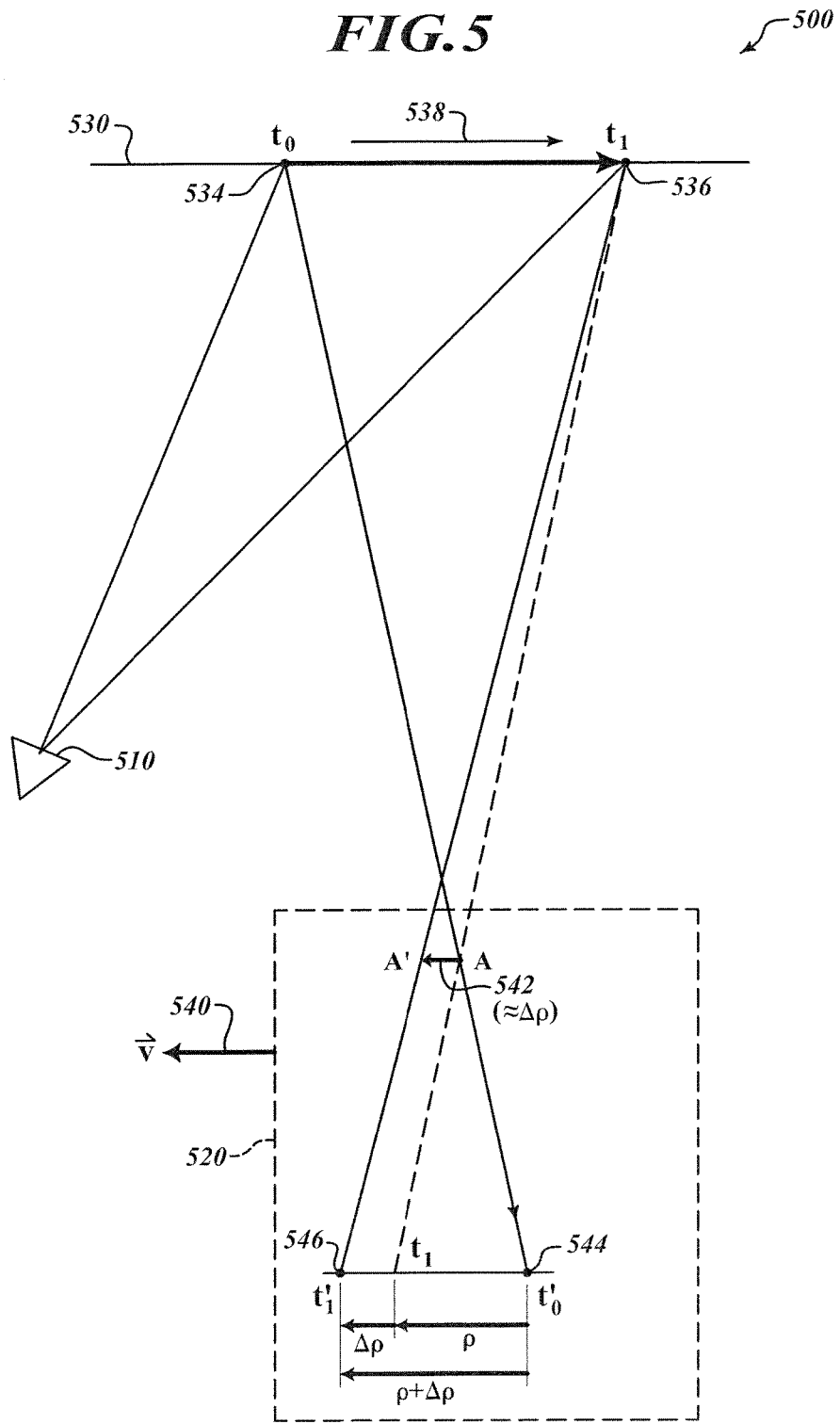
FIG. 5 illustrates an exemplary embodiment of a system, wherein the motion of the photon receiver, relative to the projection surface is parallel with and in the opposite direction as the scanning direction.

FIG. 5 illustrates an exemplary embodiment of a system 500, wherein the motion of the photon receiver 520, relative to the projection surface 530 is parallel with and in the opposite direction as the scanning direction. The scanning direction is represented by scanning arrow 538. The direction of the motion of the photon receiver 520, relative to the projection surface 530 is represented by the velocity vector 540. Velocity vector 540 is approximately parallel with and in same direction of scanning arrow 538. System 500 may include similar features, components, or functionalities, as to that of system 400 of FIG. 4, or other systems discussed herein For example, system 500 includes photon transmitter 510 and photon receiver 520. System 500 is similar further similar to system 400, except for the relative motion between projection surface 530 and photon receiver 520 is in the opposite direction as that of system 400.

At time t0, first image pixel 534 is reflected from projection surface 530. At time t'0, the reflected ray from first image pixel 534 strikes a first sensor pixel 544. Note that the position of the aperture of photon receiver 520 at t=t0 is at A. At time t1, second image pixel 536 is reflected from projection surface 530. At time t'1, the reflected ray from second image pixel 536 strikes a second sensor pixel 546. Note that due to photon receiver's 520 translation, as indicated by velocity vector 540, relative to projection surface 530, and in the opposite directions as the scanning direction 538, the position of the aperture at t'1 is at A'. Thus, the position of the aperture is shifted a distance $\Delta P$ in the direction of the velocity vector 540, as shown by the arrow 542.

The hashed line shows the scattered beam from the second image pixel 536 if no relative motion between the photon receiver 520 and the projection surface 530 occurred (such as the case of system 2 of FIGS. 2-3). However, due to the relative motion, the sensor pixel displacement between first sensor pixel 544 and second sensor pixel 546 is increased by $\Delta P$, such that the sensor pixel displacement is increased to P+$\Delta P$. Thus the net effect of relative motion in the opposite direction as the scanning direction is that an observer of image data generated by the sensor pixels of the photon receiver 520 would observe an elongation (or stretching) of the dimension, along the scanning direction, within the image data. Note that the elongations effect is greater at greater relative velocities, and occurs at both relativistic and non-relativistic velocities.

Figure 6:
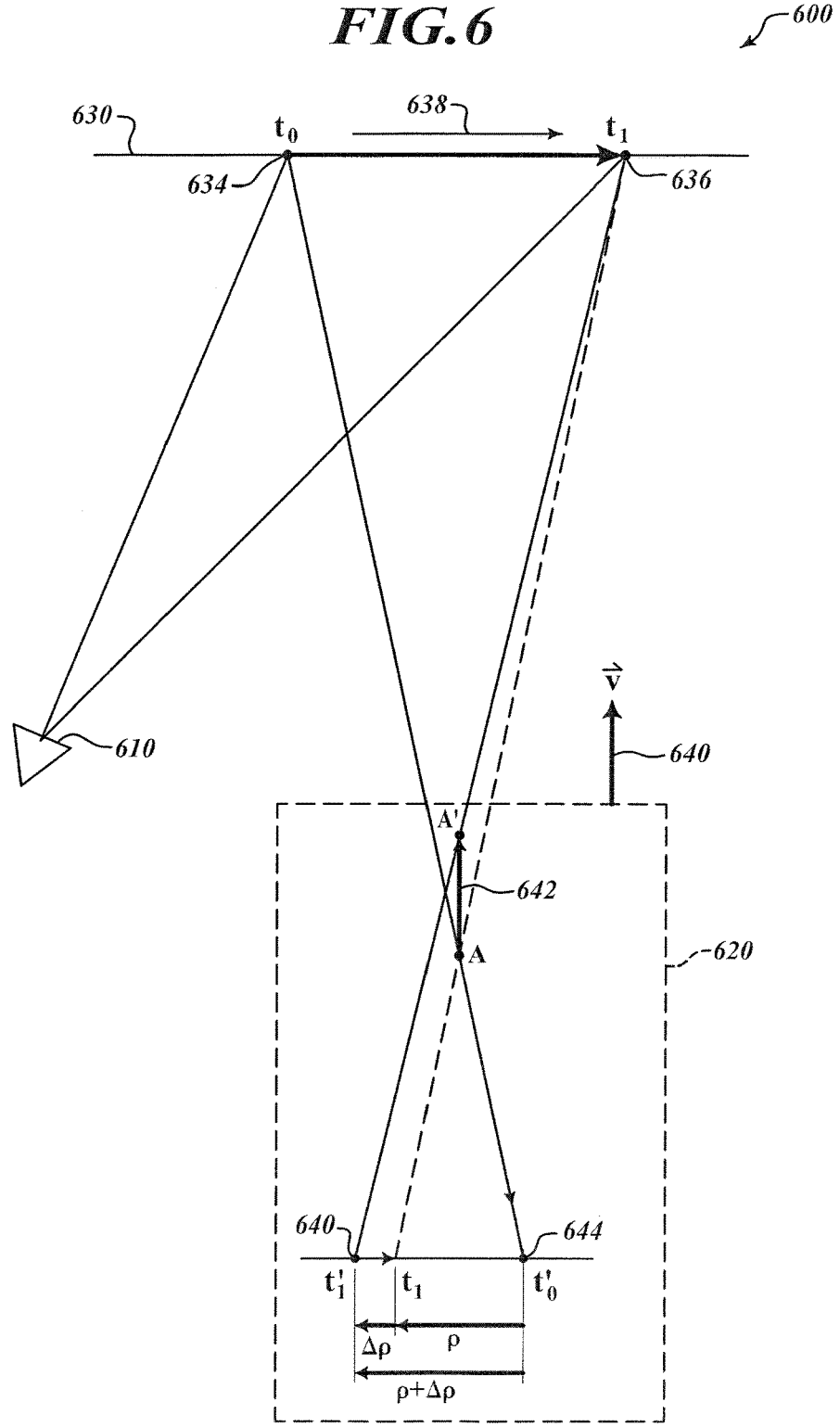
FIG. 6 illustrates an exemplary embodiment of a system, wherein the motion of the photon receiver, relative to the projection surface is orthogonal to the scanning direction.

FIG. 6 illustrates an exemplary embodiment of a system 600, wherein the motion of the photon receiver 620, relative to the projection surface 630 is orthogonal to the scanning direction. System 600 may be similar to the other systems discussed herein. For instance, system 600 includes photon transmitter 610 and photon receiver 620.

The scanning direction is represented by scanning arrow 638. The direction of the motion of the photon receiver 620, relative to the projection surface 630 is represented by the velocity vector 640. Velocity vector 640 is approximately orthogonal to the direction of scanning arrow 638. As shown in FIG. 6, the photon receiver 620 is being translated toward the projection surface 630. System 600 is similar to system 2 of FIGS. 2-3, except for the relative motion between projection surface 630 and photon receiver 620.

At time t0, first image pixel 634 is reflected from projection surface 630. At time t'0, the reflected ray from first image pixel 634 strikes a first sensor pixel 644. Note that the position of the aperture of photon receiver 620 at t0 is at A. At time t1, second image pixel 636 is reflected from projection surface 630. At time t'1, the reflected ray from second image pixel 636 strikes a second sensor pixel 646. Note that due to photon receiver's 620 translation toward the projection surface 630, as indicated by velocity vector 640, relative to projection surface 530, the position of the aperture at t'1 is at A'. Thus, the position of the aperture is shifted in the direction of the velocity vector 640, as shown by the arrow 642.

The hashed line shows the scattered beam from the second image pixel 636 if no relative motion between the photon receiver 620 and the projection surface 630 occurred (such as the case of system 2 of FIGS. 2-3). However, due to the relative motion, the sensor pixel displacement between first sensor pixel 644 and second sensor pixel 646 is increased by $\Delta P$, such that the sensor pixel displacement is increased to P+$\Delta P$. Note that $\Delta P$ in FIG. 6 may be significantly smaller than the $\Delta P$ in FIG. 4 or 5, where the scanning direction is parallel to the direction of the relative velocity. Thus the net effect of relative motion in a direction that is orthogonal to the scanning direction (and towards the projection surface 630) is that an observer of image data generated by the sensor pixels of the photon receiver 620 would observe an elongation (or stretching) of the dimension, along the scanning direction, within the image data. For similar reasons, when photon receiver 620 is being translated away from the projection surface 630, the corresponding dimension in the image data with be shortened or contracted. Note that FIG. 6, as with other figures discussed herein may not be to scale. For instance, $\Delta P$, shown in FIG. 6 may be smaller than appears to other features.

Figure 7:
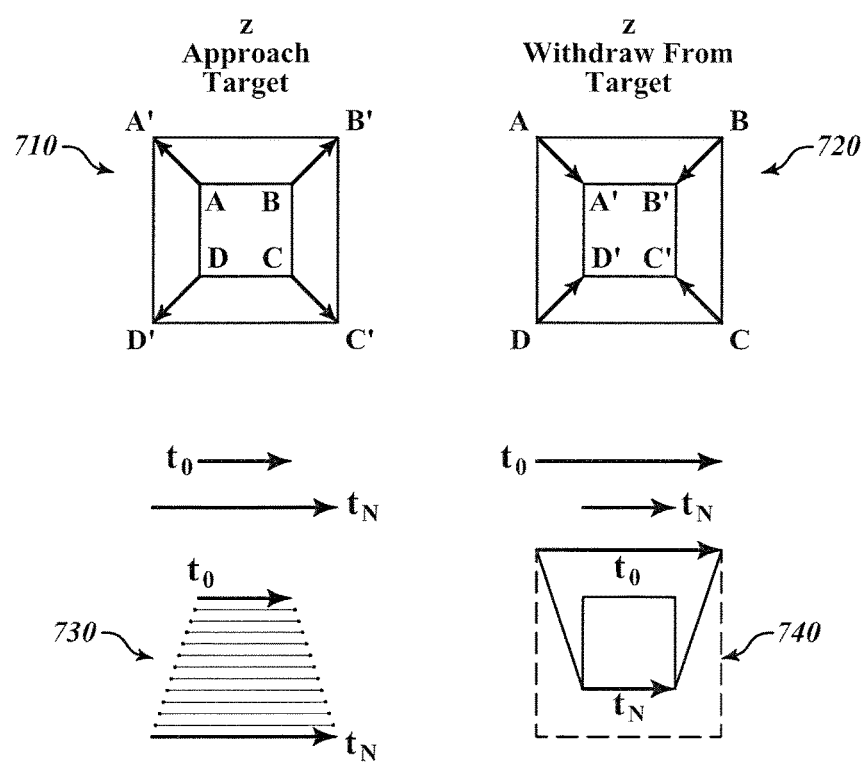
FIG. 7 illustrates image distortion due to relative motion along the z-axis between the projection surface and the observer for traditional projection systems and for sequential pixel projection systems.

FIG. 7 illustrates image distortion due to relative motion along the z-axis (as defined by the coordinate systems in FIGS. 2-3) and between the projection surface and the observer for traditional projection systems and for sequential pixel projection systems. As used herein, a traditional projection system is a system that projects each image pixel within a single frame (a single time slice) simultaneously, such as a film projector. The photon receiver in a traditional projection system may include a global shutter, such that each pixel within a frame is sensed at the same time and at approximately the same location. In contrast, a pixel-sequential projector system, as discussed in the various embodiments herein, including, such as but not limited to the systems discussed in conjunction with FIGS. 1A-6.

View 710 shows a square two-dimensional (2D) image beacon, as it appears in two frames projected by a traditional projection system with the observer traveling in a direction that is substantially orthogonal to and towards the projection surface. As observed by such an observer, the corners of a first frame projected at t=t0, are shown as ABCD. As observed by the observer, the corners of a second frame projected at t=t1, where t1>t0, are shown as A'B'C'D'. As shown in view 710, each dimension of the two dimensions is elongated in the later frame, as compared to the earlier frame when the observer is travelling towards the projection surface.

View 720 shows the square 2D image beacon, as it appears in two frames projected by a traditional projection system with the observer traveling in a direction that is substantially orthogonal to and away from the projection surface. As observed by such an observer, the corners of a first frame projected at t=t0, are shown as ABCD. As observed by the observer, the corners of a second frame projected at t=t1, where t1>t0, are shown as A'B'C'D'. As shown in view 720, each dimension of the two dimensions is shortened in the later frame, as compared to the earlier frame when the observer is travelling away from the projection surface. Note that, in each of views 710 and 720, each of the pixels across the separate frames become blurred due to the observer's velocity and the distortion of the dimensions of the image beacon.

View 730 shows the square 2D image beacon, as it appears projected by a sequential-pixel projector system, as discussed herein, with the observer traveling in a direction that is substantially orthogonal to and towards the projection surface, similar to that of view 710. The combination of each projected image pixel generates a pattern on the projection surface, as shown in at least view 730. A photon receiver detected the reflected pattern. As discussed throughout, the detected pattern is distorted due to relative motion between the projection surface and the photon receiver employed to detect the reflected pattern. Because a sequential-pixel projector system is used, the distortion is similar to that discussed in the context of system 600 of FIG. 6. Each horizontal line in the image beacon is scanned left to right. The horizontal lines are scanned from top to bottom, such that the uppermost line is scanned from left to right first and the bottommost line is scanned left to right last. As shown in view 730, and discussed in the context of at least system 600 of FIG. 6, the dimension along at scanning direction is elongated as the observer translates towards the projection surface, so that the square beacon is distorted into a trapezoidal beacon. Note that the speed of the observer's approach can be determined based on skewness of the trapezoid.

View 740 shows the square 2D image beacon, as it appears projected by a sequential pixel projector system with the observer traveling in a direction that is substantially orthogonal to and away from the projection surface, similar to that of view 720. Similar to the system employed to generate view 730, each horizontal line in the image beacon is scanned left to right. The horizontal lines are scanned from top to bottom, such that the uppermost line is scanned from left to right first and the bottommost line is scanned left to right last. As shown in view 740, and discussed in the context of at least system 600 of FIG. 6, the dimension along at scanning direction is shortened as the observer translates away from the projection surface. However, the trapezoidal beacon appears upside down to the trapezoidal beacons in view 730. Again, the speed of the translation of the observer can be determined based on skewness of the trapezoid. Furthermore, the direction (towards or away from) of the observer's translation can be determined based on whether the dimension along the scanning direction is elongated or shortened during the projection of the beacon. Accordingly, the z-component (into and out of the page) may be determined based on the distorted shape of the image beacon, when a sequential pixel projector system is employed.

Figure 8:
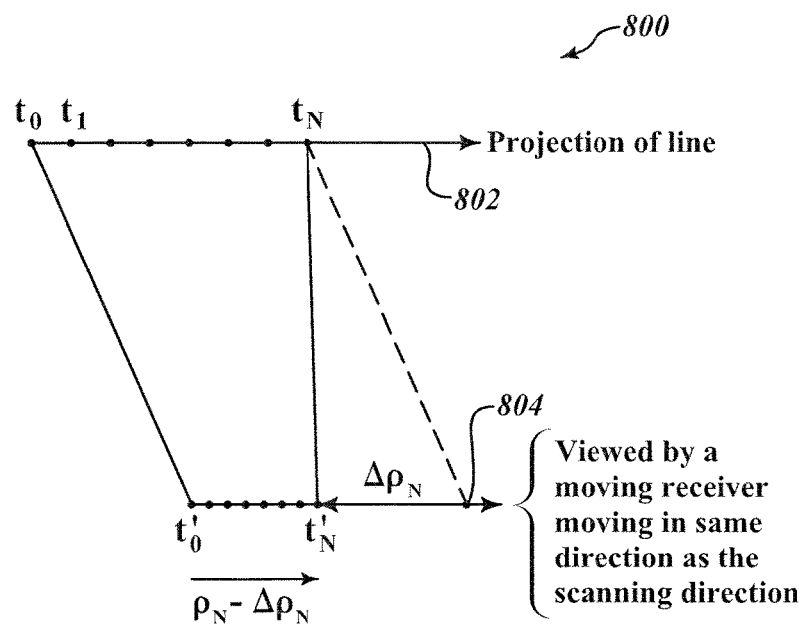
FIG. 8 illustrates line distortion due to relative motion between the projection surface and the observer, along the scanning direction, for a sequential pixel projection system.
Figure 8:
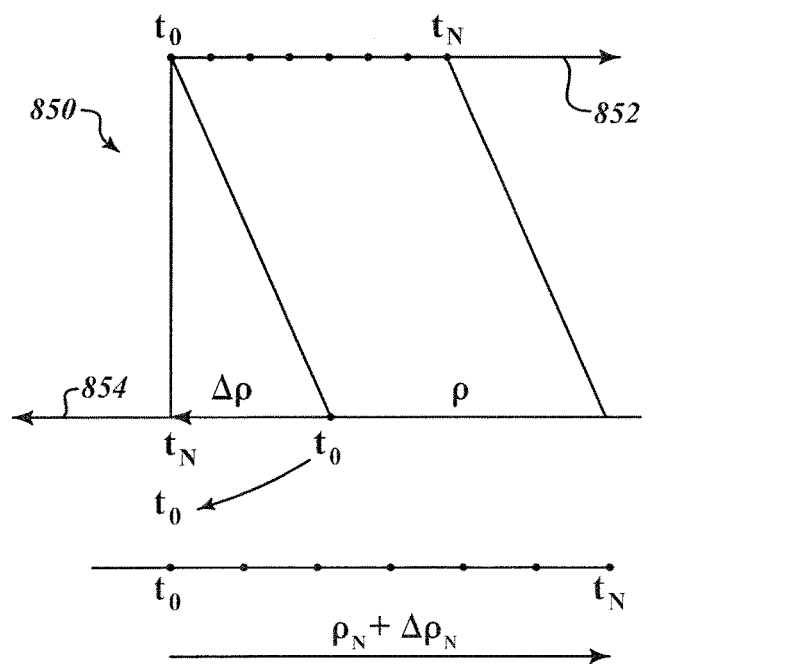

FIG. 8 illustrates line distortion due to relative motion between the projection surface and the observer, along the scanning direction, for a sequential-pixel projection system, such as but not limited to the various embodiments described herein. One or more photon transmitters transmit one or more scanning light beams onto a projection surface. The scanning light beams generate a pattern on the projection surface. In the embodiment shown in FIG. 8, the pattern is a 1D pattern (a scan line). In other embodiments discussed throughout, the generated pattern may be a 2D pattern. In at least one embodiment, the generated pattern may be a 3D pattern.

As discussed throughout, a photon receiver detects the reflected pattern. Relative motion between the projection surface and the photon receiver generates a distortion in the detected pattern. Such a distortion may include at least one of a spatial elongation or contraction of the detected image in one or more dimensions of the pattern.

In view 800, the relative motion is parallel with and in the same direction as the scanning direction, similar to that shown in system 400 of FIG. 4. Thus, view 800 represents the view of the sensor pixels when sensed or detected by a photon receiver translating in the same direction as the scanning direction. Arrow 802 shows the scanning directions (and thus the scanning axis). Arrow 804 shows the direction of the velocity of the observer or photon receiver.

In view 850, the relative motion is parallel with and in the opposing direction as the scanning direction, similar to that shown in system 500 of FIG. 5. Thus, view 850 represents the view of the sensor pixels when sensed by a photon receiver translating in the opposite direction as the scanning direction. Arrow 852 shows the scanning direction (and thus the scanning axis). Arrow 854 shows the direction of the velocity of the observer or photon receiver.

As discussed previously in the context of FIG. 4, the distance between sequential sensor pixels will appear bunched-up, foreshortened, or contracted for the relative motion of view 800. Similarly, the distance between sequential sensor pixels will appear "stretched out" or elongated for the relative motion of view 850. Thus, a detected elongation or contraction of the reflected pattern may be employed to determine a direction and magnitude of the relative velocity between the projection surface and the photon receiver that detects the reflected pattern.

Note that these distortion effects occur when there is a significant velocity vector component along the direction of scanning. Here, significant velocity requires that the observable pixel shift is at least one pixel in the time elapsed during the scan, e.g. one arc minute rotation in a typical high-definition camera, in about 20 microseconds.

For consecutive horizontal lines, when the projection system scans back and forth (left to right on a first line and then right to left on the next line below) successive scan lines will be alternatively foreshortened and elongated. The velocity component of the observer's relative motion, along the scanning direction, may be determined based on the difference of the alternating elongated and shortened lines. For instance, as shown in FIG. 8, the x-component of the velocity may be determined. As discussed below, when scanning is performed in more than a single direction, the y-component of the velocity may be determined based on the difference in the other dimension. As noted, the difference between elongation and foreshortening is independent of any elongation and foreshortening due to velocity along the z-axis. For example, the foreshortening and elongation in view 800 and 850 is independent of the elongation and foreshortening in views 730 and 740 of FIG. 7. Thus, the velocity of the observer, relative to the projection screen along each of the x, y, and z axes may be determined based on the elongation and foreshortening of a sensed beacon image, as compared to the projected beacon image. Accordingly, the various embodiments may employ a beacon image to determine in ego-motion applications.

Figure 9:
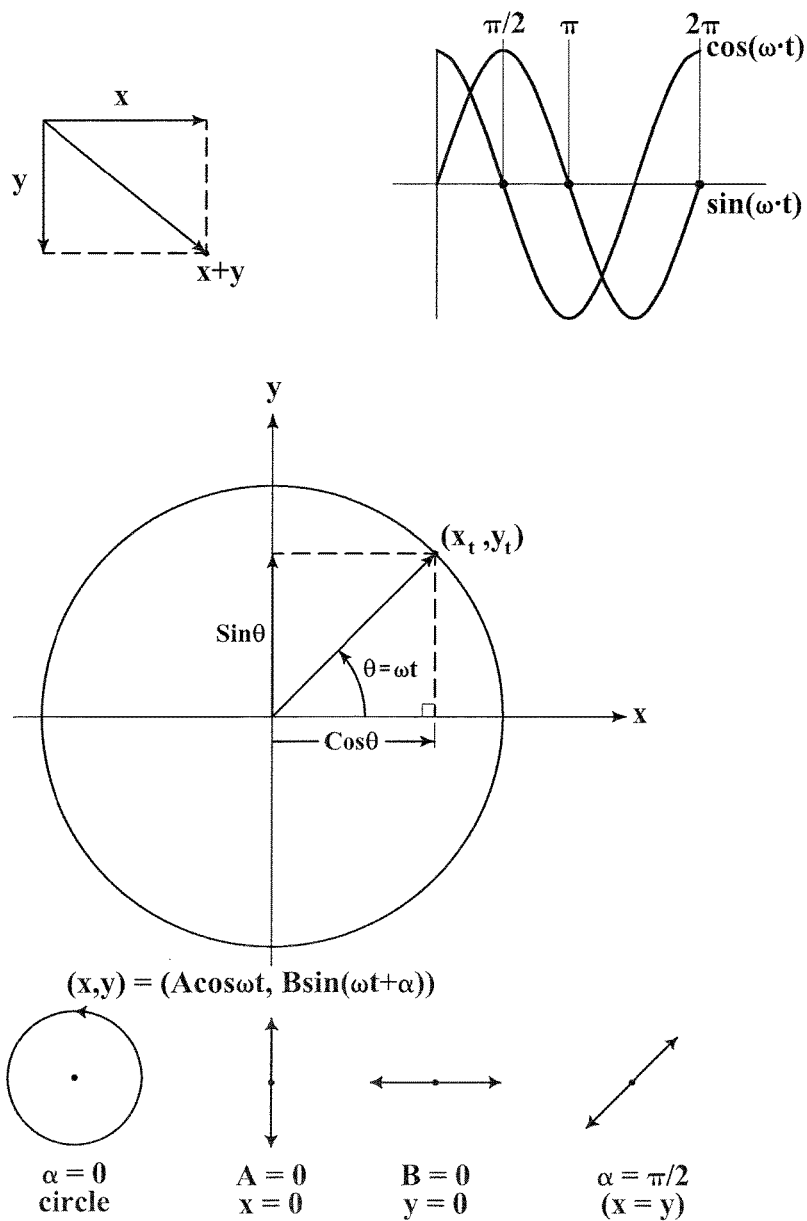
FIG. 9 illustrates embodiments of Lissajous projections employed to provide two-dimensional (2D) beacon images projected by a sequential pixel projection system.

FIG. 9 illustrates embodiments of Lissajous projections employed to provide two-dimensional (2D) beacon images projected by a sequential-pixel projection system. To generate a Lissajous projected beacon signal or image, two mirrors may scan at high speeds and in orthogonal directions by rotating about orthogonal axis, such as the x and y-axis respectively. The rotation about the y-axis may be offset from the rotation about the x-axis, by a phase angle alpha. The high-speed scan direction may be adjusted in any orthogonal axis.

In some embodiments, generating a beacon image that maximizes (or at least increases) the elongation/shortening distortion effect increases the accuracy and precision when determining the velocity of the photon receiver. To increase the elongation/shortening effect the high-speed scan direction may be adjusted to match that of the observer. A feedback loop between the photon receiver and the photon transmitter may be employed to adjust the high speed scan direction to maximize the distortion effect. For instance, a feedback signal generated by the observer (photon receiver) may be employed. It other embodiments, as discussed in the context of at least FIG. 10A, a beacon image may be rotated over time in a known pattern to determine the velocity of the observer.

Figure 10A:
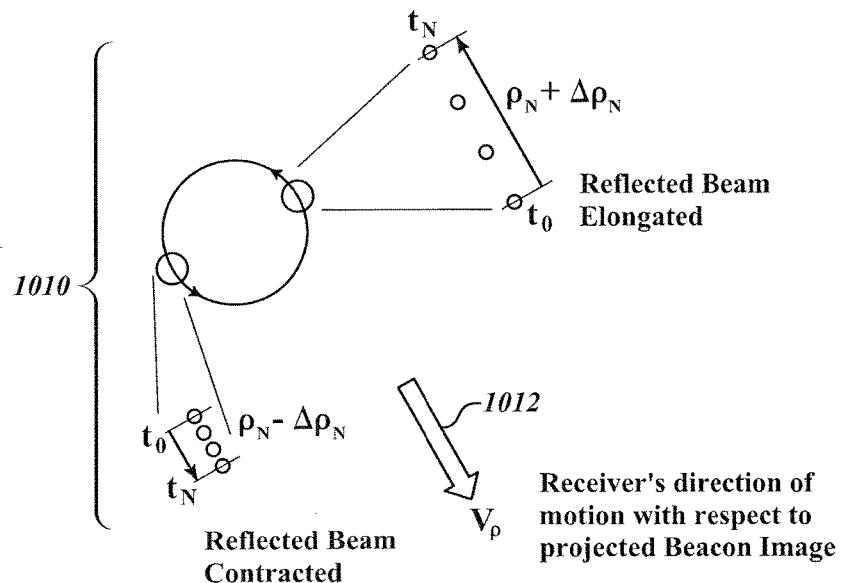
FIG. 10A illustrates circular and rotating beacon images that are consistent with the various embodiments disclosed herein.
Figure 10A:
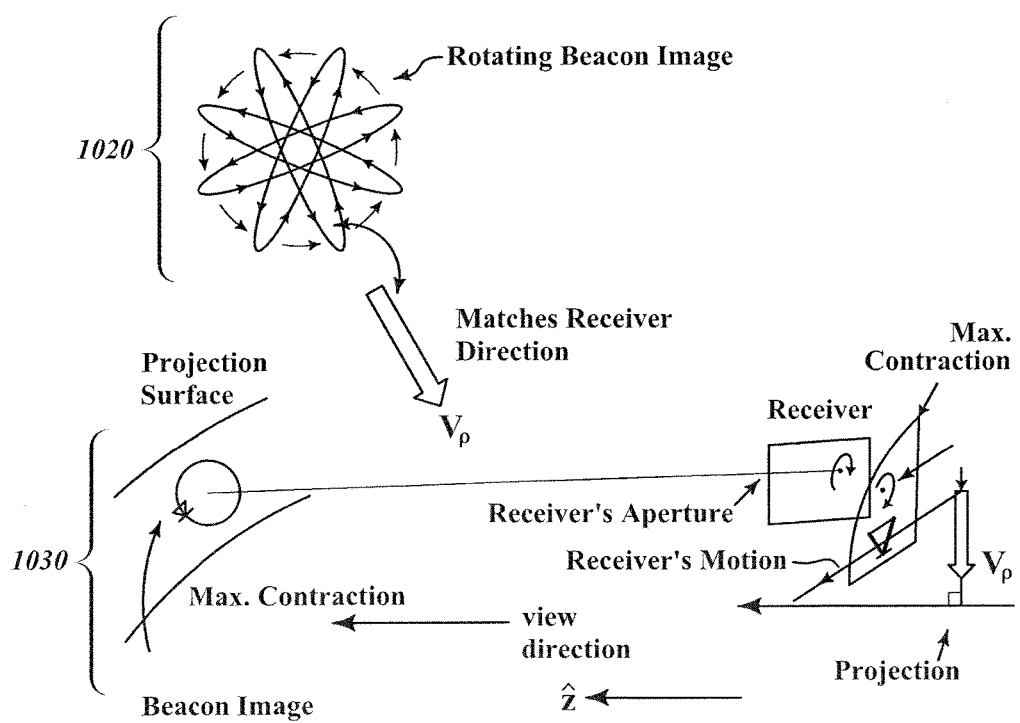

FIG. 10A illustrates circular and rotating beacon images that are consistent with the various embodiments disclosed herein. In view 1010, a circular beacon image is projected (a Lissijous pattern when alpha=0), as discussed in the context of FIG. 9. The observing photon receiver may inspect the pixel patterns in a fast circular projection. The most elongated and most contracted point on the circle are used to find the direction and magnitude of the velocity of the observer (the photon receiver). Arrow 1012 shows the direction of the observer's velocity with respect to the observed image reflected from the target. As shown in view 1010, the maximum/minimums elongations/contractions of the reflected patterns occur along the lines tangential/parallel to the velocity vector or the direction of flight of the observer, indicated by arrow 1012.

In view 1020, a rotating beacon image is projected via a Lissajous pattern. As shown in view 1020, the beacon image rotates counter-clockwise, creating a "spirograph"-like beacon image. As shown in view 1030, the observer will see maximum contraction of the reflected sequential pixels on the point in the circle (traced out by the rotating beacon) where a tangential line is parallel and the rotation vector of the beacon is parallel to the velocity vector VP of the observer. VP does not include any velocity component in the Z dimension. According, VP lies in the plane that is orthogonal to the observer's viewing direction substantially defined by the z-axis.

Synchronously Scanning Photon Receiver

A synchronously scanning photon receiver may be employed in any of the various embodiments of sequential-pixel projection systems discussed herein. For instance, photon receiver 120 of system 100 of FIG. 1A may be a synchronously scanning photon receiver. A synchronously scanning photon receiver may be a camera system that includes a rolling shutter. The rolling shutter may closely follow and be synchronized with, a progressive laser line scan, projected by any of the photon transmitters discussed herein, including but not limited to photon transmitter 110 of system 100 of FIG. 1A.

In such embodiments, a photon transmitter may project successive image pixels with individual pixel strobe flashes of only a few nanoseconds duration each, enabling the fast and nearly instantaneous detection and acquisition (by the photon receiver) of 3D fiducial point coordinates of an object or targetin high-speed motion, such as target 130 of FIG. 1A. Furthermore, the acquisition of key anchor 3D points on the image pixels sequentially projected and illuminating 3D surfaces is enabled. The latter is particularly useful when there are no obvious marker points (low contrast and/or sparse structures one the projection surfaces on the target). Because both illumination (via the photon transmitter) and camera data acquisition (via photon receiver) is completed within microseconds of each scan line, a sub-millisecond 3D motion detection and acquisition results. Additionally, the decreased amount of time to determine the motion of the target enables various machine vision applications as discussed below.

A pixel strobe illumination (via the photon transmitter) may be coupled with an ultra-short rolling shutter integration time (via the photon receiver) for successive scanned rows. The exposure period for each scanned row will start and end at times slightly offset from the neighboring rows. In various embodiments, a very short exposure time (~microseconds) is set for each row via the rolling shutter. Furthermore, the scanning of a row is synchronized and aligned to illuminated spots in the field of view (FOV) that correspond with sensor pixels in that row in the sensor (included in the photon receiver). By synchronizing the scanning of a row and the exposure of the corresponding sensor row (via the rolling shutter), a significantly enhanced signal-to-noise ratio is achieved.

In one exemplary embodiment, the sensor includes 1000 rows of pixels. Each row is sequentially illuminated for approximately 10 microseconds (only a single sensor row is illuminated at a time via the shutter). Thus, a single frame is projected in approximately 10 milliseconds, enabling a frame rate of well over 60 frames per second (fps). Due to the rolling shutter in the photon receiver, the ambient light is shuttered out 99.9% of the time (increasing the signal to noise ratio), even before any narrow band filtering is applied to the aperture optics or to individual sensor pixel. Thus, a low cost CMOS sensor array may be included in the photon receiver. The rolling shutter may be set to a short exposure (on the order of microseconds per row or milliseconds per frame), combined with a synchronized laser line scan to result in a very efficient outdoor 3D sensor.

Figure 10B:
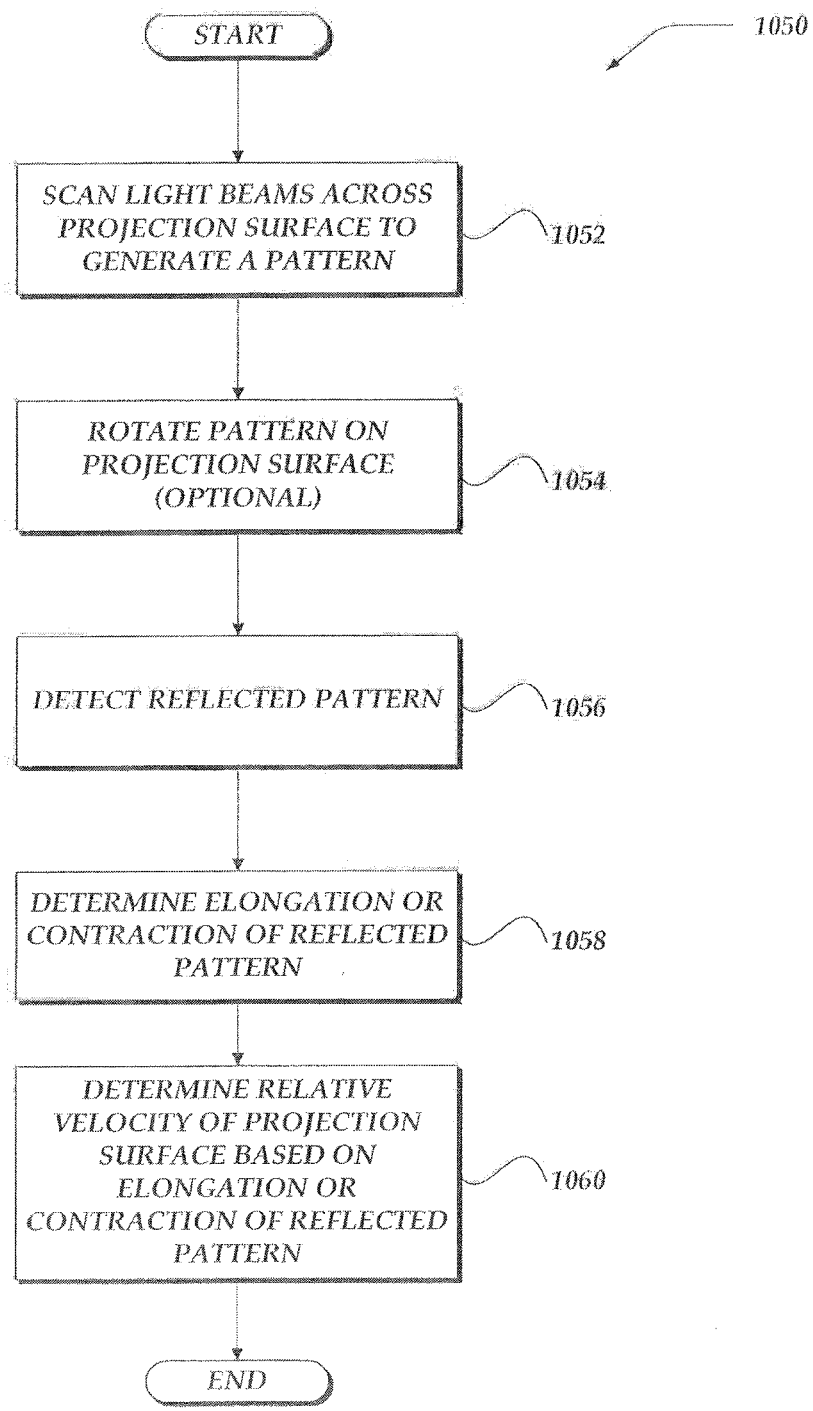
FIG. 10B shows a logical flow diagram generally showing one embodiment of a process for detecting ego-motion that is consistent with the various embodiments disclosed herein.

FIG. 10B shows a logical flow diagram generally showing one embodiment of a process for detecting ego-motion that is consistent with the various embodiments disclosed herein. Detecting and classifying ego-motion for an observer may be employed by the various embodiments discussed throughout, including but not limited to the various embodiments in conjunction with at least FIGS. 3-10A. For instance, an observer employ one or more photon transceivers to determine a relative velocity between the observer and one or more projection surfaces. In at least one embodiment, the observer may employ one or more photon receivers to determine a relative velocity between the observer and one or more photon transceivers.

Process 1050 may determine the relative velocity between an object and one or more photon receivers, as discussed throughout, including at least in the context of FIGS. 3-10A. After a start block, process 1050 begins at block 1502, where one or more lights beams are scanned across one or more projection surfaces of the object. The one or more scanning light beams may generate a scanning pattern on the projection surface. Scanning one or more light beams across a projection surface may include transmitting one or light beams towards the projection surface, such as discussed in the context of at least block 52 of FIG. 2A. For instance, one or more photon transmitters may be employed to scan the one or more light beams across the projection surface.

The pattern may be a 1D, 2D, or 3D pattern. The scanning pattern may be a 1D line, or 2D patterns such as but not limited to a circle, such as the circle of view 1010 of FIG. 10A. At optional block, the pattern may be rotated. For instance, the scanning pattern may be rotated on projection surface as discussed in the context of at least view 1020 of FIG. 10A. At block 1056, the reflected pattern is detected. The pattern may be reflected from the projection surface. Accordingly, detecting the reflected pattern at block 1056 may include detecting one or more light patterns reflected from the projection surface, such as discussed in the context of at least 54 of FIG. 2A. Thus, one or more photon receivers may be employed to detect the reflected pattern.

At block 1058, at least one of an elongation or a contraction of the reflected pattern is determined. For instance, at least FIGS. 4-8 and 10A demonstrate the elongation or contraction of a reflected scanning pattern. At block 1060, a relative velocity of the projection surface is determined. The determination of the relative velocity may be based on the elongation or contraction of the reflected pattern, determined at block 1058. The relative velocity may include at least one of a direction and/or a magnitude. Accordingly, the relative velocity may be a vector quantity. Process 1050 may terminate and/or return a calling process.

Dual Layer 3D Positioning Photon Receiver

Figure 11A:
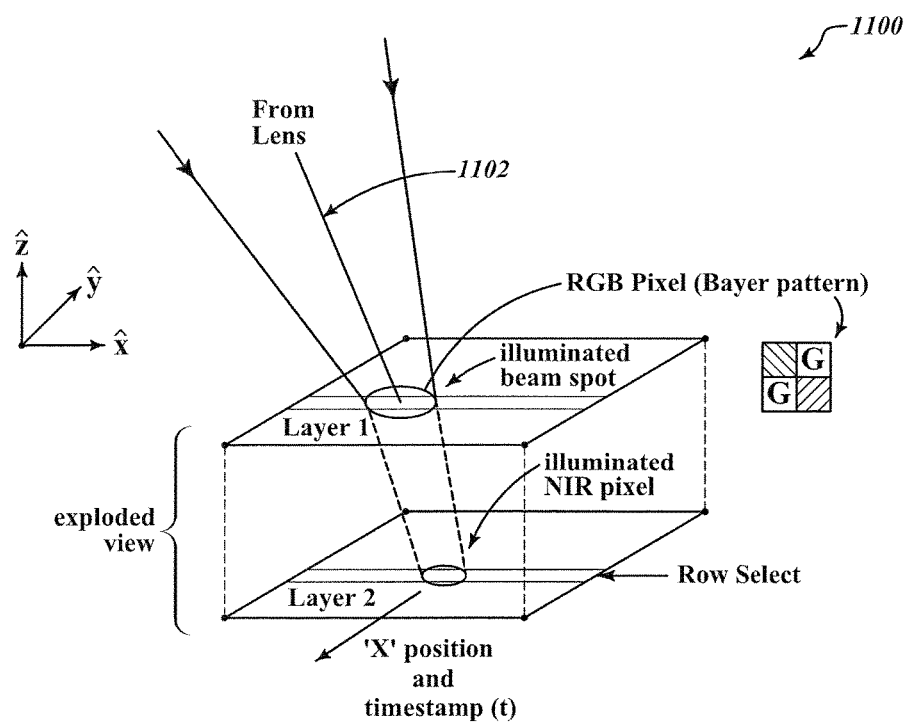
FIG. 11A illustrates a dual-layer fast three-dimensional positioning photon receiver that is consistent with the various embodiments disclosed herein.

FIG. 11A illustrates a dual-layer fast three-dimensional positioning photon receiver 1100 that is consistent with the various embodiments disclosed herein. Photon receiver 1100 may be employed in the various sequential-pixel projection systems discussed herein. Photon receiver 1100 includes an upper sensor layer and a lower sensor layer (upper and lower refer to a displacement along the z-axis, where the upper layer would be closer to the target and/or projection surface.) The view shown in FIG. 11A may be an exploded view of the separation of the upper and lower sensor arrays. Each of the upper and lower layers includes a separate sensor array. As discussed throughout, the various embodiments of photon transmitters may include one more visible photon sources (such as but not limited to a red (R) laser, a green (G) laser, and a blue (B) laser) and/or one or more non-visible photon sources (such as but not limited to a NIR laser).

As shown in FIG. 11A, a light beam 1102 is received from the optical system (not shown in FIG. 11A) of the photon receiver 1100. Light beam 1102 may be included in a reflected pattern. The light beam illuminates the upper and lower sensor array layers. The received beams generate an upper illuminated spot on the upper sensor array and a lower illuminated spot on the lower sensor array.

The upper sensor layer may include a Red-Green-Blue (RGB) photon sensor array. The lower layer sensor may be a NIR sensor array. Accordingly, photon receiver 1100 may include a dual-layer RGB/NIR array stacked sensor. Thus, the combination of the upper and lower sensor array may be employed for layer may be employed in color-3D applications.

The stacked sensor is enabled to sense, detect, and record "pinpricks" or "tracer bullets," (or tracer photon beams, which are described in U.S. patent application Ser. No. 14/823,668, entitled THREE-DIMENSIONAL TRIANGULATION AND TIME-OF-FLIGHT BASED TRACKING SYSTEMS AND METHODS, filed on Aug. 11, 2015, the contents of which are hereby incorporated by reference in the entirety. The tracer photon beams may be transmitted by the photon transmitter, and may include non-visible photons, such as NIR photons.

The upper RGB sensor array of photon receiver 1100 may be thinned to enable at least the partial transmittance of near-infrared beams (such as but not limited to NIR tracer beams) to the lower NIR sensor array. Accordingly, the upper RGB sensor array may be substantially transparent to NIR (~850 nm) illumination. The lower NIR array may sense the location of the target, via tracer photon beams that include one or more NIR signals (or NIR spots). Thus, the lower sensor array may be employed as a voxel decoder array. The upper sensor array may be employed as an RGB imaging array, such as in a camera.

The location, as well as a time-dependent scan trajectory progression of the projected beam and/or the target may be stored and/or recorded. For instance, a time-dependent image of the NIR spot, where the scanning beam reflects from one or more projection surfaces of the target may be recorded. The spatial location of the generated (within the NIR sensor array) signal is recorded and/or stored. An asynchronous time stamp may be included in the recording of the NIR spot data. For instance, a discrete, binary encoded time stamp with the most recent running timer value may be included in the NIR spot data. Optionally, the location of the target may be adjusted based on at least an estimated Time-of-Flight (TOF) of the tracer beam (~1 nanoseconds per foot or ~2 nanoseconds for a roundtrip of the light pattern). Alternatively, the lateral displacement of the illuminated sensor pixel may be matched in real time.

In another embodiment, a continuous signal (generated via the detection of sweeping projected beam) corresponding to the target may be tracked with high spatial and temporal resolution by photon receiver 1100. The arrival time at each location in the lower NIR sensor array is detected. For example, the sensed value for each NIR sensor pixel within the lower sensor array may be determined, to the nearest nanosecond. In such an embodiment, "super resolution" may be enabled. The trajectory of the beam on the projection surface of the target may be determined and recorded at the time that the image spot arrives. Furthermore, the reflected spot is detected at each successive pixel in the lower NIR array.

The trajectories of the target may be determined by employing trajectory estimation techniques to determine trajectory values for any intermediary points in the trajectory based on the NIR tracer beams. Intermediary trajectory points may be employed as an accurate location based on grey scale or RGB values measured at a coarser resolution.

The lower NIR array may have an anti-reflective (AR) coating to provide a narrow band pass filter. Such a filter enhances the detection of the NIR signal by removing any visible and/or background ambient light. In addition, as the NIR tracer signal is transmitted through the upper RGB sensor, the NIR signal may affect the RGB signal. Such an interference effect may be compensated for via a post-processing operation. For example, the RGB signal may be employed to record surface texture (images on the target) simultaneously, while the NIR beacon or tracer beam is employed to sense surface locations (voxels) corresponding to each RGB surface texture pixel observed. Such an embodiment provides a very accurate real time RGB+D pixel/voxel signal stream.

In various embodiments where the scanning (or sweep) direction is aligned with the direction(s) of the rows in the corresponding upper and/or lower arrays, the record for each row in the array only requires storing two values: an X value (column number) and arrival-time value for each pixel that is illuminated in the row being scanned. A fast column decoder may detect that at least one pixel in a particular column was illuminated (regardless of which row) and substantially, in real-time (or near real-time), provide the column number to the system logic included in photon receiver 1100.

The system logic (or real time software executed by one or more processors included in the photon receiver and/or the photon transmitter) may match the incoming lateral displacement with the scanning direction of the projected beam at the latest instant. A near-instantaneous triangulation may be performed by the system via software and/or hardware instantiated methods. Triangulation may be performed relatively fast by employing a pre-calculated look-up table. The look-up table may include all possible outcomes for all possible or likely input variables (one or more outgoing angles of the projected beam, one or more incoming angles of the detected beam, and the like). For instance, the look-up table may include a discrete set of real values corresponding to the relationships between the mirror positions (alpha angles) in the photon transmitter and the column numbers (beta angles) in the sensors of the photon receiver. See the incorporated U.S. patent application Ser. No. 14/823,668 for reference to alpha and beta angles of the photon transmitter and photon receiver.

In embodiments where several high velocity targets or objects are being simultaneously tracked by scanning via a photon transmitter, a selection of activated sensor pixels may serve as a filter (or mask) to the RGB read-out in the row above the RGB sensor in the layer above the NIR sensor array. In such embodiments, only a small subset of selected sensor pixels of the upper RGB sensor array are required to be read. Such a reduction in the requirement to read RGB pixels significantly reduces the RGB decode time and pixel stream bandwidth requirements.

Additionally, in embodiments where at least the upper RGB sensor array includes photodiode sensors, an active triggered exposure (via transfer gate logic) of the lower NIR sensor pixels may control triggering the corresponding upper photodiodes. Accordingly, individual RGB sensor pixels may be individually shutter controlled via triggering of the corresponding lower pixels with a tracer beam. Such shutter controlling further increases the signal to noise ratio and reduces motion blur and blooming in such a stacked sensor array system as shown in FIG. 11A.

Figure 11B:
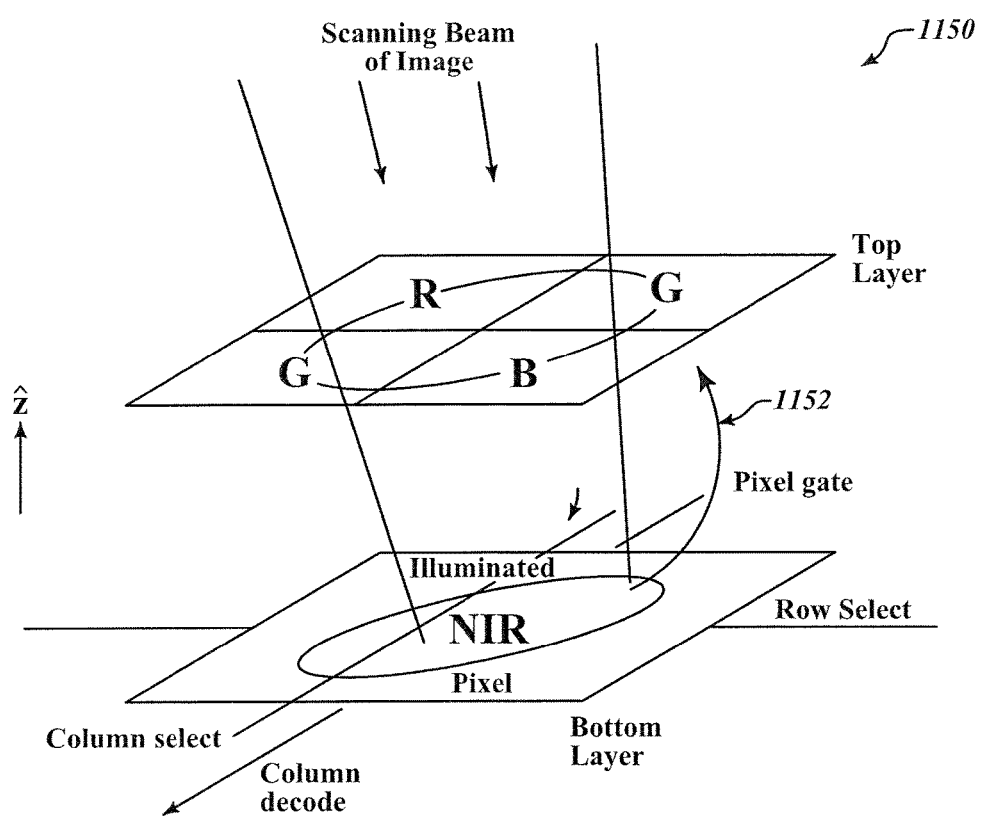
FIG. 11B shows a direct short signal path, where logic circuit connections go "upward" from NIR trigger pixels to the corresponding pixel(s) in the RGB array in the layer above for the photon receiver of FIG. 11A.

FIG. 11B shows a direct signal path 1152, where logic circuit connections between the lower and upper sensor arrays are substantially vertical (along the z-axis). The signal path may be a short-signal path. When an NIR beam triggers (or illuminates) one or more of the lower sensor pixels, a triggering signal is provided to the corresponding upper RGB sensor pixel(s) via the logic circuit connections (for instance signal path 1152). Thus, the detection of an NIR tracer bullet by one or more NIR pixels in the lower sensor array may trigger one or more corresponding upper pixels for the detection of the corresponding incoming RGB signal, which will arrive shortly thereafter. Accordingly, individual sensor pixels may be shuttered via triggering of the photodiodes.

In various embodiments, pixel selecting row and/or column registers may be included in photon receiver 1100 of FIG. 11A. Such registers may provide a mask for the row and/or column reads. Accordingly, only pixels of interest are required to be read after exposure. For instance, specific column and/or row selected values are set to "1" from "0". Such a mask enables range selection as well as ambient light suppression. Alternatively, direct epipolar light may be masked out, such as in bio-luminescence detection.

The double-decker or stacked RGB-NIR arrangement of sensor arrays in photon receiver 1100 may be employed to track both extremely accurate real-time target voxel locations and have a full RGB traditional sensor output (i.e. a true color 3D camera). The traditional RGB sensor in the top sensor array layer may be used for capturing standard 2D images using ambient light (for instance, such as a passive camera), flash illuminated photography (for instance from the photon transmitter), or video recording, as well as for RGB images generated via a scanning photon transmitter, including laser color pixel sequential scanning as discussed throughout.

A precisely known timing of each detected tracer bullet may be employed to determine precise timing for each detected RGB pixel. Such a determination may be employed to process high-speed 3D motion in color. For instance, such embodiments may be employed in 3D color LIDAR systems, and/or a laser-scanned triangulation system, as described in U.S. Pat. No. 8,430,512, entitled PHOTONJECT SCANNER PROJECTOR, issued on Apr. 30, 2013, (incorporated by reference above).

Accordingly, vertically stacking (vertical being defined by the z-axis, substantially the direction of the incoming photon beams) two sensors on top of each other provides numerous advantages. Such advantages include, but are not otherwise limited to increased spatial alignment (matching) between voxels and pixels, increased alignment between (3D tracking) image sensing elements (typically NIR) and RGB (contrast/grey-scale) visible light time integration pixels, and the traditional analog pixels found in standard CMOS cameras. Further advantages include employing the same optical elements to image both the NIR and RGB signals. In some embodiments, camera 1100 may include a color corrected optical sub-system to compensate for any optical and/or electrical cross talk or interference between the upper and the lower sensor arrays.

Figure 11C:
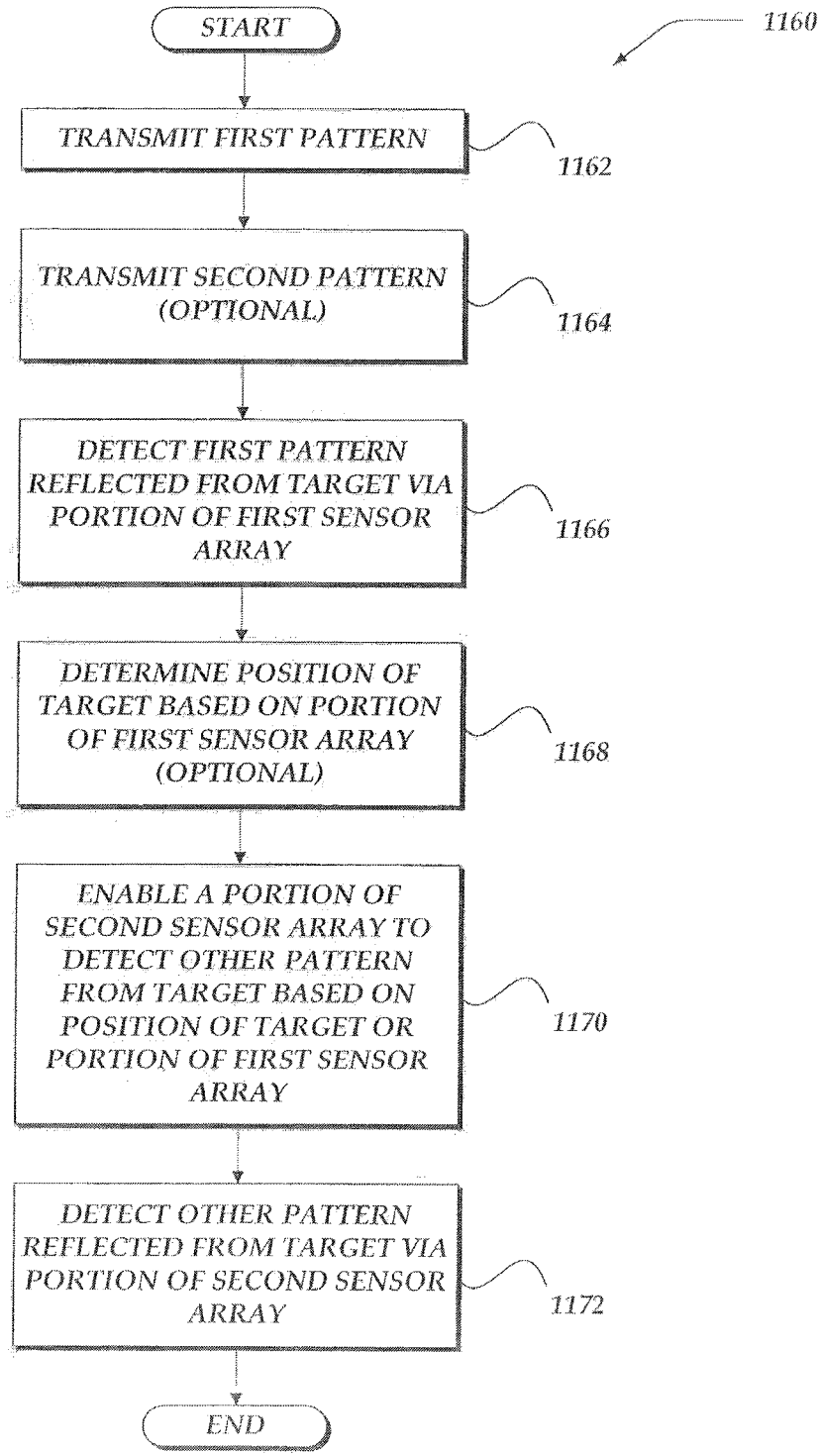
FIG. 11C shows a logical flow diagram generally showing one embodiment of a process for sensing a target that is consistent with the various embodiments disclosed herein.

FIG. 11C shows a logical flow diagram generally showing one embodiment of a process for sensing a target that is consistent with the various embodiments disclosed herein. Process 1160 may begin after a start block, at block 1162, where a light pattern is transmitted. Transmitting the first pattern at block 1162 may include transmitting one or more patterns toward a target, such as discussed in the context of at least block 52 of process 50 of FIG. 2B. One or more photon transmitters may be employed to transmit the first beam. The first beam may include one or more tracer beams, tracer bullets, pinpricks, triggering beam, or the like as discussed throughout. The first beam may include non-visible photons, such as but not limited to NIR photons. Thus, the first beam may be an NIR trigger or tracer beam. The first pattern may be employed to sense the target, determine the location of the target, or the like as discussed throughout.

At optional block 1164, a second pattern may be transmitted. The second pattern may include visible photons. The second pattern may illuminate the target to image the target. In other embodiments, the second pattern is not transmitted. Rather, the target may be imaged via ambient light, or light from another light source.

At block 1166, the first pattern is detected upon reflection form the target. The first pattern may be detected via a portion of a first sensor array. For instance, the first sensor array may be one of the multiple sensor arrays included in the various embodiments of photon receivers discussed throughout, including but not limited to in conjunction with FIGS. 11A-11A and 12-13B. In at least one embodiment, the first sensor array may be a non-visible sensor array, such as but not limited to an NIR sensor array.

The first sensor array may be (but is not otherwise limited to) a lower sensor array in a vertically stacked arrangement of two or more sensor arrays, such as but not limited to the stacked sensor arrays of FIGS. 11A-11B. One or more pixels included in the first sensor array may be illuminated or triggered by the reflected first pattern, as shown in at least FIG. 11A. The one or more illuminated or triggered pixels may be included in the portion of the sensor array that detected the reflected first pattern.

At optional block 1168, the position of the target may be determined based on the portion of the first sensor that detects the reflected first beam. For instance, the position or location (in the first sensor array) of the pixels illuminated or triggered by the reflected first beam in the first sensor array may be employed to determine at least an approximate location of the portion of the target that reflected the first pattern. In one embodiment, a FOV of the triggered pixels in the portion of the first sensor array may be employed to determine at least an approximate location of the portion of the target that reflected the first pattern.

At block 1170, a portion of a second sensor array is enabled to detect other light from the target. For instance, the second sensor array may be one of the multiple sensor arrays included in the various embodiments of photon receivers discussed throughout, including but not limited to in conjunction with FIGS. 11A-11A and 12-13B. In at least one embodiment, the second sensor array may be a visible sensor array, such as but not limited to an RGB sensor array. The second sensor array may be (but is not otherwise limited to) an upper sensor array in a vertically stacked arrangement of two or more sensor arrays, such as but not limited to the stacked sensor arrays of FIGS. 11A-11B.

Enabling a portion of the second sensor array to detect other light reflected from the target may be based on the portion of the first sensor array or the position of the target. Enabling a portion of the second sensor to detect patterns may include triggering or activating specific pixels in the second sensor array based on the location of the triggered pixels in the first sensor array. For instance, a signal path between the portion of the first sensor array and the portion of the second sensor array may be employed, as discussed in at least the context of FIG. 11B.

At block 1172, other light reflected from the target is detected via the portion of the first sensor array that is enabled to detect patterns. The detected other reflected light may include the second pattern optionally transmitted at block 1164. The other light may be ambient light, or light that illuminates the target from other sources. The other light may be visible light. Process 1160 may terminate and/or return a calling process.

Figure 12:
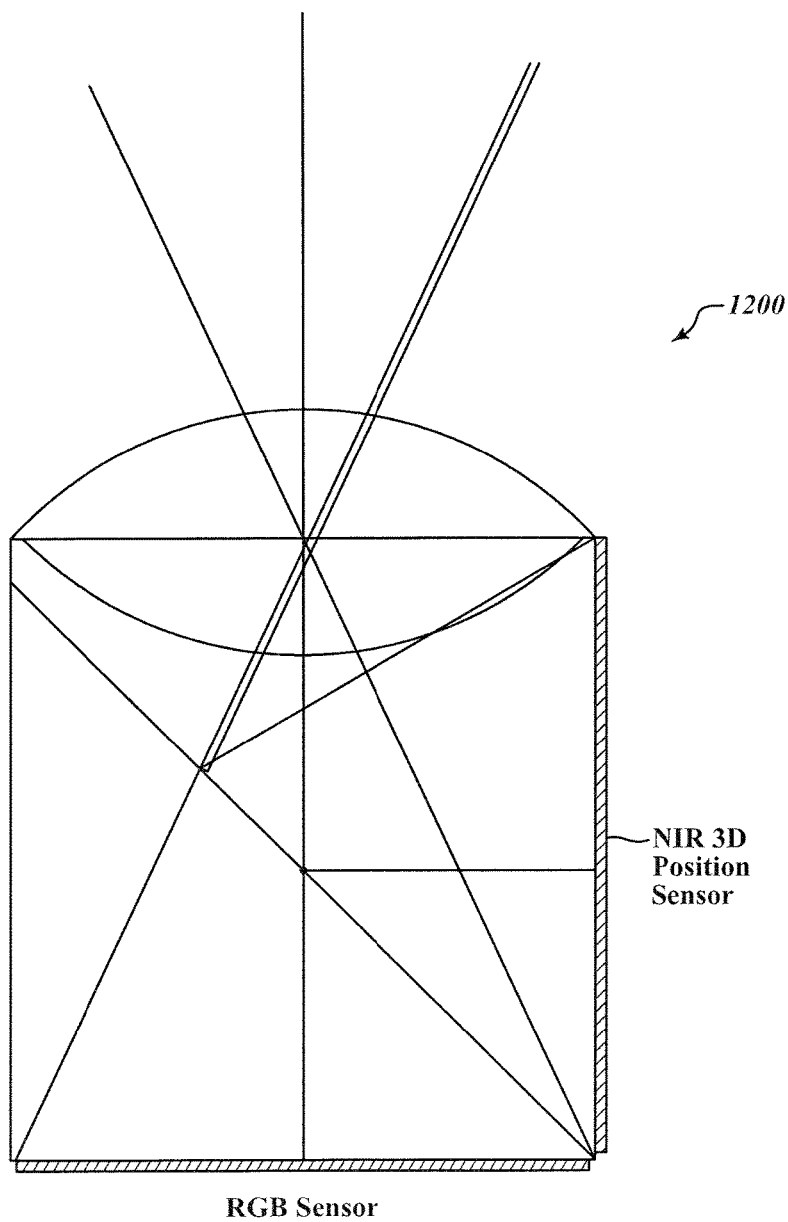
FIG. 12 illustrates an alternative embodiment of a photon receiver that includes both visible and near-infrared (NIR) sensor arrays that is consistent with the various embodiments disclosed herein.

FIG. 12 illustrates an alternative embodiment of a photon receiver 1200 that includes both visible and near-infrared (NIR) sensor arrays that is consistent with the various embodiments disclosed herein. As shown in FIG. 12, photon receiver 1200 includes un-stacked, separate, and substantially orthogonal sensor arrays (visible and NIR sensor arrays). The visible array may be an RGB array. Photon receiver 1200 also includes beam splitting optics, such as but not limited to a prism and a cold mirror, to split the incoming RGB photon beam from the incoming NIR photon beam and provide the split photon beams to the corresponding sensor array.

Figure 13A:
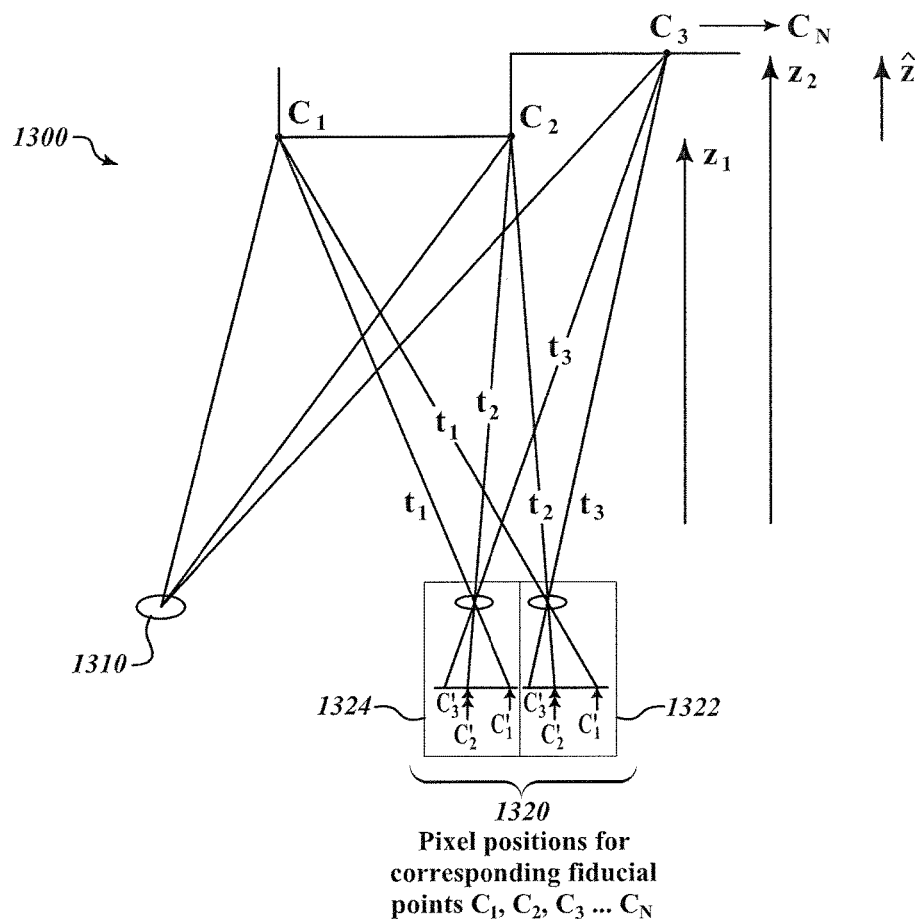
FIG. 13A illustrates another alternative embodiment of a photon receiver that includes both color and NIR sensor arrays that is consistent with the various embodiments disclosed herein.

FIG. 13A illustrates another alternative embodiment of a system 1300 that includes a photon receiver 1320 that includes both visible and a NIR sensor arrays that is consistent with the various embodiments disclosed herein. As shown in FIG. 13A, photon receiver 1320 includes separate and independent cameras: visible camera 1324 and NIR camera 1322. System 1300 may include one or more photon transmitters 1310. Each camera of the photon receiver 1320 includes its own optical systems, such as lens, filter stacks, and apertures. Furthermore, each camera includes its own sensor arrays. Namely, the NIR camera includes one or more NIR sensor arrays and the visible camera includes one or more RGB sensor arrays. Image pixels C1-CN correspond to fiducial positions on a target. Sensor pixels C'1-C'N are the sensor pixels corresponding to the fiducial points. As shown in FIG. 13A, the fiducial points may include different z-axis components.

Figure 13B:
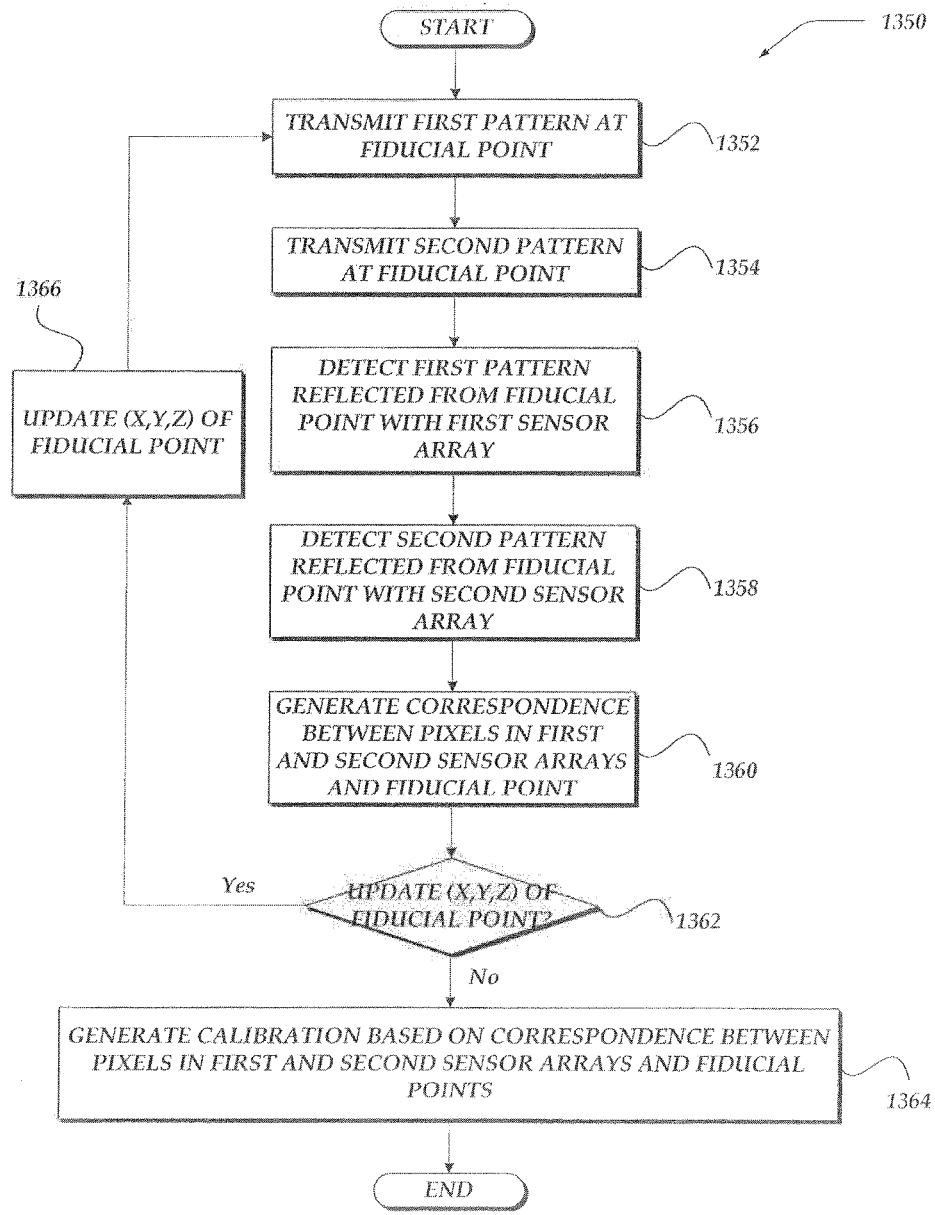
FIG. 13B shows a logical flow diagram generally showing one embodiment of a process for calibrating the photon receiver of FIG. 13A.

As described in detail in the context of process 1350 of FIG. 13B, a pixel-scanning sequence may be employed to calibrate each camera in photon receiver 1300. Such calibrations may include aligning observations via calibration software, firmware, logic, or the like. By employing various 3D scanning test patterns, a series of detections via photon receiver 1300 may provide a voxel-to-pixel correspondence (a mapping) for each of the included cameras. For instance, an NIR photon source included in the photon transmitter may be employed to project a single pixel sized spot at location C1 on the target. Simultaneously, a visible photon source included in the photon transmitter may be employed to project a visible pixel at location C1. At approximately t1, each of the NIR and visible signals are detected at sensor pixels C'1 in the NIR sensor in the NIR camera and the visible sensor pixel C'1 included in the visible camera respectively. Iteratively illuminating and detecting the reflection from multiple fiducial locations on the target enables the generation of a calibration map or look up table.

FIG. 13B shows a logical flow diagram generally showing one embodiment of a process 1350 for calibrating the photon receiver 1300 of FIG. 13A. Process 1350 generally demonstrates how, when a pixel in one of the visible or NIR sensors of photon receiver 1300 is detected at position C'1, a corresponding position in the other sensor is observed at approximately the same instant. By iteratively repeating a calibration of the N fiducial points across the field of view at M distances, an N×M correspondence matrix is determined for all possible points of view in the system. For each observed voxel position established by the NIR sequential 3D sensing system (NIR photon source+NIR sensor), a corresponding RGB pixel position is determined ex-ante. Such a calibration may be performed prior to tracking an actual target. Accordingly, process 1350 may calibrate systems where both low latency and high spatial resolution are required, such as but not limited to drone navigational sensing systems.

The 3D voxel-pixel pairing (or mapping) may be stored in a non-transitory memory. One or more look-up tables may be generated. The lookup tables may include the mapping between the sensing pixels of the visible camera and the sensing pixels of the NIR voxel camera. The lookup table would provide a z distance (or range) for each point on a target, based on the knowledge of the angle of the projected photon pattern and which sensor pixel a sensor array included in the photon receiver that detected the reflected photon pattern.

The NIR voxel camera only requires finding one dimension (typically azimuth alpha or the x component within a Cartesian coordinate system) to establish disparity and determine the depth or range (the z-component, as defined by FIG. 13A). Accordingly, the NIR voxel camera may be a linear (1D) array. The NIR camera may be an asynchronous camera. In at least one embodiment, the NIR camera is a binary camera with a dynamically set threshold, as described in detail in U.S. Pat. No. 8,696,141, entitled METHOD, APPARATUS, AND MANUFACTURE FOR A TRACKING CAMERA OR DETECTOR WITH FAST ASYNCHRONOUS TRIGGERING, issued on Apr. 15, 2014, the contents of which are incorporated by reference in entirety above. The resolution of the two arrays, the pixel size, or the pixel count may be different as interpolation may be employed to match the spatial accuracy of one system with the other.

Process 1350 begins after a start block, at block 1352 where a first light pattern is transmitted towards a fiducial point. The first light pattern may be a non-visible light pattern, such as but not limited to an NIR light pattern may be transmitted. For instance, the fiducial point C1 of FIG. 13A may be illuminated with an NIR pattern at block 1352. At block 1354, a second light pattern is transmitted towards the fiducial point. The second light pattern may be a visible light pattern, such as but not limited to a light pattern generated by an RGB laser source. For instance, the fiducial point C1 of FIG. 13A may be illuminated with a visible light pattern at block 1354.

At block 1356, the first light pattern is reflected from the fiducial point and detected with a first sensor array. The first sensor array may be included in a photon receiver, such as but not limited to photon transceiver 1320 of system 1300 of FIG. 13A. The first sensor array may be a non-visible sensor array, such as but not limited to an NIR sensor array. The first sensor array may be included in a camera in the photon receiver, such as but not limited to NIR camera 1322 of photon receiver 1320.

At block 1358, the second light pattern is reflected from the fiducial point and detected with a second sensor array. The second sensor array may be included in a photon receiver, such as but not limited to photon transceiver 1320 of system 1300 of FIG. 13A. The second sensor array may be a visible sensor array, such as but not limited to an RGB sensor array. The second sensor array may be included in a camera in the photon receiver, such as but not limited to visible camera 1324 of photon receiver 1320.

At block 1360 a correspondence between pixels of the first sensor array employed to detect the first pattern and pixels of the second sensor array employed to detect the second pattern may be generated. For instance, a correspondence between the pixels, as discussed in at least the conjunction of FIGS. 13A-13B may be generated at block 1360.

At decision block 1362, it is determined whether to update the fiducial point. For instance, at least one of the (x,y,z) coordinates of the fiducial point may be updated. If the fiducial point is to be updated, process 1350 flows to block 1366. Otherwise, process 1650 flows to block 1364. At block 1366, the fiducial point is updated. For instance, at least one of the (x,y,z) coordinates of the fiducial point may be updated. Updating the fiducial point may include transitioning the fiducial point C1 to C2 of FIG. 13A (updating at least one of the (x, y) coordinates of the fiducial point). Updating the fiducial point may include transitioning the fiducial point C2 to C3 of FIG. 13A (updating at least the (z) coordinate of the fiducial point). Process 1360 returns to block 1352 to transmit at first pattern at the updated fiducial point.

At block 1364, a calibration may be generated. The calibration may be based on the correspondence between pixels in the first and second sensory arrays and the corresponding fiducial point. The calibration may include a calibration table or matrix. The calibration may include a look-up table as discussed throughout. Process 1650 terminates and/or returns a calling process.

3D Super-Resolution Systems

In various embodiments of dual-sensor (NIR+visible sensor arrays) photon receivers discussed herein, when the voxel position-tracking array (the NIR sensor array) is employed to detect a probe beam, highly accurate tracking of the target may be enabled. Tracking the position of the projection and the detections of the reflected probe beam may enable a photon receiver to provide 3D voxel location sensing (z-axis coordinates) of the target with increased spatial resolution (3D super-resolution). In such embodiments, the operation of a visible sensor array, such as but not limited to an RGB sensor array, may be controlled for sensitivity, by at least partially utilizing tradeoffs in spatial accuracy. For instance, quantum and/or optical efficiencies due to the aperture size may be adjusted to increase the use of light or focal depth, as described in U.S. Pat. Nos. 8,969,141 and 8,430,512, the contents of both incorporated in entirety above.

Figure 14A:
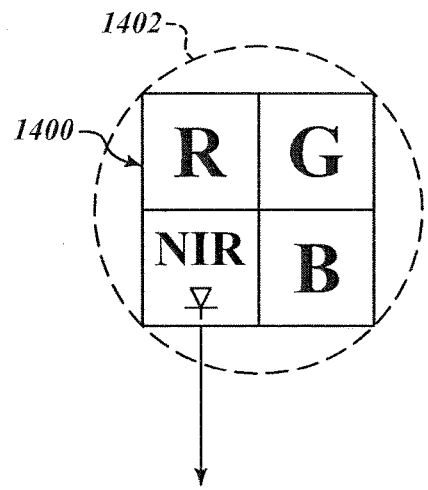
FIG. 14A illustrates a multiplexed sensor that includes both visible and NIR pixels that is consistent with the various embodiments discussed herein.

FIG. 14A illustrates one embodiment of a 3D super-resolution array. Array 1400 is a multiplexed sensor 1400 that includes both visible (RGB) pixels and NIR pixels and is consistent with the various embodiments discussed herein. The voxel tracking binary sensor (NIR) pixels may be spatially multiplexed (interlaced) into the RGB array, resulting in a RGB-NIR mosaic. As shown in FIG. 14A, a beam spot 1402 is illuminating sensor array 1400. The surface area of the illuminating beam spot 1402 is larger than the combined surface area of the RGB+NIR four pixel arrangement A detection threshold may be applied to the binary NIR pixel. When beam spot 1402 generates a signal in the NIR pixel, the correspond x-position of the target may be determined via a relatively fast column detection. In sensor 1400, the RGB pixels follow a normal spatial layout such as Bayer pattern. Thus, one or more of the various embodiments of photon receivers may include a Bayer camera. As shown in sensor 1400, at least the NIR pixel may be a photodiode.

Figure 14B:
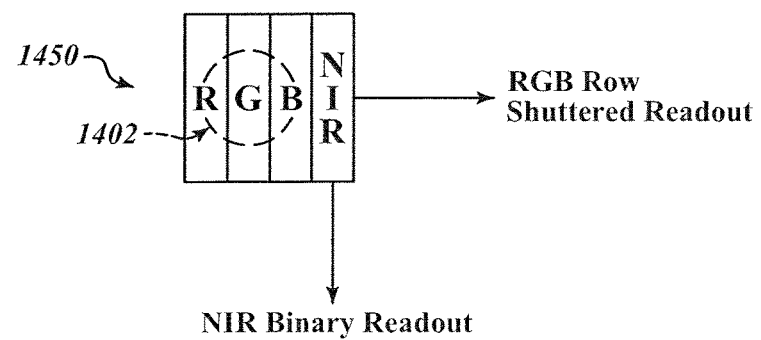
FIG. 14B illustrates an alternative embodiment of a sensor that includes visible (RGB) and NIR pixels.

FIG. 14B illustrates an alternative embodiment of a 3D super-resolution sensor 1450 that includes both visible (RGB) and NIR pixels. Sensor 1450 includes "long" vertical RGB-NIR striped pixels that are arranged in rows. Such rows enable the intermittent detection of the beam during the progression of scanning across the row. Furthermore, x-axis displacements (i.e. disparity) of the reflected transmitter's laser scanning beam across objects within a certain range in the field of view may be established. Similar to sensor array 1400 of FIG. 14A, the NIR pixel of sensor array 1450 may be thresholded. As discussed in at least the context of FIG. 14C, the thresholded NIR pixel may be employed as a trigger to readout the RGB row.

Figure 14C:
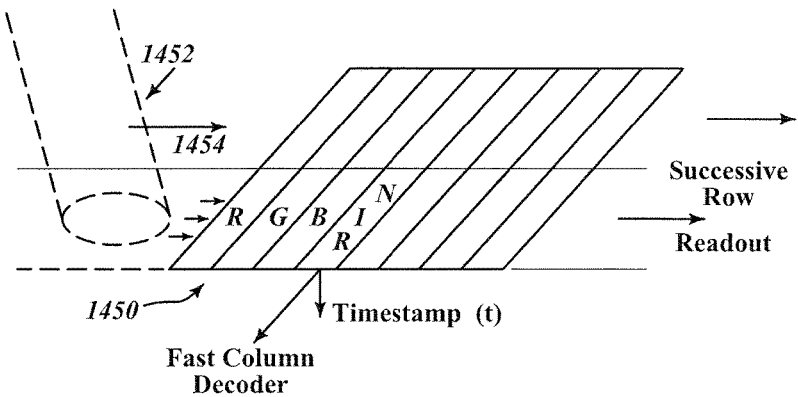
FIG. 14C illustrates a scanning pattern continuously illuminating the sensor of FIG. 14B.

FIG. 14C illustrates a scanning beam continuously illuminating the sensor 1450 of FIG. 14B. Scanning beam spot 1452 is reflected from the target. Arrow 1554 shows the direction of scanning beam spot 1452.

When the scanning beam spot 1452 continuously illuminates sensor 1450, as shown in FIG. 14C, the scanning beam spot 1452 triggers the NIR sensor pixels. As discussed above, triggering the NIR sensor pixels may be thresholded. Based on the triggering of the NIR sensor pixels, the time of that transition (triggering) event may be recorded. The incoming beta angle for each triggered event may be determined via the triggered NIR pixel. See FIG. 15A for the geometry of the outgoing alpha angle that may be one of the photon transmission angles, as well as the incoming beta angle. For instance, the alpha angle may be the transmitted or outgoing azimuth angle. The beta angle may be one of the photon received angles. For instance, the beta angle may be the incoming or received azimuth angle. The beta angle may be proportional to the displacement lateral (delta x) position in the array (column # count).

Figure 15A:
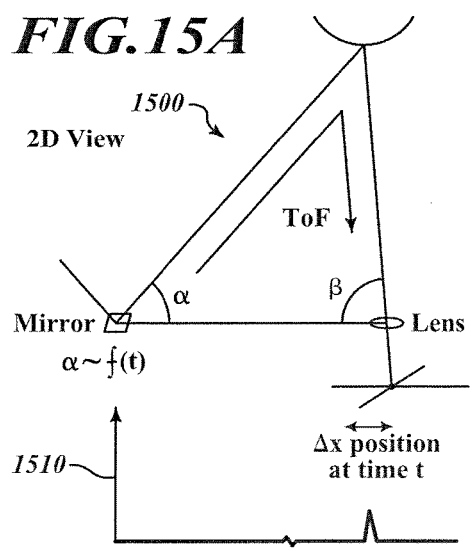
FIG. 15A illustrates the 2D geometry of photon transmission and photon receiving to define the outgoing/transmission azimuth angle and the incoming/received beta angle.

FIG. 15A illustrates the 2D geometry 1500 of photon transmission and photon receiving to define the outgoing/transmission (alpha) azimuth angle and the incoming/received (beta) azimuth angle. As shown by the time variance of detected photon signal 1510, the time of the detection of the received photon may be employed to determine the instantaneous deflection (azimuth) angle of the photon scanning mirror at the moment of the beam's photons transmission in geometry 1500.

Figure 15B:
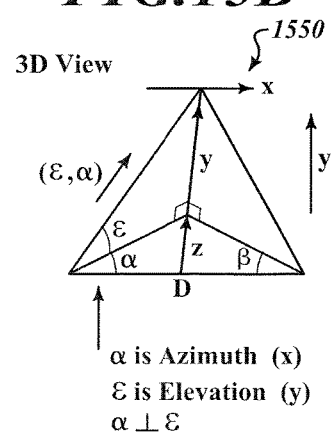
FIG. 15B illustrates the 3D geometry of photon transmission and photon receiving to define the outgoing/transmission (epsilon) elevation angle.

FIG. 15B illustrates the 3D geometry of photon transmission and photon receiving to define the outgoing/transmission (epsilon) elevation angle. Adjustments on the order of nanoseconds may be employed, establishing the exact "light departure time" and the corresponding instantaneous mirror scan angle (alpha). Such adjustments may enable the precise determination of the 2D probe beam outgoing (pointing) direction angle (angles alpha & epsilon of 3D view 1550) for known system detection lag and for the approximate time of flight (TOF). When the range is significant, e.g. many feet, then the TOF will be many nanoseconds, and the mirror angle (alpha) will have changed a significant amount, and if not corrected, may result in a small triangulation and z-distance estimation error.

Figure 15C:
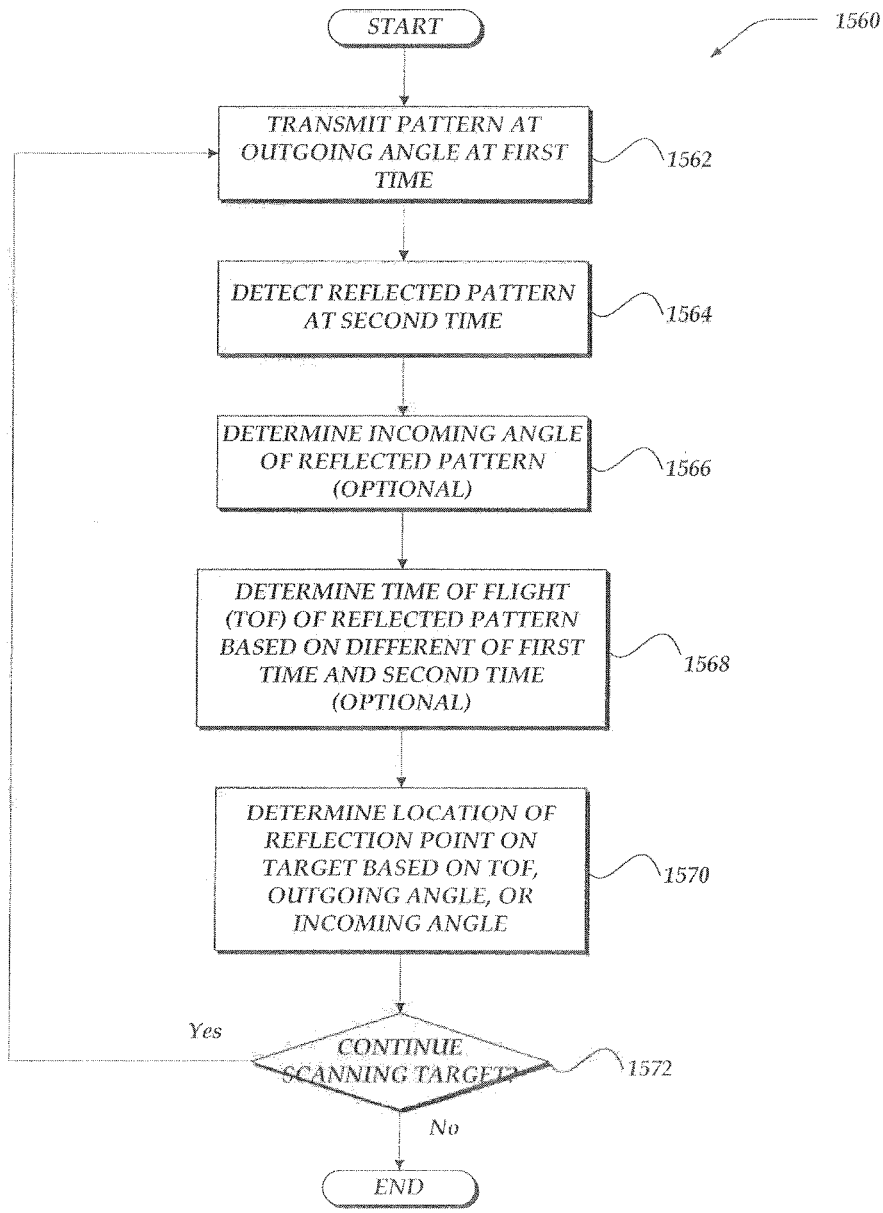
FIG. 15C shows a logical flow diagram generally showing one embodiment of a 3D imaging process that is consistent with the various embodiments disclosed herein.

FIG. 15C shows a logical flow diagram generally showing one embodiment of a 3D imaging process that is consistent with the various embodiments disclosed herein. Process 1560 begins after a start block, at block 1562 where one or more light patterns are transmitted at one or more outgoing angles. For instance, at least FIGS. 15A-15B show light patterns transmitted at outgoing azimuth and elevational angles beta and epsilon. The light patterns may be transmitted at a first time from a photon transmitter. The one or more transmitted light patterns may be scanning patterns as discussed throughout. Accordingly, process 1560 in various embodiments may include scanning the target. The one or more transmitted light patterns may be employed to track the target. Accordingly, process 1560 in various embodiments may include tracking the target.

At block 1564, at least a portion of the transmitted light patterns are detected. The light patterns may be reflected from a target of interest prior to being detected. The one or more reflected light patterns may be detected via one or more photon receivers. At optional block 1566, one or more incoming angle of the detected reflected pattern is determined. For instance, at least FIGS. 15A-15B shows reflected light patterns with an incoming azimuth angle of beta. Determining the incoming angle may be based on at least one of a location of a pixel included in a sensor array that detects the incoming pattern. For instance, the FOV of the pixel may be employed to determine the one or more incoming angles. In at least one embodiment, determining the one or more incoming angles may be based on the one or more outgoing angles.

In optional block 1568, the time of flight (TOF) of the reflected light pattern may be determined. In at least one embodiment, the TOF is determined based on at least one of the first time (time of pattern transmittance) or the second time (time of reflected pattern's detection). In some embodiments, the TOF is based on a difference of the second time and the first time.

At block 1570, the location of a target may be determined. The determined location of the target may be at least an approximate location. The location may include a range or distance of the target. The location may include at least one of three spatial (x,y,z) coordinates of the target. Determining the location may be based on at least one of the TOF, the outgoing angles of the pattern, and/or the incoming angles of the pattern.

For instance, in at least one embodiment, the location may be determined based on a triangulation of the target. The triangulation may be based on at least one of the incoming and outgoing angles of the pattern. The triangulation may be further based on a distance separating the transmitting photon transmitter and the detecting photon receiver. In at least one embodiment, the location of the target is determined based on the TOF. In some embodiments, the location is based on both the TOF and the triangulation, as discussed herein.

At decision block 1572, it is determined whether to continue tracking the target. If the target is continued to be tracked, process 1560 returns to block 1562, to transmit one or more other light patterns. The tracking the target is to be terminated, process 1560 may terminate and/or return a calling process.

Light Coding and Sequential 3D Scanning

In various embodiments, information such as but not limited to the instantaneous transmission angles (alpha and/or epsilon of FIGS. 15A-15B) may be embedded and/or encoded in the transmitted photon beam. Visible, as well as NIR photon sources in the photon transmitter may be employed to embed such information in the transmitted and/or projected photon beam. Codes such as but not limited to De Bruijn color codes may be employed to embed the information (such as but not limited to alpha and epsilon angles) in the transmitted photon beam. For instance, binary photon beams generated by an RGB+NIR sources may encode up to $2^4-1=15$ bits of information, such as but not limited to spatial coding (like key shifting, pixel line position shifting). Additionally, intensity coding (e.g. grey tones) may be used to encode probe beam instantaneous spatial directions (alpha, epsilon). Accordingly, in the various embodiments, the photon receiver need not include a sufficiently accurate real time temporal resolution ability when such information is encoded in the transmitted (and received) photons.

FIG. 16A illustrates encoding information within an RGB photon beam that is consistent with the various embodiments. In FIG. 16, simple DeBruijn codes are employed by binary RGB photon sources to encode information. In various embodiments, the binary photon sources are switched on and off in binary patterns resulting in 7 possible colors: Red, Yellow, Green, Cyan, Blue, Magenta, and White. By varying the probe beam color coding rapidly during the scan, e.g. changing to a new color for every pixel position, a decodable, clear trace of a structured color pattern across objects in the field of view illuminated, structured information or data may be embedded in the sequential color shifting laser beam. As discussed, information may be encoded in the scanning pattern.

Regular low cost CMOS sensors in a photon receiver may detect and record the patterns easily, and without motion blur, as each color pixel is illuminated for just a few nanoseconds by sequential-pixel scanning photon beam spot. Binary color codes (Blue or No Blue, Red or No Red, Green or No Green) are easily recovered by filtering the photon receiver's RGB sensor pixels.

In embodiments that include significant shutter exposure times, lower frame rates, and/or rapidly varying and/or unknown motion between the photon receiver and the projection surface at the precise instance the coded photons are projected at each precise pixel location on the projection surface, the encoded information may be determined based on the encoded photons received at the photon receiver. At least because various embodiments employ RGB sequential-pixel scanning with narrow bandwidth diode laser sources, the RGB image pixels may optionally be filtered with narrow bandwidth pass filters.

For instance, a green sensor sub-pixel of a sensor array may be filtered to receive only a single 1 nanometer (520 nm+/−0.5 nm) of the spectrum, and only during the briefest of shutter intervals (10 microseconds if only one row in the sensor array is selected and open (or biased) during a rolling shutter system synchronized in an epipolar arrangement). By employing a combination of spatial, temporal, and wavelength selective filtering and/or encoding information in the projected scanning beam, a binary sequential color sequential-pixel projection system may be a robust high-speed 3D motion and shape acquisition system. Such a system may additionally function as an RGB camera system.

Figure 16C:
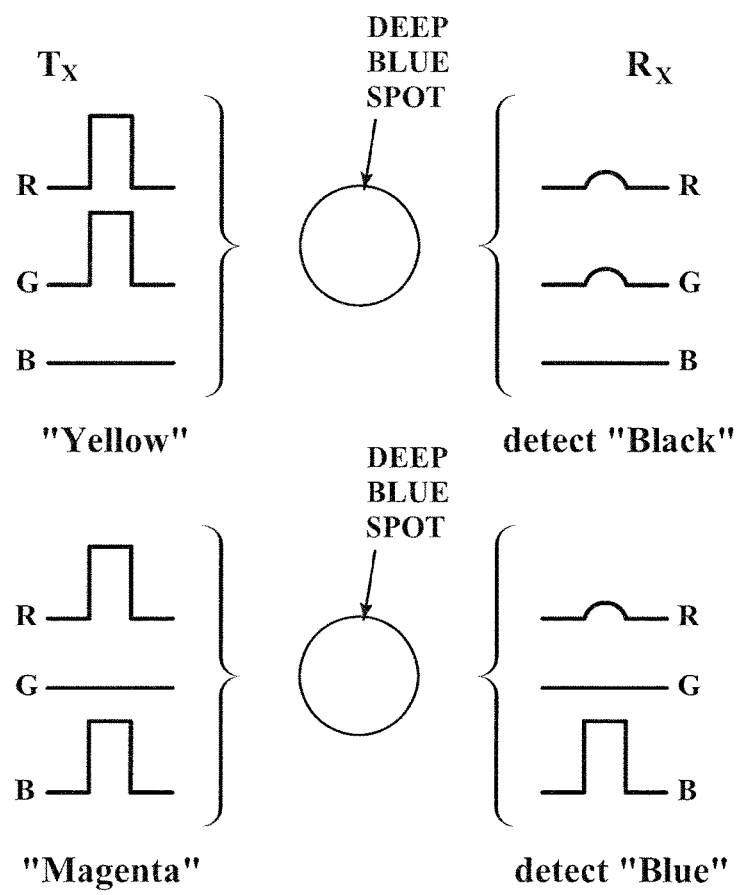

FIGS. 16B-16C illustrates alternative embodiments for encoding information within an RGB photon beam that include pseudo-white light coding. In the context of FIGS. 16B-16C, successive use of complimentary color codes in rapid succession, appear white to a slow observer. For instance, a line in successive frames is over written with complimentary colors. For example a line encoded with the RGB DeBruijn code sequence (100, 010, 001) in a first frame may be overwritten in the second frame by CMY (011, 101, 110). An observer (such as a photon receiver) that is enabled to discriminate and/or resolve the two frames may detected the coded information. However, another observer that is not enabled to discriminate and/or resolve the two frames will only detect white light.

Note that a 60 frames per second (fps) projection observed at 30 fps with a color camera may sum to two successive 16.67 ms exposures. As used herein, the term anti-code is the complimentary code projected in the second frame. The advantage of anti-codes employed in the second frame, as shown in FIGS. 16B-16C, is that to an observer employing a relatively slow photon sensor array, the codes would be substantially unobserved. However, fast asynchronous sensors or detectors are enabled to detect the codes, decode these codes, and employ the codes to determine 3D surface contour lines. Accordingly, various embodiments of photon receivers may include both slower RGB sensors that would detect white light and detect the surface color contrast, e.g. images on a surface, as well as faster sensors to detect and decode these pseudo-white light codes. The use of interlaced/successive codes+anti-codes that sum to white may be employed to detect color surface textures within images of the target.

Figure 16D:
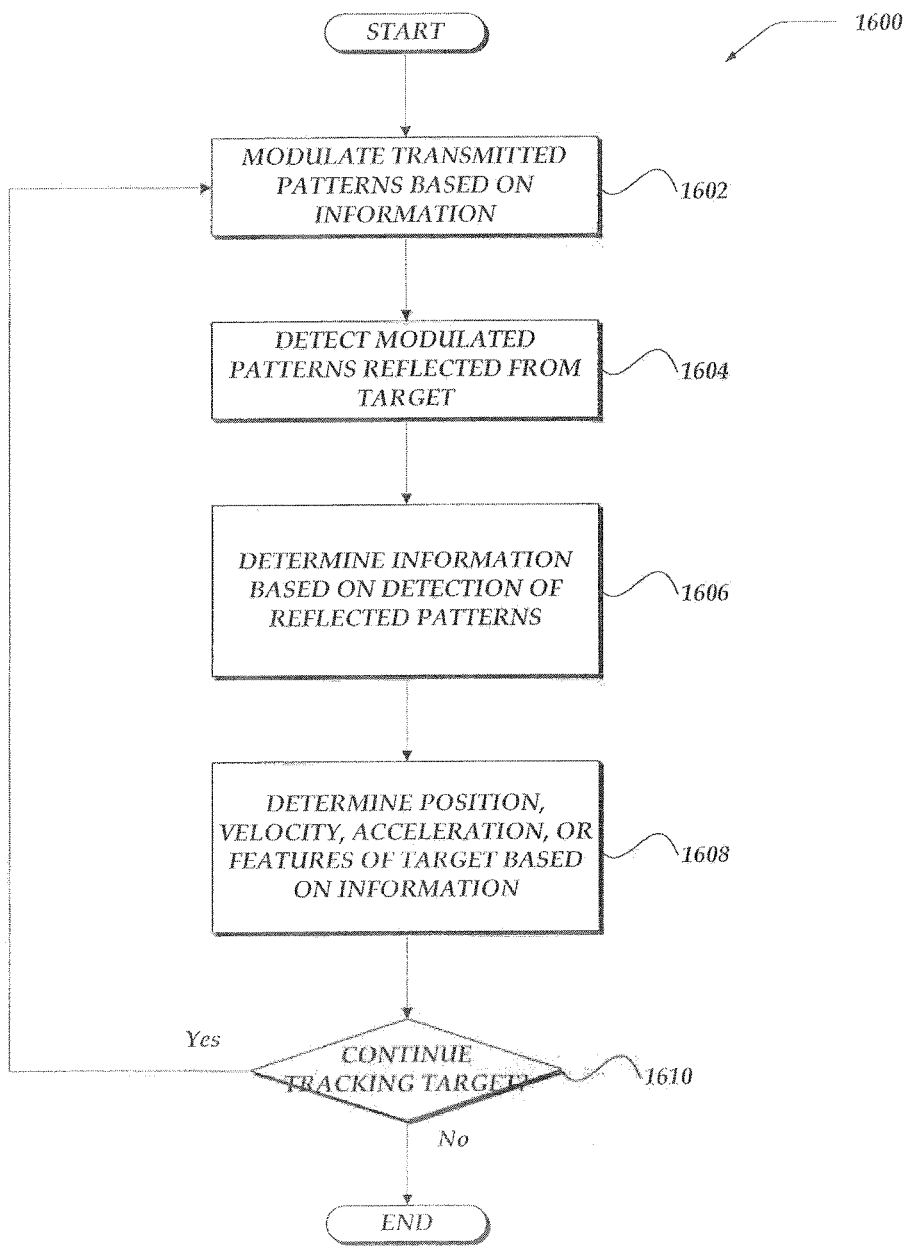
FIG. 16D shows a logical flow diagram generally showing one embodiment of a process for sensing features of a target by embedding encoded information within a scanning pattern.

FIG. 16D shows a logical flow diagram generally showing one embodiment of a process for sensing features of a target by embedding encoded information within a scanning beam with the various embodiments disclosed herein. Process 1600 may begin, after a start block, at block 1602 where one or more transmitted patterns are modulated based on information. The patterns may be modulated to encode any information in the patterns, as discussed herein. The modulated patterns may encode outgoing angles, or any other transmission parameters as discussed herein. For instance, the patterns may be modulated via any method discussed herein, such as but not limited to the discussion in conjunction with at least FIGS. 16A-16C and 17A-17B. One or more photon transmitters may be employed to modulated the one or more beams. The one or more modulated patterns may be scanning beams as discussed throughout. Accordingly, process 1600 in various embodiments may include scanning the target. The one or more modulated patterns may be employed to track the target. Accordingly, process 1600 in various embodiments may include tracking the target.

At block 1604, the modulated patterns are detected. In some embodiments, the modulated patterns are detected upon reflection from one or more targets of interest. The modulated patterns may be detected via one or more photon receivers, as discussed herein. At block 1606, the encoded information is determined. Determining the information may be based on the detection of the modulation beams. For instance, determining the information may be based on the modulations of the detected one or more reflected beams. In one embodiment, at least one of one or more outgoing angles, a transmission time, or the like may be determined at block 1604. Determining the information encoded in the patterns may include decoding the information embedded in the patterns.

At block 1608, at least one of a position, velocity, acceleration, one or more features, or the like of a target is determined. Such a determination may be based at least partially on the information that was encoded in the patterns and decoded and/or determined in block 1606. At decision block 1610, it is determined whether to continue scanning the target. If the target is continued to be tracked, process 1600 returns to block 1602, to continue embedding coded information in the tracking beam. If the tracking of the target is to be terminated, process 1600 may terminate and/or return a calling process.

Figure 17A:
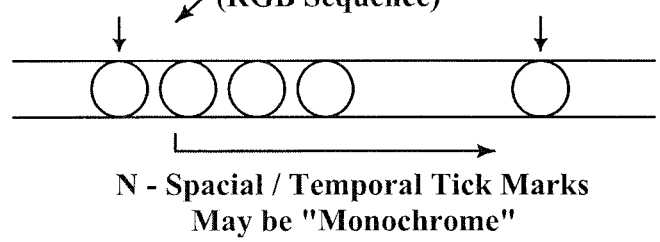
FIG. 17A illustrates temporally encoding information within a photon pattern that is consistent with the various embodiments.

FIG. 17A illustrates temporally encoding information within a photon beam that is consistent with the various embodiments. More specifically, FIG. 17A shows spatial tick marks between coded references, such as DeBruijn codes, serving as spatial-temporal fiducials. Such tick marks may provide timing information of the projected beam. For instance, such tick marks may serve as the second "hand" in a watch, counting out exact space and/or scan time intervals. The ticks embedded in a projected beam provided enhanced precision without reducing the ambiguity associated with range by using up the mathematically available code space, such as but not limited to the hamming distance. As long as a local reference (code) is also detected and recorded, counting ticks (backwards or forwards) along the scan trajectory allows for precise spatial-temporal recording of all intermediate points. Each tick mark may generate a precise voxel. The relative spatial and/or temporal occurrence may be referenced to the closest "full" (uniquely identifiable) structural color reference. This type of 3D spatial marking system is analogous to contour topology maps that are marked in contours separated by a known distance, e.g every 100 ft elevation, but there are 4 in-between unmarked 20 ft elevation lines.

For some object surface points, small gradients for the continuous surface may be employed. For instance, to sense and/or detect human facial features in machine vision applications, the required gradients in the z-directions may be on the order of mm. However, to determine the position of the human head that includes the facial features, gradient resolution on the order of mm may not be required. Rather, employing coarser resolution at the edge of an object (a human head) may be sufficient. For example, when determining the distance to the head, a resolution on the order of cm may be sufficient. Adding tick marks, such as those shown in FIG. 17A, that are identically spaced spatial-temporal fiducial marks, enables stretching the code across unambiguous space, and also includes finer range granularity on contiguous surfaces of objects. Accordingly, these various embodiments enable the sensing and capturing of fine 3D fiducials and ridges, which may be employed for object recognition in the various machine vision embodiments discussed herein.

Figure 17B:
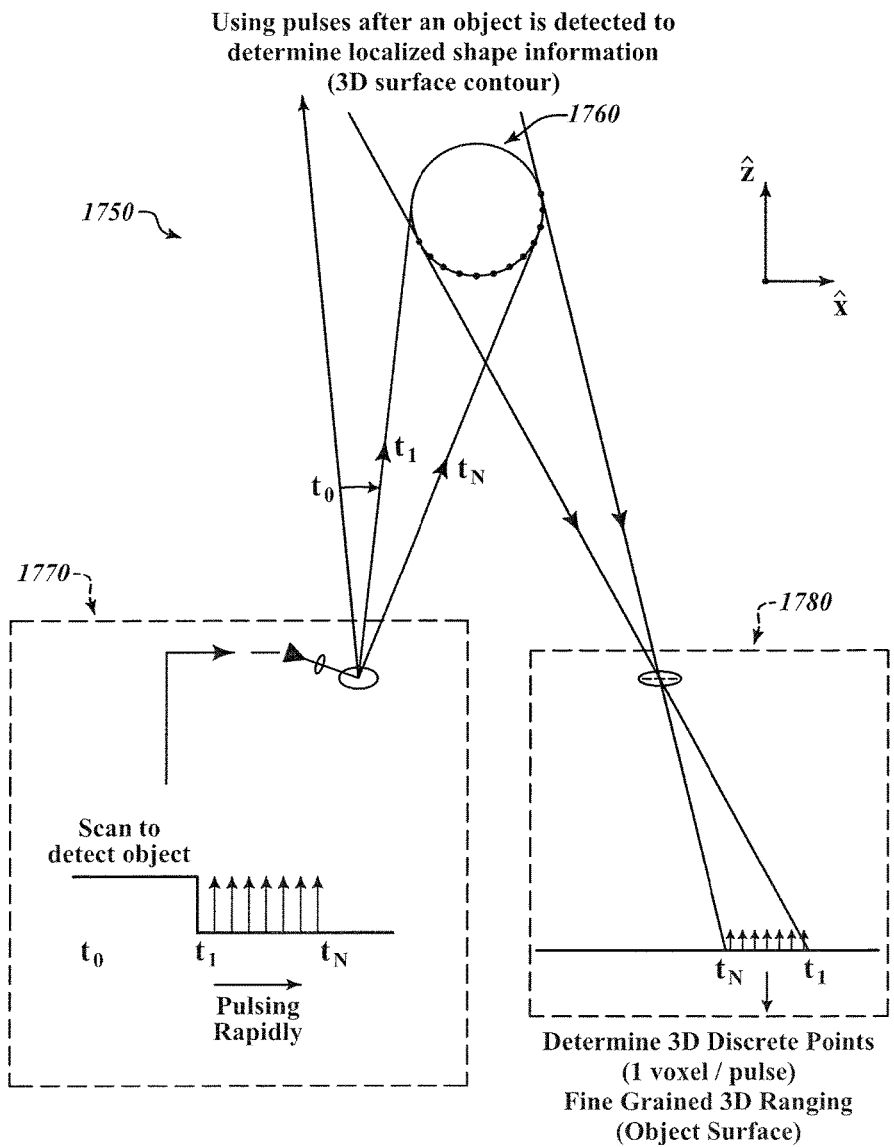
FIG. 17B illustrates a system employed to determine the shape of an object, wherein the system is consistent with the various embodiments.

FIG. 17B illustrates a sequential-pixel project system 1750 that is employed to determine the shape of an object, wherein the system 1750 is consistent with the various embodiments. In FIG. 17B, system 1750 may be a machine vision system that is employed to determine the shape of object 1760. As with other systems discussed herein, system 1750 may include a photon transmitter 1770 and a photon receiver 1780/The distance to object 1760 (z component) may be determined from object's 1760 apparent size in the field of view, motion parallax across multiple frames, or the like. System 1750 may employ a continuous scanning photon beam to detect a near-field object 1760. When the scan is reflected and after one or more sensors included in the photon receiver 1780 starts responding to the incoming/reflected scanning photon beam in one of its column detection circuits, system 1750 may switch the beam to a series of very sharp "pin pricks" that may be identified by their uniquely occurring spatial series that are detected. System 1750 may be enabled to match these occurrences. Accordingly, system 1750 may determine a correct relative distance between adjacent points observed. The relative spatial distances provide information about the slope of the observed (the z gradient) surface trace (segment). Accordingly, system 1750 may sense textures, contours, or other features on the surfaces of object 1750. Thus, object 1750 may be a target of interest.

System 1750 enables fine-grained 3D distance scanning (x-z voxel sequences) in near objects in a single scan. The sensed pixels at the photon receiver 1780 are without blur, and include high motion fidelity due with nanosecond pixel strobe accuracy enabled by photon transmitter 1770. Such high motion fidelity may be useful for various machine vision applications, such as but not limited to high-speed facial motion tracking, monitoring audio waves in surfaces, monitoring surface motion of a pulsing vein, or the like.

Figure 17C:
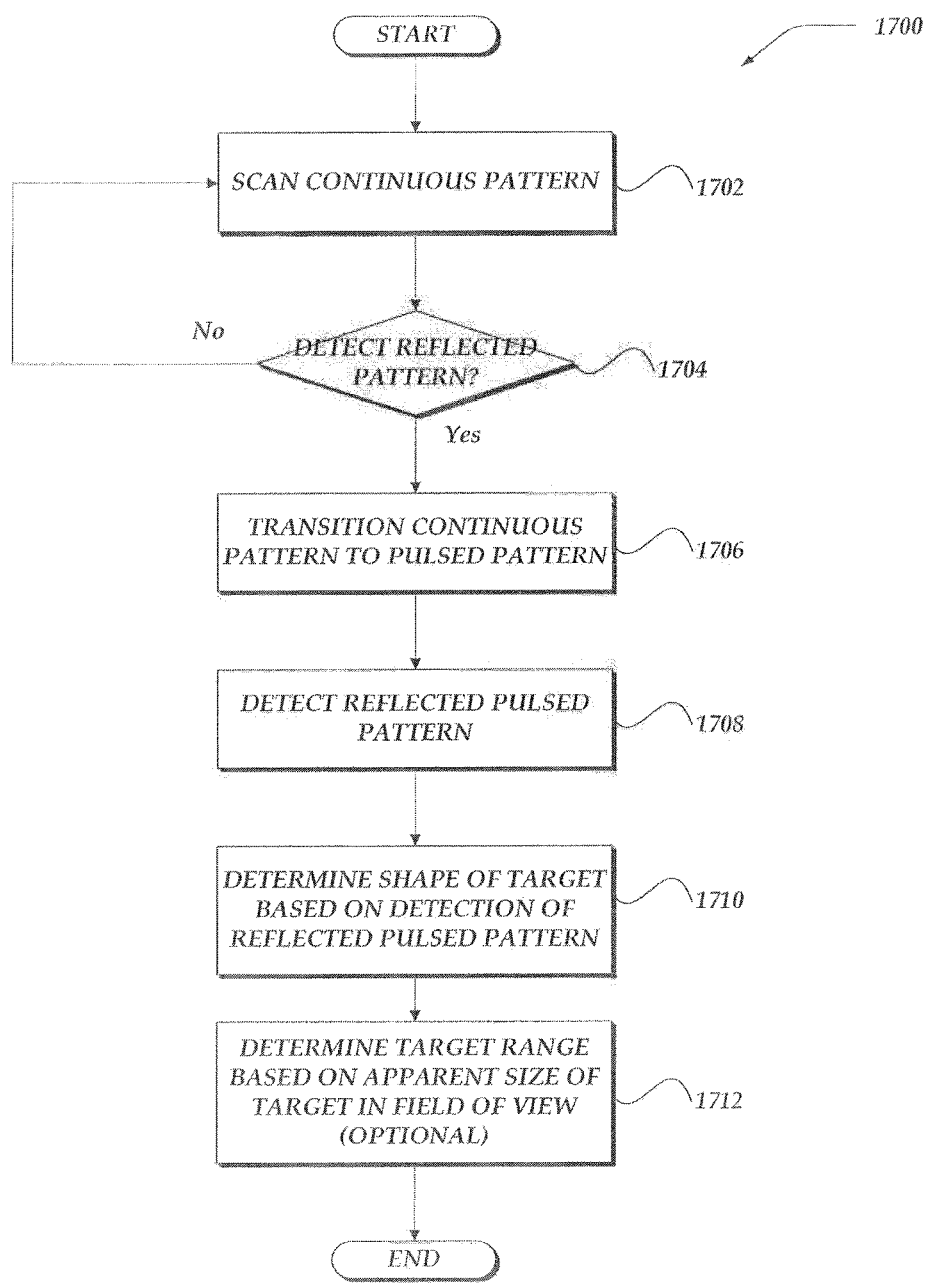
FIG. 17C shows a logical flow diagram generally showing one embodiment of a process for determining the shape of a target.

FIG. 17C shows a logical flow diagram generally showing one embodiment of a process for determining the shape of a target. Process 1700 begins, after a start block, at block 1702 where a continuous light pattern is scanned across at least a portion of a photon receiver's field of view (FOV), as discussed in conjunction with FIG. 17B. The continuous light pattern may be a non-visible pattern, such as an NIR pattern as discussed in conjunction with at least FIG. 17B.

At decision block 1704, it is determined if a pattern is reflected. For instance, as discussed in conjunction with at least FIG. 17B, when the continuous scanning pattern hits a target during a scan, the pattern is reflected and detected by one or more photon receivers. If a reflected pattern is detected, process 1700 proceeds to block 1706. Otherwise, process 1700 returns to block 1702 to continue scanning the continuous light pattern.

At block 1706, the continuous scanning pattern may be transitioned to a pulsed light pattern. The pulsed light pattern may be a scanning pattern, as discussed in conjunction with at least FIG. 17B. The pulsed light pattern may be a visible pattern, such as but not limited to a pulsed RGB pattern. At block 1708, the pulsed light pattern may be detected by one or more photon receivers. The pulsed light pattern may be detected upon reflection by the target.

At block 1710, at least a shape of the target may be determined based on the detection of the reflected pulsed light, as discussed in conjunction with at least FIG. 17B. At least an edge of the target may be sensed or determined by based on the detections of the reflected pulsed light. In at least one embodiment, a z-gradient, or texture of the target may be determined or sensed at block 1710.

At optional block, a target range or distance may be determined. For instance, as discussed in the context of at least FIG. 17B, the target range may be determined based on an apparent size of the target in the FOV in the one or more photon receivers. Process 1700 may terminate and/or return a calling process.

Stereo Sensing Systems

Figure 18:
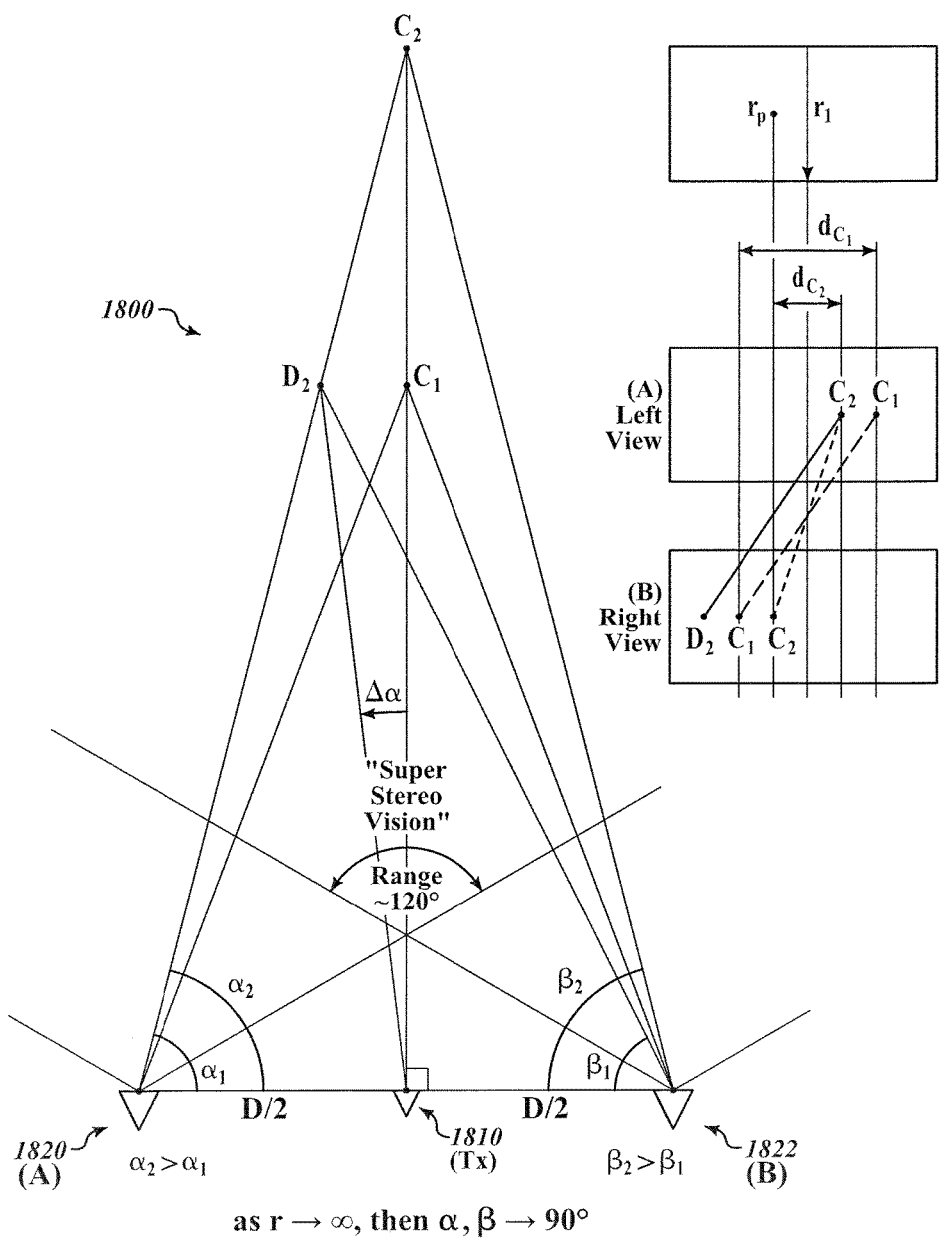
FIG. 18 illustrates a stereo-sensing system that is consistent with the various embodiments.

FIG. 18 illustrates a stereo-sensing sequential-pixel projection system 1800 that is consistent with the various embodiments. System 1800 includes two photon receivers 1820/1822 (or cameras) positioned at approximately locations A and B respectively. In at least one embodiment, system 1800 includes one photon receiver that includes both the left and right camera. System 1800 also includes photon transmitter 1810 (or projector or scanner) positioned approximately at location P. Accordingly, in at least one embodiment, an active coded sequential-pixel projection system (such as but not limited to system 1800) may include more than one photon receivers sharing the FOV of the scanning system. Furthermore, some embodiments may include more than one photon transmitter.

Each of the photon receivers and/or photon receivers may be in an epipolar alignment (the left/right cameras that align with the main scan axis direction) so that stereoscopic machine vision is enabled. At least when the one or more projection surfaces (of a target of interest) provide sufficient contrast, such a multi-photon receiver system may also function as an RGB stereo acquisition system for long-range observations. A multi-photon receiver system, such as but not limited to system 1800 may include two or more RGB rolling shutter sensors and one or more epipolar aligned photon transmitters. System 1800 may provide enhanced stereo-sensing. The boxes in the right hand corner of FIG. 18 show that frames sensed by photon receiver 1820 (or the left camera) and photon receiver 1822 (or the right camera) respectively.

In some embodiments, the base line offset distance between stereo camera pairs (D in system 1800 of FIG. 18) is known. Furthermore, the line between the camera pairs (line AB in system 1800) may be the base line for both stereo and/or active light triangulation discussed herein. As shown in FIG. 18, in at least one embodiment, photon transmitter 1810 is located on or near the mid-point of line AB. When there is uncertainty regarding the camera (or photon receiver) orientation and/or baseline offset distance (D), the camera orientations and/or offset distance may be determined by a series of iterative observations. Essentially, the camera orientations and/or offset distance may be deconvoluted from the motion relative between the photon receivers and the projection surfaces, as discussed in the context of at least FIGS. 4-8.

Figure 19:
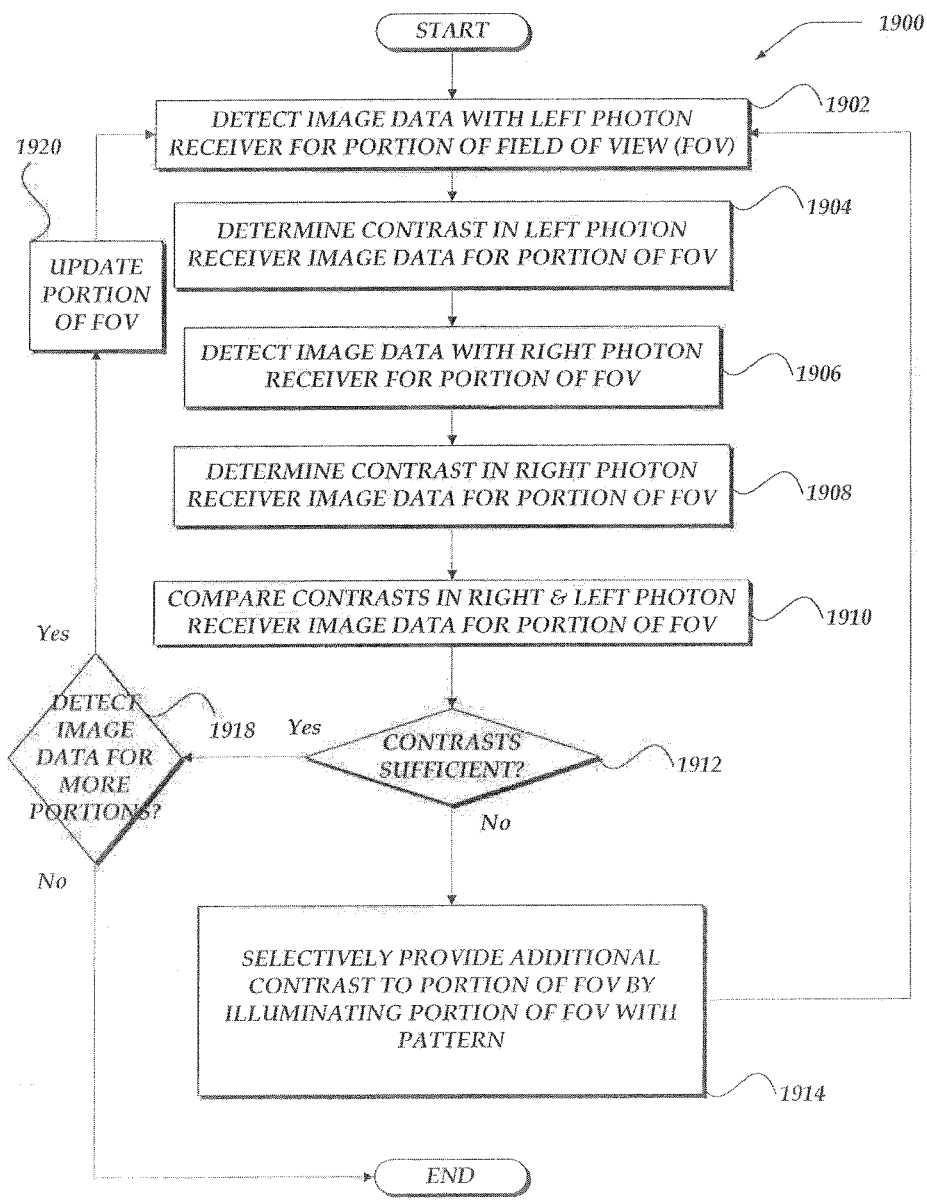
FIG. 19 shows a logical flow diagram generally showing one embodiment of a process that enables enhanced stereo sensing and is consistent with the various embodiments.

FIG. 19 shows a logical flow diagram generally showing one embodiment of a process 1900 that enables enhanced stereo sensing and is consistent with the various embodiments. At least portions of process 1900 may be performed by one or more components of system 1800 of FIG. 18. Briefly, in process 1900, two images are detected by a stereo sensing system, such as but not limited to system 1800: a left image (by left photon receiver 1820 or camera at location A) and a right image (by right photon receiver 1822 or camera at location B). There may be disparity in the left and right images.

Process 1900 begins, after a start block at block 1902, where image data is collected with the left photon receiver or camera. The image data may be image data for a portion of the field of view (FOV) of the perspective of the left photon receiver. For instance, the portion of the FOV may include the entire FOV of the perspective of the left photon receiver. In some embodiments, the portion of the FOV corresponds to one or more rows of one or more sensor arrays included in the left photon receiver. In at least one embodiment, the photon transmitter is employed to illuminate or scan across the portion of the FOV at block 1902. Because the image data detected at block 1902 is detected with the left photon receiver, the image data detected at block 1902 may be left photon receiver image data. At block 1904, the contrast in the left photon receiver image data may be determined.

At block 1906, where image data is collected with the right photon receiver or camera. The image data may be image data for a portion of the field of view (FOV) of the perspective of the right photon receiver. Because the left and right photon receivers may be in epipolar alignment, the portions of the FOV of the left and right image receivers may be similar, or at least in correspondence. For instance, the portion of the FOV may include the entire FOV of the perspective of the right photon receiver. In some embodiments, the portion of the FOV corresponds to one or more rows of one or more sensor arrays included in the right photon receiver. In at least one embodiment, the photon transmitter is employed to illuminate or scan across the portion of the FOV at block 1906. Because the image data detected at block 1906 is detected with the right photon receiver, the image data detected at block 1906 may be right photon receiver image data. At block 1908, the contrast in the right photon receiver image data may be determined.

At block 1910, the contrasts in each of the right and left photon receiver image data are compared. Comparing the contrasts at block 1910 may in matching or mapping pixels in the left photon receiver image data to pixels in the right photon receiver image data. Comparing the contrasts may include determining the disparity in the left and right photon receiver image data.

At decision block 1912, it is determined whether the contrasts of the left and right photon receiver image data are sufficient. In some embodiments, determining whether the contrasts are sufficient may be based on the comparison of the contrasts. In some embodiments, one or more contrast thresholds may be applied to each of the contrasts of the left and right photon receiver image data. In at least one embodiment, one or more contrast thresholds may be applied to a comparison of the contrasts of the left and right photon receiver image data. For instance, a contrast threshold may be applied to a difference (or other combinations) of the contrasts to determine whether the contrasts are sufficient. In some embodiments, the disparity between left and right photon receiver image data may be employed to determine in the contrasts are sufficient. For instance, one or more thresholds may be applied to the disparity. If the contrasts are sufficient, process 1900 proceeds to decision block 1918. If the contrasts are not sufficient, process 1900 proceeds to block 1914.

At decision block 1918, it is determined whether to detect more image data for other portions of the FOV. For instance, at block 1918 it may be determined whether to detect image data for the next row (or column) within the FOV. If additional image data is to be detected, process 1900 proceeds to block 1920. If not image data is to be detected, process 1900 may terminate and/or return a calling process. At block 1920, the portion of the FOV is updated. For instance, the portion of the FOV may be updated to proceed to the next row (or column) in the FOV. Process 1900 flows back to block 1902 to detect additional image data in the updated FOV.

At block 1914, additional contrast may be selectively provided to portions of the FOV that do not have sufficient contrast. Additional contrast may be provided by illuminating the corresponding FOVs with a pattern. For instance, a pattern may be scanned across such portions of the FOV to illuminate the portions of the FOV. Process 1900 flows back to block 1902 to detect image data of the portion of the FOV where contrast has been added, and to further determine if the provided contrast is sufficient.

Figure 20A:
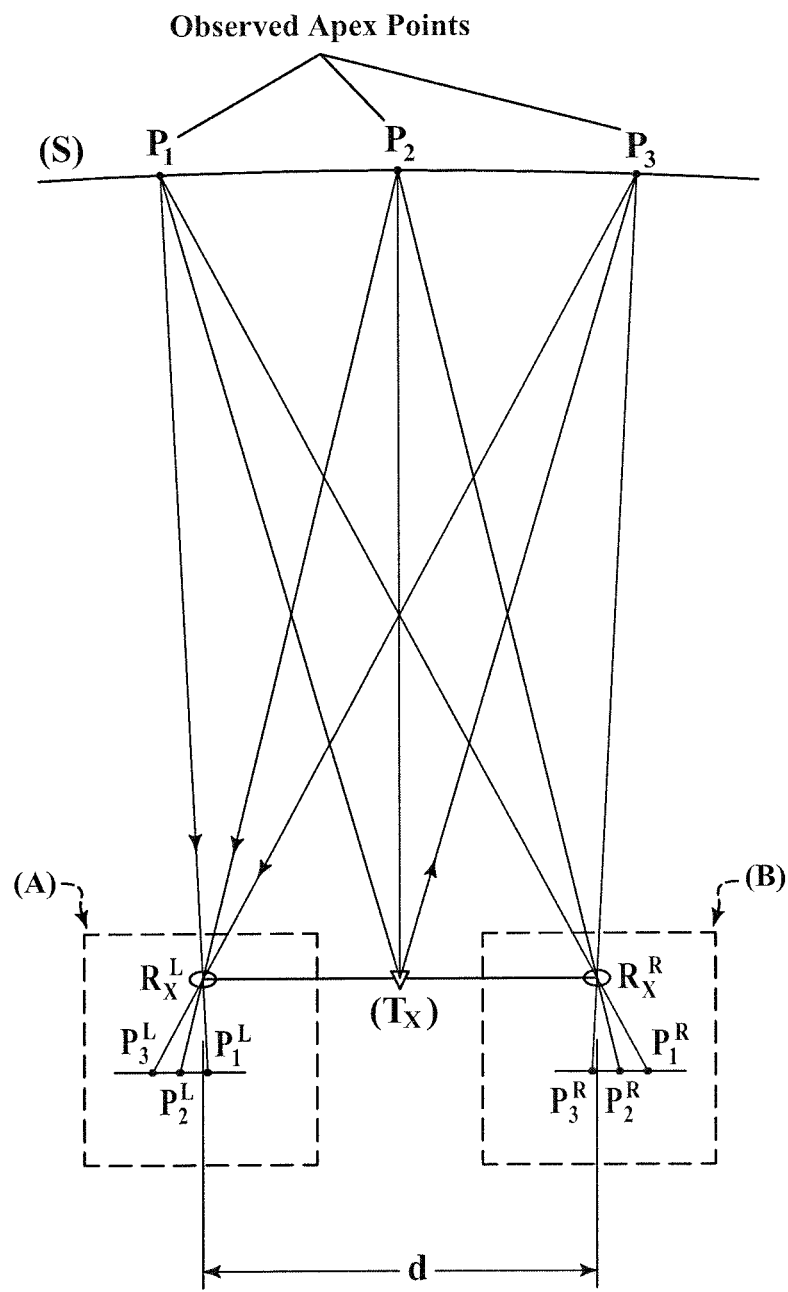
FIG. 20A illustrates a stereo-sensing system iteratively determining the offset distance between the photon receiver pair.

FIG. 20A illustrates a stereo-sensing system 2000 that is enabled to iteratively determine the offset distance (d) between the photon receiver pair that includes two photon receivers (or cameras): left camera A and right camera B. The scan lines as viewed from camera A and camera B are in the same plane. Thus, the sequence of observed apex points ($P_1, P_2 \ldots P_n$, as a time series) may be aligned sequentially while traversing the same plane. Furthermore, the rows in each sensor array included in the cameras may be traversed with the scanning beam. System 2000 may be arranged in a 3-way epipolar arrangement.

The projection surface (S) of the target may be a flat or known surface. For instance, surface S may include a known shape. Using a series of iterative observations on the known flat surface S enables a fine calibration of a precise position (perspective of the FOV) and various intrinsic properties of each of the cameras in system 2000. For instance, the unknown (or varying) distance (d) between the left and right cameras may be determined based on detecting the time series of apex points ($P_1, P_2 \ldots P_n$) in each of the left and right cameras and comparing the image data obtained in the left and right cameras. For example, a comparison of the disparity in the left camera image data and the disparity in the right camera image data may be employed to determine the offset distance (d).

Accordingly, larger arrays of cameras in various systems may be calibrated and/or re-calibrated with less than perfect mechanical integrity. For instance, quad helicopters that are constructed from ultra light somewhat flexible honeycomb materials may experience significant vibration during high speed flight. A pair of stereo cameras may become misaligned during such a flight.

In conjunction with system 2000, consider a quad helicopter facing a flat surface S. Surface S may be a wall. System 2000 may be included in the helicopter. The photon transmitter (Tx) included in system 2000 may transmit or project a line of unique and unambiguous points ($P_1, P_2 \ldots P_n$) on the surface S. Tx may be a scanning projector. The detection of the unambiguous points by each of the stereo cameras may be employed to make successive observations that enable stereo matching to recalibrate its active stereo system 2000. Such a recalibration may be used to compensate for the misalignment of the cameras due to the high vibration associated with flight of the helicopter.

Figure 20B:
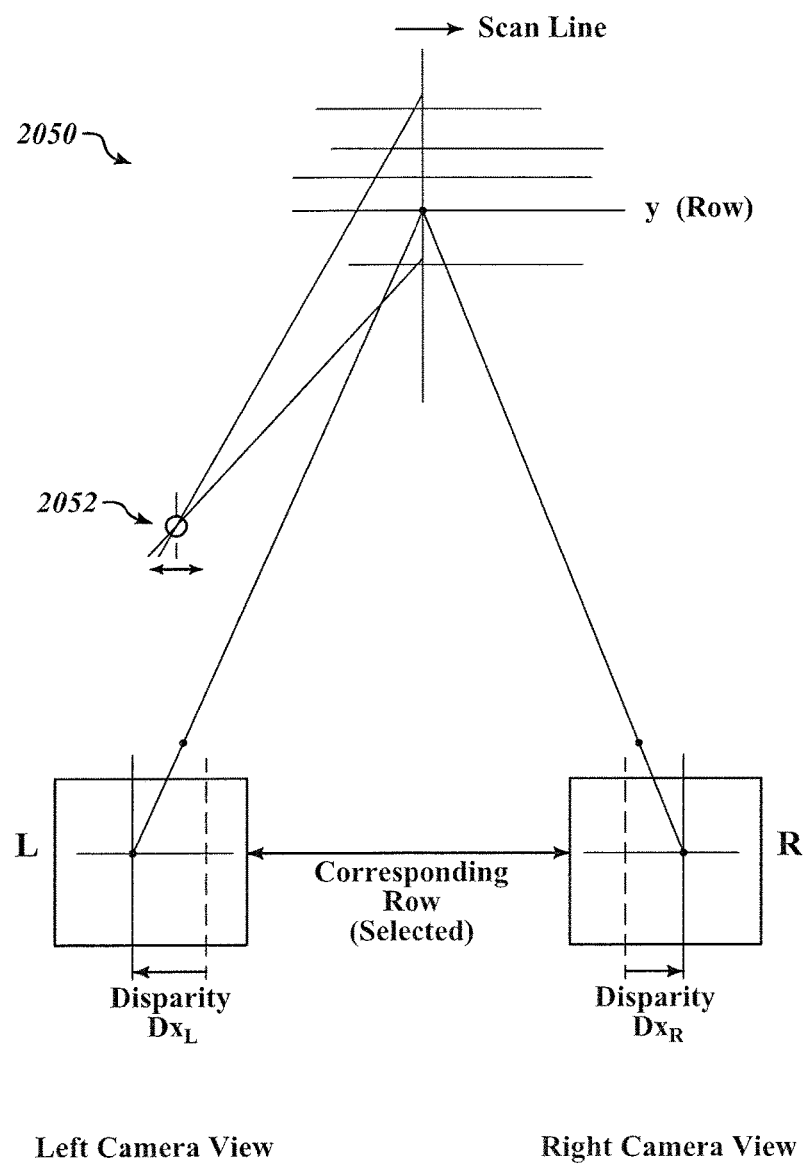
FIG. 20B illustrates another embodiment of stereo-sensing system that is consistent with the various embodiments.

FIG. 20B illustrates another embodiment of stereo-sensing system 2050 that is consistent with the various embodiments. System 2050 is a non-sequential pixel projection system. Parallel observation of a line (or frame) scan observations in the left camera and observations in the right camera may be matched row by row.

System 2050 may include a scanning mirror 2052. Scanning mirror 2052 may be MEMS or polygon scanning mirror. Scanning mirror may be a 1D scanning mirror. In at least one embodiment, scanning mirror 2052 is a 2D scanning mirror. As shown in FIG. 20B, system 2050 may include optical elements to shape the transmitted scanning beam, such that the scanning beam scans across all horizontal (or vertical rows) simultaneously. Thus, all rows may be illuminated and read in parallel. The disparity in the image data for corresponding (selected) rows in each of the right and left cameras are shown in FIG. 20B.

3D Contrast Enhancement

As discussed in the context of at least process 1900 of FIG. 19, in situations where the contrast on one or more projection surfaces of a target of interest is insufficient, the contrast may be increased or additional contrast may be provided by generating a modulation or variation in the projected beam. This variation of the projected beam may add sufficient structure for 3D parsing methods to be able to anchor key fiducial points of the 3D images and the target in 3D space.

Figure 21A:
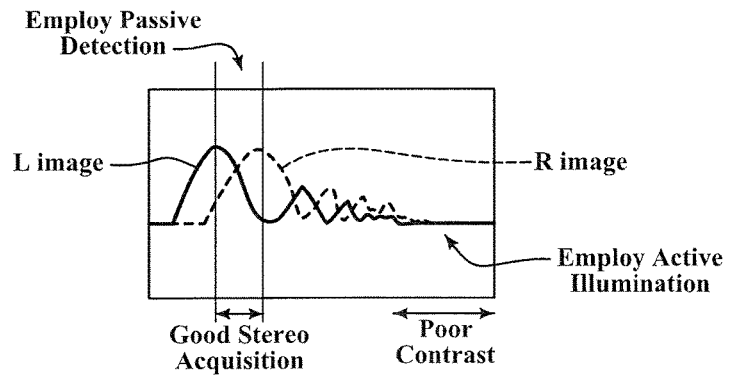
FIG. 21A illustrates a left detected and a right detected signal generated by a stereo-sensing system that varies in contrast and is consistent with the various embodiments.

FIG. 21A illustrates a left (L) detected signal and a right (R) detected signal generated by a stereo-sensing system that varies in contrast and is consistent with the various embodiments. For portions of the image data in a scanned row, the contrast between the left image and the right image (differences in the signals) is high. For other portions of the image data, there is less contrast between the left and right images.

Figure 21B:
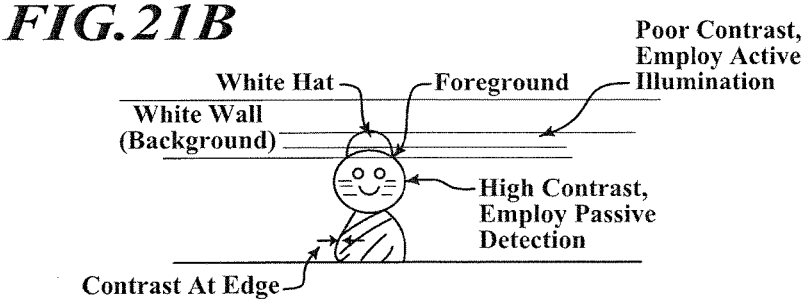
FIG. 21B illustrates an embodiment of a scene where the contrast varies across a scan line, such as demonstrated by signals of FIG. 21A.

Accordingly, FIG. 21A shows that in some 3D scenes viewed by a stereo pair of cameras, there may be a mixture of regions, where objects with high contrast (i.e. a strong/significant pixel to pixel grey scale variance observable under ambient or unstructured light) are mixed with regions of little or no discernable (weak) contrast. FIG. 21B illustrates an embodiment of a scene where the contrast varies across a scan line, such as demonstrated by signals of FIG. 21A;

The advantage of a scanning active illuminator, such as the photon sources included in the various embodiments of photon transmitters discussed herein, is that contrast may be selectively and sparsely added (or adjusted) in the scene to be detected or sensed. Adding contrast may be enabled by illuminating or projecting a photon beam that is designed to enable the stereo imagery to function as a 3D system. In other embodiments, adding contrast may be enabled by switching to an active scanned structured system with temporal spatial or color-coding as discussed in the context of at least FIGS. 16A-17A.

Systems that employ sparse fiducial beams (fiducial pinprick beams that may or may not encode identifying information in the fiducial pinprick) may resolve surfaces that are highly textured in some portions and smoothly textured in other portions with high fidelity. For instance, for strongly textured (high contrast) surfaces, active illumination via a scanning beam may not be able to reproduce the textures or high contrasts with high fidelity.

Figure 21C:
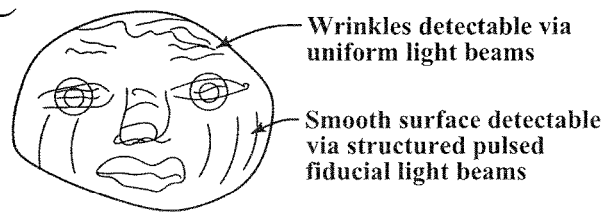
FIG. 21C, which includes both portions of highly wrinkled textures, as well as smooth portions.

However, stereo acquisition is particularly suited for reproducing high-textured images. Wrinkled faces, such as the one shown in FIG. 21C are easy to acquire using passive 2D sensors, with structure from motion methods. Conversely, smooth unblemished baby faces and flat toned wall structures can be hard to perceive with passive stereo or structure from motion methods. Accordingly, the various embodiments discussed herein may blend active scanning illumination methods (for image portions with weak contrast) and passive acquisition stereoscopic methods for image portions that include high contrast to reproduce and detect the face shown in FIG. 21C. Not that the face shown in FIG. 21C includes portions of highly wrinkled textures (high contrast), as well as smooth portions (weak contrast). The wrinkled portions are detected by employing uniform light, while the smooth portions require pulsing fiducials. The pulsed fiducials may be pulsed with NIR photons.

Figure 21D:
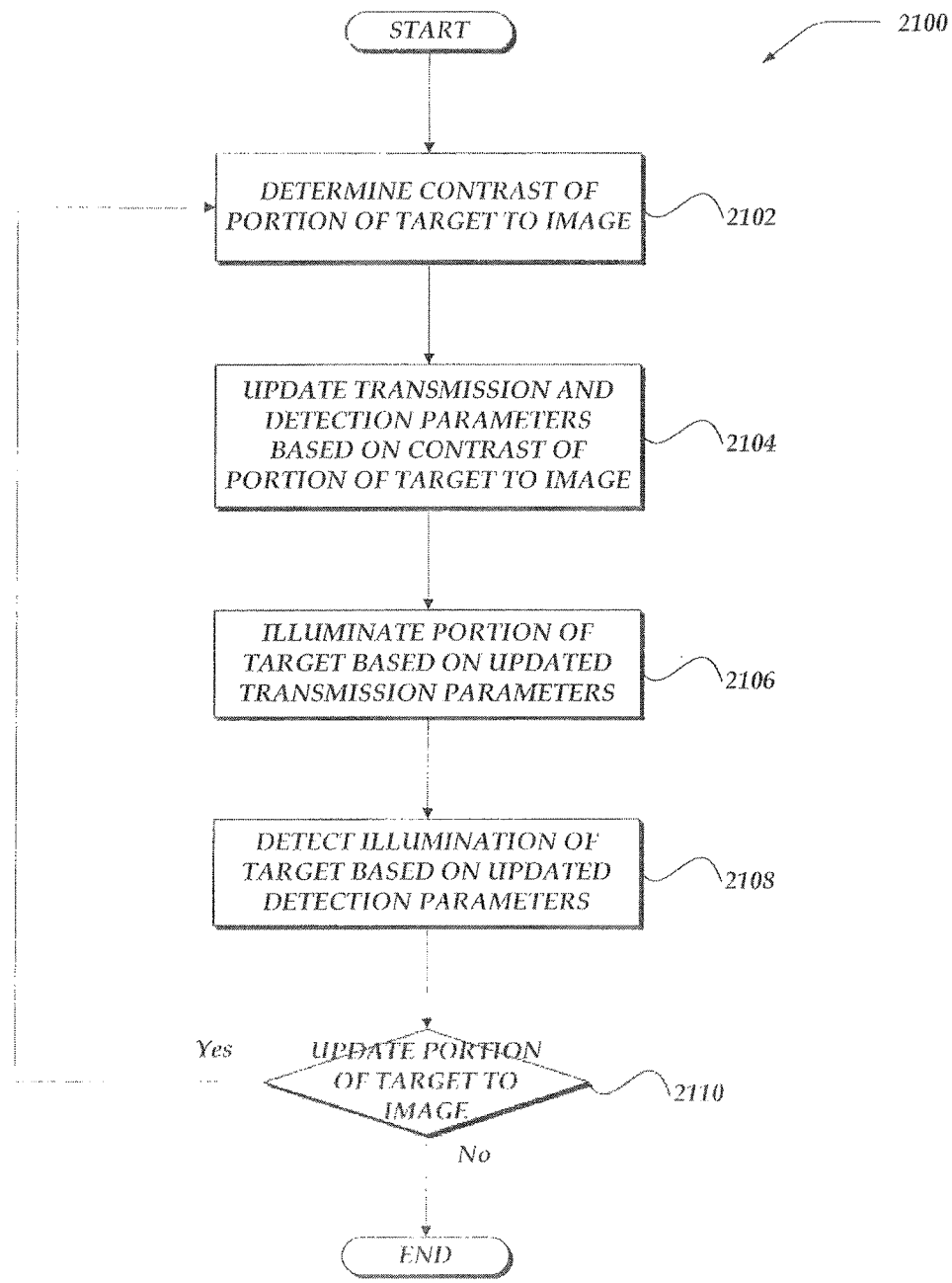
FIG. 21D shows a logical flow diagram generally showing one embodiment of a process for enhancing the contrast of regions of a target to image that is consistent with the various embodiments.

FIG. 21D shows a logical flow diagram generally showing one embodiment of a process for enhancing the contrast of regions of a target to image that is consistent with the various embodiments. Process 2100 begins after a start block, at block 2102 where the contrast of a portion of the target to image is determined. Various embodiments for determining the contrast of a target or field of view (FOV) of a stereoscopic system is discussed in the context of at least FIGS. 18-19. The contrast may be based on the available ambient light. Determining the contrast of a portion of a target may include determining the disparity between left and right image data detected with a stereoscopic system.

At block 2104, one or more transmission parameters and/or one or more detection parameters may be updated based on the contrast determined at block 2102. For instance, as discussed in the context of at least FIGS. 21A-21C, portions of a target that include higher amounts of contrast, transmission parameters may be updated such that less active illumination is employed to image the portion of the target. For portions of the target that include less contrast, more active illumination may be employed to mage the portion of the target. Accordingly, the one or more transmission parameters may be updates such that an appropriate level of illumination is employed to resolve the contrast in the portion of the target to image. Furthermore, one or more detection parameters may be updated to detect the illumination reflected from the portion of the target.

At block 2106, the portion of the target is illuminated based on the updated transmission parameters. In at least one embodiment, when the contrast in the portion of the target is great enough, that no illumination may be required. For instance, ambient light, or light provided from other sources, may be adequate to resolve the high contrast of the portion of the target. In such embodiments, at least the transmission parameters may be updated at block 2014 such that no active illumination is provided. At block 2108, the illumination reflected from the target is detected as discussed throughout. In at least one embodiment, ambient light, or other light reflected from the target is detected.

At decision block 2110, it is determined whether to updated the portion of the target to image. For instance, at decision block 2110, it may be determined whether to scan or image another portion of the target. If imaging of the target is continued, the portion of the target to image is updated and process 2100 returns to block 2102. Otherwise, process 2100 may terminate and/or return a calling process.

Dynamically Enhancing Pixel Illumination for Imaging a Target

Figure 22A:
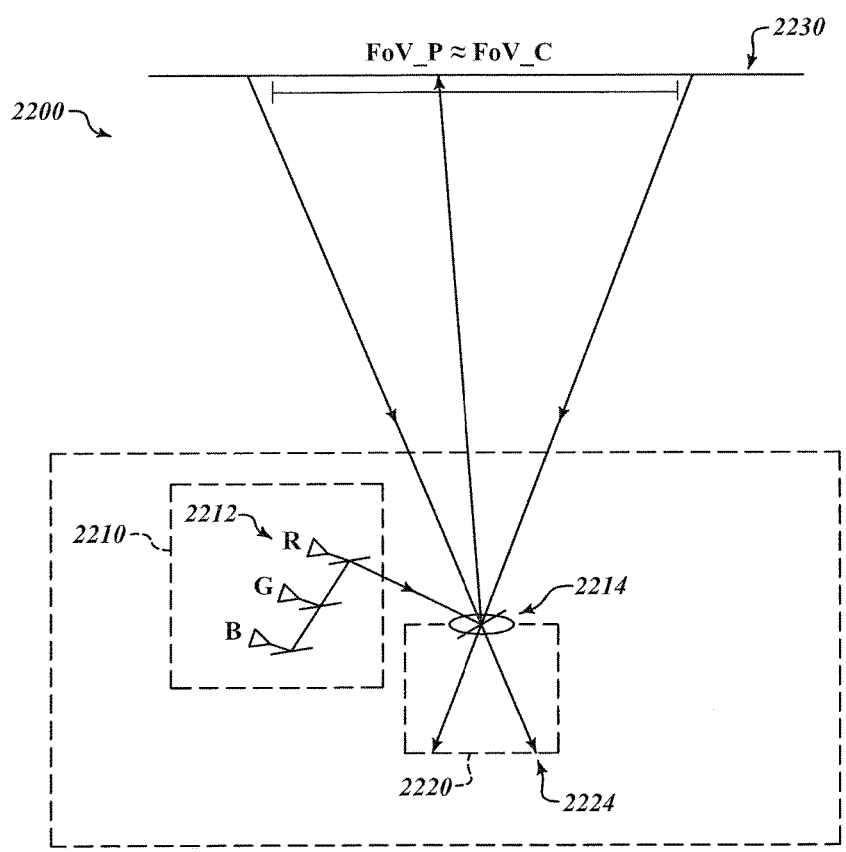
FIG. 22A illustrates a system that is enabled to perform enhanced 2D machine vision and is consistent with the various embodiments discussed herein.

FIG. 22A illustrates a system 2200 that is enabled to perform enhanced 2D machine vision and is consistent with the various embodiments discussed herein. In at least one embodiment, system 2200 is a sequential-pixel projection system. System 2200 may include 3D machine vision. System 2200 includes a photon transmitter 2210 (or projector) that is aligned with a photon transceiver 2220. Photon transmitter 2210 may include one or more light sources, such as but not limited to RGB laser sources. As with other embodiments of photon transmitters discussed herein, photon transmitter 2210 may include one or more scanning mirrors 2214.

Photon receiver 2200 may include a camera, or camera components such as optical components and a sensor array 2224. As shown in FIG. 22A, photon transmitter 2210 may be aligned with photon receiver 2220 so that both transmitter 2210 and receiver 2220 have at least similar perspectives and/or substantially overlapping fields of view (FOV). For instance, the photon receiver's 2220 field of view (FOV_C) may be substantially similar to the photon transmitter's 2210 field of view (FOV_P). In other embodiments, one of the FOVs may be a subset or a superset of the FOV. In at least one embodiment, photon transmitter 2210 and photon receiver 2220 may be integrated within a single unit 2250.

The photon transmitter 2210 transmits or projects a photon beam to depict one or more scenes or images on a projection surface 2030. The projection surface 2230 reflects or scatters the photon beam. In various embodiments, at least a portion of the pixels in the sensor array included in the photon receiver 2220 may be illuminated by the reflected photon beam. Because the photon receiver 2220 and the photon transmitter 2210 share a substantially similar FOV, image pixel transmitted by the photon transmitter 2210 may be adjusted or tuned for specifically for enhanced detection of the light reflected from a point on the surface 2030 of an object in the scene.

For instance, the light level in each projected (and detected) wavelength within the dynamic range of the sensor may be dynamically tuned specifically for each particular pixel or sub pixel. In addition to light levels, the color, hue, and spectral composition (wavelength and/or the composition of a mix of wavelength) may be tuned. The tuning of illumination levels, color, hue or spectral composition, may be based on various factors. Such factors include but are not limited to at least one of the reflectance of the point on the projection surface that will reflect the image pixel, whether the reflected beam will pass through a selective pass filter prior to detection in the sensor array, and the like. In various embodiments, the sensor pixel may detect the reflected light's unfiltered intensity, across the full reflected spectrum, i.e. unfiltered black and white or a grey scale light intensity measurement to establish contrast. The unfiltered intensity may be recorded and/or stored by system 2200.

Within the sensor array, adjacent rows or colors of pixels may have different spectral and grey scale sensitivities. Accordingly, tuning the projected photon beam may include adjusting the projected beam based on which sensor pixels will be illuminate, or to specifically illuminate rows and columns based on the known spectral and grey scale sensitivities.

The projected photon beam may be generated from a combination or blending of several photon sources. For example, several laser beams may be combined into a multi-primary single beam. The projected beam may include a combination of broad spectral light sources. For instance, the projected beam may be comprised of a blue laser transmitted through a phosphor that converts and broadens the narrow spectrum light. Such a phosphor may generate a broad spectrum white. The projected beam may further be generated from narrow-band sources, such as but not limited to a NIR coherent laser diode (~940 nm).

The photon transmitter 2210 may be pixel sequential projector. Photon transmitter 2210 may illuminate objects within a flying spot or objects that are rapidly flying (scanning) across the entire field of view. In some embodiments, the photon transmitter 2210 may employ a laser line scan that illuminates adjacent rows or columns scanning in a 1D fashion vertically or horizontally respectively.

A sensor array row may be illuminated for a brief period when the reflected photon beam scans across the row. For instance, the reflected spot may sequentially illuminate each of 1000 pixels included in a single sensor row for approximately 10 nsec each. Thus, a single row may be illuminated for approximately 10 microseconds. In faster embodiments, the spot will illuminate each pixel for only about 1 nsec. The photon transmitter may include a flash mode or may illuminate the sensor in a pixel strobe mode. The pixel strobe mode may increase resolution when sufficient instantaneous power is available.

When biological eye-safety is a concern, the instantaneous beam intensity may be limited at the photon transmitter 2210, which results in a reduction of photons received at the sensor. The intensity of the received photon beam may also be limited when a greater sensing range is required or a smaller fraction of the emitted light is expected to return to the sensor. Signal insufficiency may also occur when the object has a dark hue (or a low albedo) or a greater portion of the illumination light is absorbed by the object's surface rather than reflected back towards the sensor.

In other embodiments that include shorter-range tracking or industrial machine vision where biological eye-safety is not a consideration, maximum resolution may be achieved with an intense, narrowly focused beam. Furthermore, rapid pixel-sized pulses may be employed. In still other embodiments, to conserve energy or meet laser eye safety requirements, only a limited (but precisely calibrated) subset of pixels may be simultaneously illuminated. Alternatively, a whole line scan may expose the pixels in an entire row simultaneously for the entire 10-microsecond period.

Figure 22B:
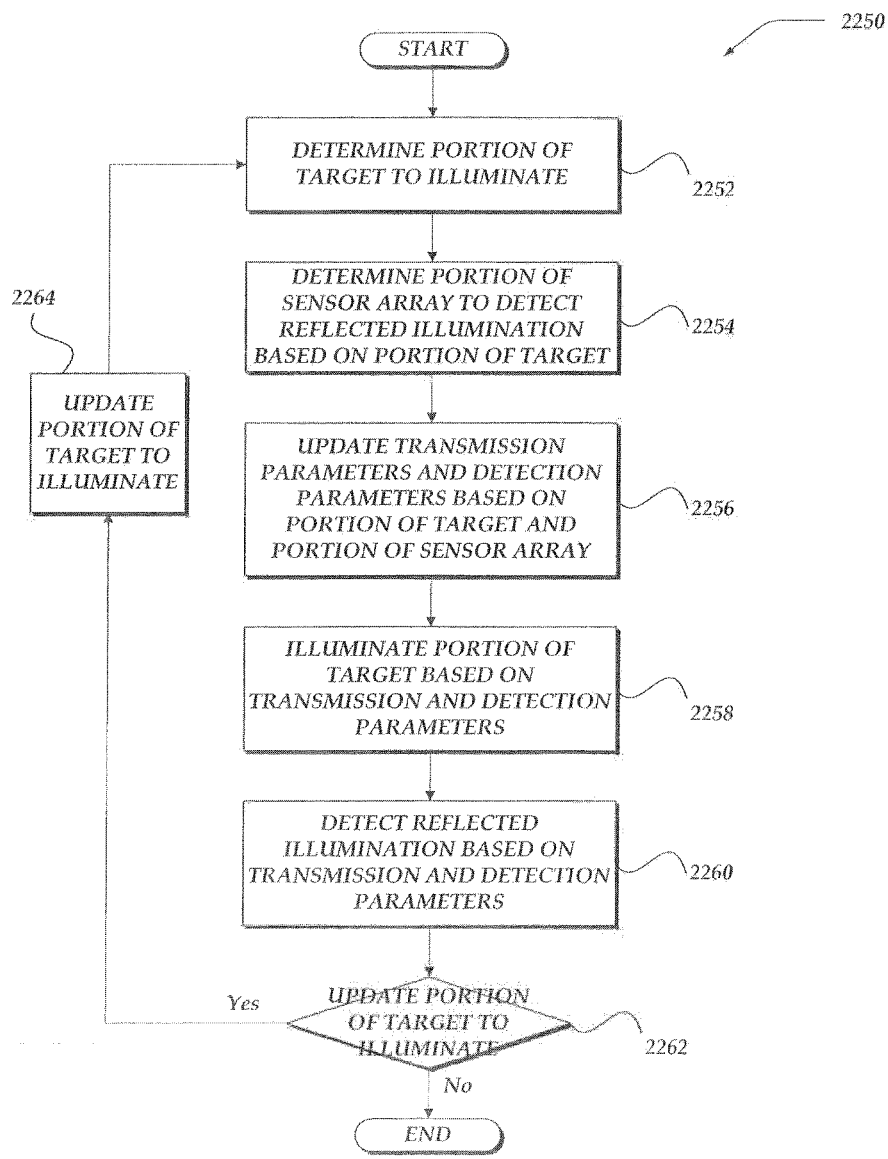
FIG. 22B shows a logical flow diagram generally showing one embodiment of a process for dynamically enhancing pixel illumination for imaging of a target that is consistent with the various embodiments.

FIG. 22B shows a logical flow diagram generally showing one embodiment of a process for dynamically enhancing pixel illumination for imaging of a target that is consistent with the various embodiments. After a start block, process 2250 begins at block 2252, where a portion of a target to illuminated is determined. For instance, at block 2252, the one or more points to be illuminated on a target when projecting one or more image pixels may be determined. The target may be illuminated by one or more scanning beams as discussed herein.

At block 2254, a portion of a sensor array to detect the illumination reflected from the target is determined. For instance, at block 2254, one or more pixels within the sensor array are determined. The one or more pixels may be illuminated by the illumination reflected from the target. Accordingly, the determination of the one or more pixels may be based on the portion of the target to illuminate. Determining the one or more pixels may be based on a correspondence between the field of view (FOV) of the one or more pixels and the one or more points on the target to be illuminated, as discussed herein.

At block 2256, one or more transmission parameters may be updated. Updating the one or more transmission parameters may be based on the portion of the target to be illuminated. In at least one embodiment, one or more transmission parameters may be updated based on the portion of the sensor array to detect the illumination of the target. For instance, the one or more transmission parameters may be updated based on the pixels that will be employed to detect the illumination of the target. As discussed in the context of at least FIG. 22A, one or more transmission parameters may be dynamically adjusted to enhance the imaging of the target at block 2256.

Furthermore, at block 2256, one or more detection parameters may be updated. Updating the one or more detection parameters may be based on the portion of the target to be illuminated. In at least one embodiment, one or more detections parameters may be updated based on the portion of the sensor array to detect the illumination of the target. For instance, the one or more detection parameters may be updated based on the pixels that will be employed to detect the illumination of the target. As discussed in the context of at least FIG. 22A, one or more detections parameters may be dynamically adjusted to enhance the imaging of the target at block 2256.

At block 2258, the portion of the target is illuminated based on the updated transmission parameters. Illuminating the portion of the target may be based on the updated detection parameters. At block 2260, the illumination reflected from the target is detected. Detection of the reflected illumination may be based on the updated transmission parameters. Detection of the reflected illumination may be based on the updated detection parameters. For instance, the one or more pixels determined in block 2254 may be employed to detect the reflected illumination.

At decision block 2262, it is determined whether to update the portion of the target to illuminate. If the portion of the target to illuminate is to be updated, process 2250 flows to block 2264. Otherwise, process 2250 may terminate and/or return a calling process. At block 2264, the portion of the target is updated. For instance, when scanning across a target, as discussed in conjunction of at least FIG. 22A, each projected image pixel and each sensor pixel may be dynamically adjusted, updated, and/or tuned by dynamically updating the one or more transmission parameters and/or detection parameters, as discussed at least in conjunction with FIGS. 22A-22B. The portion of the target to be illuminated may be updated at block 2264 to include the next one or more image pixels to project. In at least one embodiment, the portion of the target to illuminate may be updated to include the next one or more points on the target to illuminate, via as scanning beam as discussed herein.

Figure 23:
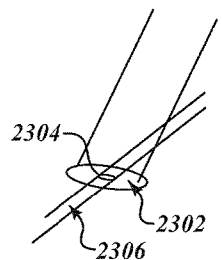
FIG. 23 illustrates an embodiment where the detected beam spot is larger than the sensor pixel and is consistent with the various embodiments discussed herein.

Referring back to system 2200 of FIG. 22A, in embodiments where the photon receiver 2220 includes one or more rolling-shutter sensors, a row (or column) of pixels may be read right after the laser strobe beam has illuminated the corresponding row in the FOV by the epipolar alignment. To decrease the required intensity of the project beam, the spot size of the pixel illumination may be matched to the sensor's resolution (approximately the physical size of a sensor pixel). However, in other embodiments, such matching is not required. For instance, FIG. 23 illustrates an embodiment where the detected beam spot is larger than an individual the sensor pixel. Thus, FIG. 23 depicts a relatively course detected beam spot 2302 and a relatively fine sensor pixel 2304. If only one row 2306 of pixels is active when the beam spot 2302 is coarser than an individual sensor pixel 2304, the reflected light is detectable at the pixel resolution via one or more pixels included in the activated row 2306. In at least one embodiment, a centroid of the triggered pixels in the active row 2306 may be determined to determine at least an approximate centroid of the beam spot 2302.

Figure 24:
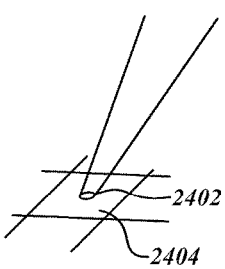
FIG. 24 illustrates an embodiment where the detected beam spot is smaller than the sensor pixel and is consistent with the various embodiments discussed herein.

In contrast to FIG. 23, FIG. 24 illustrates an embodiment where the detected beam spot 2402 is smaller than the sensor pixel 2402. Thus, FIG. 24 depicts a relatively fine detected beam spot 2402 and a relatively course sensor pixel 2404. In such embodiments, where the detected beam spot 2402 is smaller than the sensor pixel 2402, the resolution of the system may be enhanced. For instance, the relative position of the illuminated spot within the field of the pixel (the sensor pixel's FOV) may be accurately determined. For a moving scanning beam spot or scanning laser line, significantly enhanced resolution may can be achieved by tracking the trajectory of the probe beam. For instance, see U.S. Pat. No. 8,430,512, as fully incorporated above.

Figure 25:
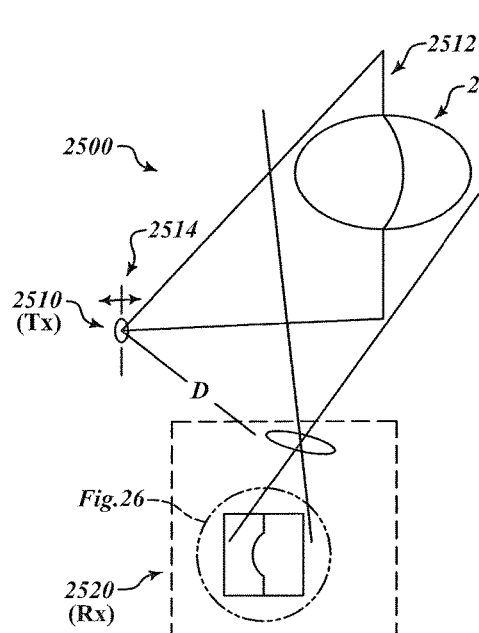
FIG. 25 illustrates a system that is enabled to perform machine vision and employs a vertical scan line.

FIG. 25 illustrates a system 2500 that is enabled to perform machine vision and employs a vertical scan line. As with other embodiments discussed herein, system 2500 includes a photon transmitter 2510 and a photon receiver 2520. The photon transmitter 2510 projects a vertical scan line 2512 on surface 2530. For instance, see system 2050 in conjunction with FIG. 20B. The vertical scan line 2512 may be generated by scanning mirror 2514. The scanning mirror 2514 may be a 100 Hz scanning mirror. The scanning mirror 2514 may include a polygonal rotating facetted mirror, such as those found in copiers, or the like. The vertical scan line source (the one or more photon sources within the photon transmitter 2510) may be offset from a rolling shutter included in camera or sensor array within the photon receiver 2520.

Figure 26:
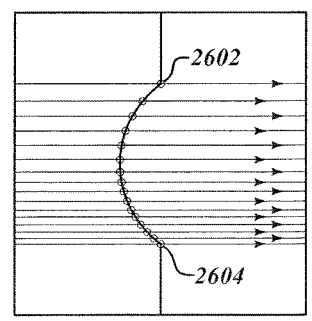
FIG. 26 illustrates the vertical scan line of FIG. 25 being received over multiple rows of the sensor array in the photon receiver of the system of FIG. 25.

Photon receiver 2520 may be configured such that the included sensor array receives or is illuminated by the reflected image of vertical scan line 2512 across multiple sensor rows, as shown in FIG. 26. There may be at least an approximate a one-to-one mapping for each geometric point on surface 2530 and each geometric point in the sensor array. Accordingly, each geometric point on surface 2530 may correspond to one of the sensor pixels in the sensor array. Thus, at any single instance in time, there may be a centroid sensor pixel (or most illuminated sensor pixel) illuminated in any one sensor column. Thus, if after each scan line flash the array is read, a single (the centroid or "winner-takes-all") pixel per column may be read and/or recorded (the centroid sensor pixel). Pixels 2602 and 2604 are examples of two separate centroid pixels In such embodiments, the vertical disparity provides system 2500 of the relative distance of that reflection (range of the target) via various triangulation methods discussed herein. System 2500 may be enabled to scan 100 (or more) lines across the field of view (FOV) with each line exposed for up to 100 microseconds with maximum illumination. In some embodiments (such as those directed towards applications where biological eye-safety is a consideration), 100 lines per frame (100 different elevation or epsilon angle values) may be employed. Such scanning may be iteratively repeated 100 (or more) times a second across the FOV. Target detection and distance estimation may be determined within a millisecond or less.

Figure 27:
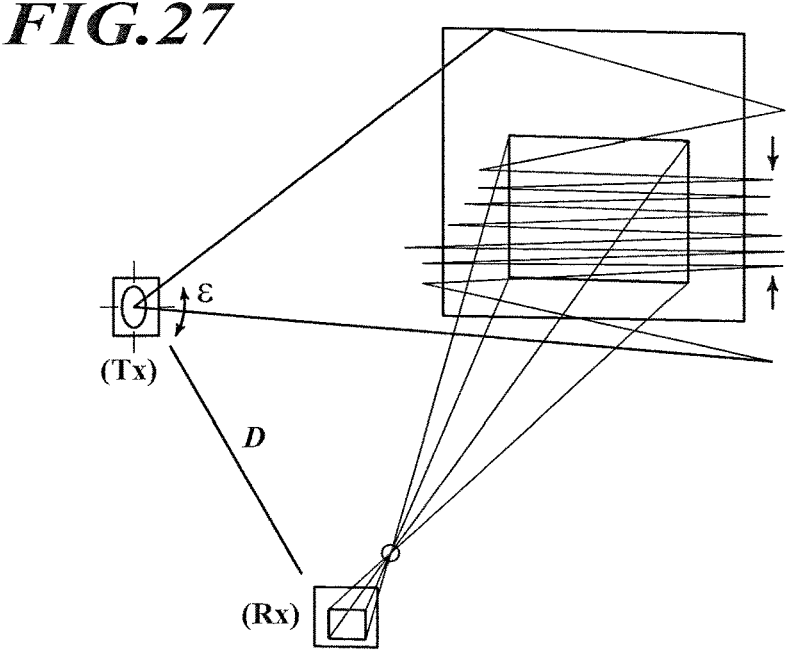
FIG. 27 illustrates an embodiment where the vertical scanning is adjusted such that one a subset of the sensor pixels are illuminated.

Such scanning may be adjusted and/or updated for a certain range of elevations (epsilon angles) to automatically stabilize the system. For instance, such an automatic stabilization may be employed in the high-speed helicopter embodiments discussed in the context of at least FIG. 20A. For instance, FIG. 27 illustrates an embodiment where the scanning beam exposes a wide range of elevations angles. However, the epsilon range is adjusted and/or updated such that only a subset of the sensor pixels are illuminated.

3D Edge Detection via Machine Vision

Figure 28A:
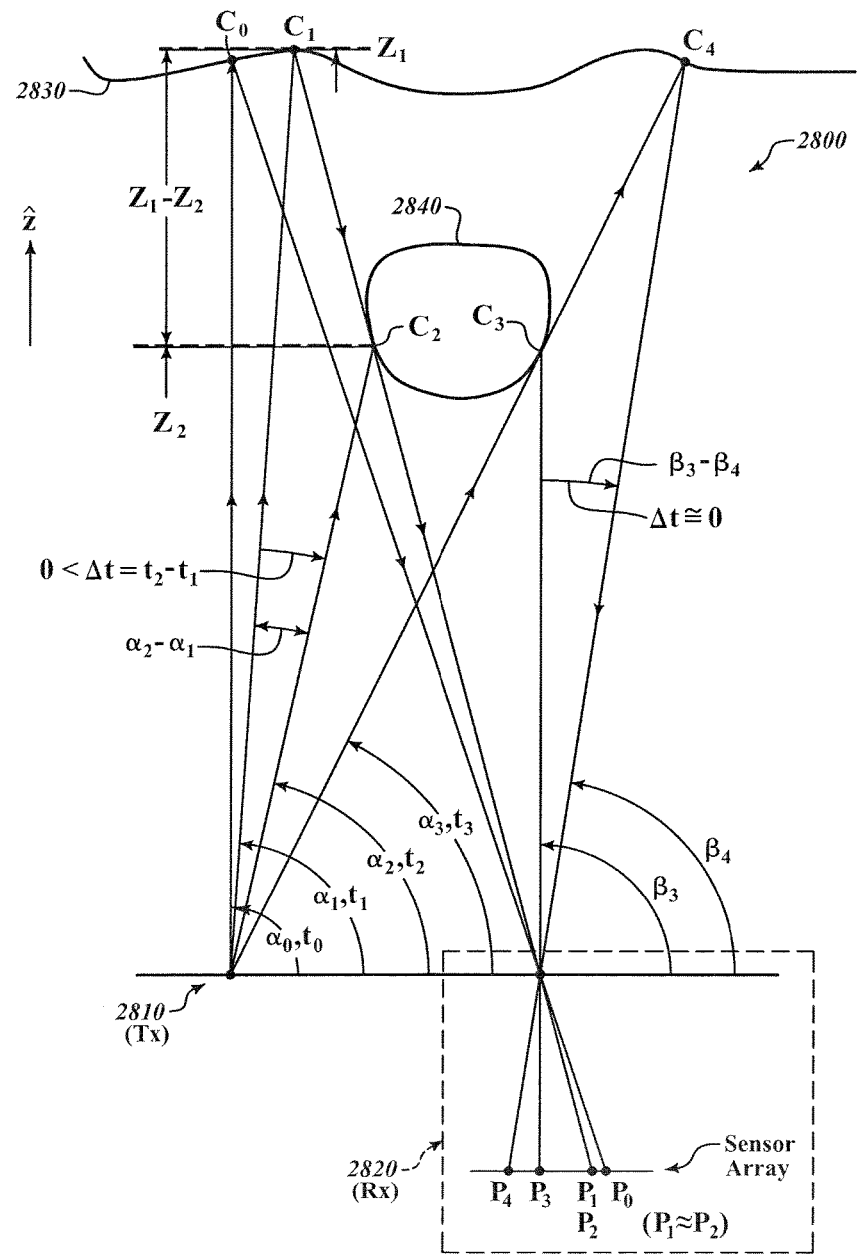
FIG. 28A illustrates a real-time 3D triangulation system that is enabled to provide a Z-indentation marker for each scan.

FIG. 28A illustrates a real-time 3D triangulation system 2800 that is enabled to provide a Z-indentation marker for each scan. System 2800 includes a photon transmitter 2810 and photon receiver 2820. Photon transmitter 2810 includes one or more photon sources. Photon receiver 2820 includes one or more sensor arrays. System 2800 includes a background surface 2830 of a background object, as well as a foreground surface 2840 of a foreground object.

As shown in FIG. 28A, photon transmitter transmits a continuously scanning photon beam. The scanning photon beam may be a sharply focused laser beam that sweeps across the system's field of view. As discussed below, at various points in time, the scanning beam illuminates various points on background surface 2830. At other points in time, the scanning beam illuminates various points on foreground surface 2840. The photon beam may begin scanning at t=t0.

As shown in FIG. 28A, at t0, the beam is rotated (about the scanning axis) to a scanning outgoing angle $\alpha 0$. The beam's spot reaches background point C0 (on background surface 2830). The sensor array included in photon receiver 2820 detects the reflected beam at sensor pixel P0. Thus a one to one mapping between background point C0 and sensor pixel P0 is established. At t1, the scanning beam has rotated to outgoing angle $\alpha 1$. As shown in FIG. 28A, when rotated to angle $\alpha 1$, the outgoing beam illuminates background point C1 on the background surface 2830. The sensor array included in photon receiver 2820 detects the reflected beam at sensor pixel P1. A one to one mapping between background point C1 and sensor pixel P1 is established.

From the perspective of the photon receiver 2820 background point C1 is the last point of the background surface 2830 that can be seen (at least at t=t1 because foreground object 2840 may be in motion relative to at least one of photon transmitter 2810 or photon receiver 2820) as the foreground object 2840 begins to occlude the reflected beam. Accordingly, background point C1 is the last background point detected on the background surface 2830 before the scanning beam vanishes, i.e. before the foreground object 2840 occludes the reflected beam.

At t=t2>t1, the rotating photon beam has rotated to scanning angle α2. At scanning angle α2, the scanning beam has reached foreground point C2 (the point illuminated on foreground object 2840). Note that from photon receiver's 2820 perspective, the reflected beam vanishes between t=t1 and t=t2 (neglecting the beam's TOF). Photon receiver 2820 begins to detect the reflected beam. The sensor array included in photon receiver 2820 detects the reflected beam at sensor pixel P2. A one to one mapping between foreground point C2 and sensor pixel P2 is established. Note that P1 and P2 are at approximately the same location (row and column) within sensor array. Thus, the reflected beam "resurfaces" at approximately the same pixel (column) position where the beam vanished due to occlusion by the foreground object 2840. This time lapse signifies a jump to the foreground, indicating a z-indentation (or jump in the z-direction from the background object 2830 to the foreground object 2840.

Various embodiments of fast asynchronous detectors are described in U.S. Pat. No. 8,696,141 (which was incorporated by reference above). Photon receiver 2820 may include one or more embodiments of a fast asynchronous detector. As described in U.S. Pat. No. 8,696,141, events occurring in the sensor at the same or approximately the same pixel location are observable as distinct events.

As shown in FIG. 28A, the z-component of background points is approximately Z1, while the z-component of foreground point C2 is approximately Z2. The difference in the z-components (or z-disparity or z-differential ~Z2−Z1) may be determined via triangulation methods, TOF methods, or a combination thereof, as described in U.S. patent application Ser. No. 14/823,668 (incorporated above). The z-disparity or z-differential may be determined from the duration of occlusion (t2−t1). This interval is proportional to the time it took to rotate the probe beam from α1 to α2. For a known rotational scanning speed (or angular frequency ω), the z-disparity is determined based on the time interval (t2−t1) and angular frequency ω. Note that even if the rotational speed varies during the oscillation of the scanning mirror, as would be the case in a fast axis harmonic resonance MEMS scanner, which has a known non-constant angular scan velocity, the z-disparity may still be determined with precision.

At the other edge of the foreground object 2840, the scanning photon beam, now pointing at scanning angle α3, reaches foreground point C3 at approximately t=t3. The sensor array included in photon receiver 2820 detects the reflected beam at sensor pixel P3. A one to one mapping between foreground point C3 and sensor pixel P3 is established. The reflected beam is received by P3 at an incoming angle of ß3. As the photon beam continues to scan, the photon beam falls off the foreground object 2840 and hits the background object 2830 at background point C4.

However, the photon beam light illuminating background point C4 reflects at a completely different angle ß4, back towards the sensor included in photon receiver 2820. Accordingly, as shown in FIG. 28A, the reflected beam is received at sensor pixel P4, which is at a different location within the sensor array as to the location of P3. Even though the two events (detection at P3 and P4) occur nearly simultaneously, (within nanoseconds), each is observable as a distinct event in the fast asynchronous detectors. The instantaneous jump in active pixel position observed in the sensor at time t3 corresponding to a incoming angle shift from ß3 to ß4, is proportional to the magnitude of the fall back in Z or range (the magnitude of the "drop off the edge"). This instantaneous pixel shift, from "dropping back" from foreground point C3 to background point C4 provides a nanosecond precise "end of foreground object scan" signal and, optionally, may trigger the end of object illumination.

Accordingly, as described herein, system 2800 may be an ultra-fast scan line level, object position and segmentation system. Portions of a scan line may be associated with separate objects (for example background object 2830 and foreground object 2840). The separate object may be illuminated selectively, with illumination that may be changed or adjusted instantly for each object. Note that for active illumination (for instance in car headlights), aside from aiding is computer vision for navigational safety, may additionally enable assisting in "flash" color coding objects to be highlighted in the driver's or pilot's view. For instance, hazards in the flight path may be illuminated with particularly conspicuous colors.

Figure 28B:
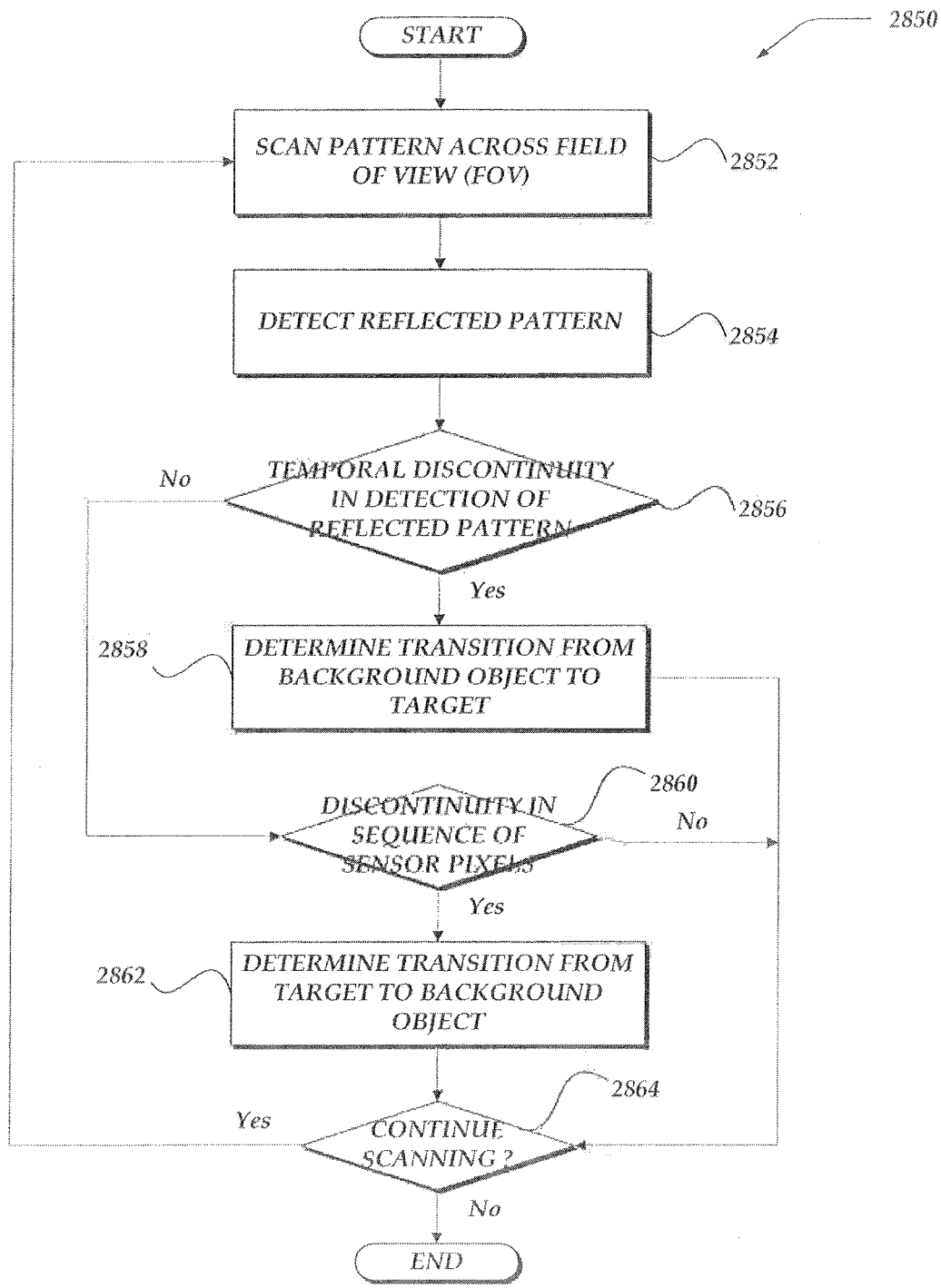
FIG. 28B shows a logical flow diagram generally showing one embodiment of a process for detecting one or more edges of a target that is consistent with the various embodiments.

FIG. 28B shows a logical flow diagram generally showing one embodiment of a process for detecting one or more edges of a target that is consistent with the various embodiments. Process 2850 may be enabled by at least system 2800 of FIG. 28A. For instance, that target may include foreground object 2840 of FIG. 28A. Furthermore, the background object discussed in conjunction of process 2850 may include background surface 2830 of FIG. 28A. Accordingly, process 2850 may be employed to detect one or more edges of foreground object 2840, as discussed in conjunction with system 2800 of FIG. 28A.

Process 2850 may begin, after a start block, at block 2852 where one or more light patterns are scanned across a field of view (FOV). For instance, the light patterns may be scanned across at least a portion of the FOV of system 2800 of FIG. 2800. The light patterns may be scanned across a background object within the FOV, such as but not limited background surface 2830 of FIG. 28A. In some embodiments, the light patterns may be scanned across a target of interest, such as but not limited to foreground object 2840 of system 2800. The one or more light patterns may be transmitted by one or more photon transmitters, such as but not limited to photon transmitter 2810 of system 2800.

At block 2854, the one or more light patterns are detected. The one or more detected light patterns may be detected from the background object. In some embodiments, the detected light patterns may be reflected from the target. The reflected light patterns may be detected via one or more photon receivers as discussed herein, including but not limited to photon receiver 2820 of system 2800.

At decision block 2856, it is determined whether a temporal discontinuity is detected in the detection of the reflected light pattern. For instance, in conjunction with FIG. 28A, a temporal discontinuity is observed in the detection of the reflected light pattern while the scanning pattern is scanned between point C1 on background surface 2830 and point C2 on foreground object 2840. Note that the temporal discontinuity occurs between the illumination or triggering of sensor pixels P1 and P2 of the sensor array included in the photon receiver 2810. Further note that a sequence is the triggered sensor pixels is at least approximately continuous. Although a temporal discontinuity is detected between the triggering of sensor pixels P1 and P2, sensor pixels P1 and P2 are located in substantially similar locations. If such a temporal discontinuity is observed, then process 2850 flows to block 2858.

A temporal threshold may be employed to determine the detection of a temporal discontinuity. For instance, a temporal threshold may include a maximum length of time between the triggering of successive sensor pixels. The temporal threshold may be based on a scanning frequency of the scanning pattern. The temporal threshold may be based on a distance along the z-axis between the background object and the target. Otherwise, process 2850 flows to decision block 2860.

At block 2858, a transition of the scanning light pattern from the background object to the target is determined. Such a transition may be employed to detect an edge of the target. For instance, as discussed in conjunction with FIG. 28A, a transition from the background object to the target may indicate an edge of foreground object 2840 that includes point C2. Process 2850 flows to decision block 2864.

At decision block 2860, it is determined whether a discontinuity of the sequence of illuminated or triggered sensor pixels is detected or observed. For instance, in conjunction with FIG. 28A, a discontinuity in the sequence of triggered or detected sensor pixels is observed in the detection of the reflected light pattern while the scanning pattern is scanned between point C3 on the foreground object 2840 and point C4 on background surface 2830. Note that the discontinuity in the sequence of triggered pixels occurs between the illumination or triggering of sensor pixels P3 and P4 of the sensor array included in the photon receiver 2810. Further note that a temporal discontinuity is not observed (or is at least small or is at least smaller than a temporal threshold) between the triggering of sensor pixels P3 and P4, as discussed in conjunction with FIG. 28A.

A sequence threshold may be employed to determine the detection of a discontinuity in the sequence of triggered sensor pixels. For instance, a sequence threshold may include a maximum spatial distance between successive triggered pixels. The sequence threshold may be based on a distance along the z-axis between the background object and the target. If such a discontinuity in the sequence of triggered sensor pixels is observed, then process 2850 flows to block 2862. Otherwise, process 2850 flows to decision block 2864.

At block 2862, a transition of the scanning light pattern from the target to the background object is determined. Such a transition may be employed to detect an edge of the target. For instance, as discussed in conjunction with FIG. 28A, a transition from the target to the background object may indicate an edge of foreground object 2840 that includes point C3. Process 2850 flows to decision block 2864.

At decision block 2864, it is determined whether to continue scanning across the FOV. If so, process 2850 returns to block 2852. Otherwise, process 2850 may terminate and/or return a calling process.

For embodiments directed towards machine vision applications, the ability to recognize and pick out a significant foreground object (such as but not limited to foreground object 2840) in real-time and the ability to crop that object precisely at the edges is of great utility for various reasons, including at least:

1) The machine vision system computational resources, such as but not limited to one or more processors, logic devices, or the like may be limited resources. However, these resources may begin instantly analyzing the selected object (for instance foreground object 2840). The resources may determine with significant certainty, the pixels that belong to the selected object in view, and discard other pixels, or pixels belonging to other adjacent and partially overlapping occluded objects.

2) When several objects occur in a moving scene, such a system may (in real-time or near real-time) sort the pixels of interest, assigning (by classifying/associating) each pixel to the right object.

3) For relatively fast segmentation of image data as discussed herein, no pixel matrix analysis (nor) may be required. Furthermore, the segmentation of image data via the various embodiments may not require the employment of multi-pixel tiles, sub frame or frame elements, color, grey scale or image contrast analysis. In contrast, employing the instantaneous (or neat instantaneous) z-tracking of target surfaces as discussed herein, the pixels, voxels and other information associated with small 3D surface image elements may be near-instantly (and uniquely) associated with objects. Such segmentation may occur prior to any further image processing, and object classification technologies (such as de-blur, perspective transforms, color contrast enhancements, shading corrections, object motion vectors, vector estimation, scale-invariant feature transform (SIFT), or gradient analysis).

4) Such fast object segmentation saves time and a potentially great amount of redundant pixel analysis, which is inherently required in a traditional frame based 2 D or 3D (RGBD) systems.

5) As discussed above, a narrow band (monochrome) may be used for the probe or tracer beam. Such a tracer beam may be non-visible, such as a NIR beam. Such a tracer beam may accurately detect both the objects' edges and the surface contours (ridges) of the objects in view in 3D. Active (visible) light sources (such as but not limited to RGB laser scans or selective spot RGBW illuminator) may be employed and triggered to illuminate only the objects or features of interest. Furthermore, this triggering of the visible beam may be fast enough (within nanoseconds if a scan is near field) to illuminate the correct pixels with a precise required light intensity). The trigger response may be fast with hard-wired direct transistor based fast logic circuit rather than software based response. For instance, an ASIC or FPGA may be employed in such embodiments.

6) As discussed herein, the various embodiments are enabled to prevent both under and over illumination of the targets of interest. For instance, adjusting for distance (reflected illumination falls of by the $r^{(-2)}$ law where r is the distance of the object from the aperture of the sensor and r≈the z-component of the target. A minimum but sufficient intensity of photons in the sensor may be assured by adjusting the intensity of three photon transmitter. This adjustment may be performed in real-time during a scan via pixel per pixel feedback loop between the scanning photon source and the photon sensor array, creating a very fast auto exposure mechanism.

7) For at least these reasons, the required optical energy and thus the required system power may be decreased.

8) In embodiments where at least the photon transmitter and/or the photon receiver is included in a fast moving object, such as but not limited to a helicopter, an active z-axis triggered object-cropped illumination may be efficient and fast in recognizing an "incoming" high-speed object. For instance, the determination of a "friend" or "foe".

9) Various embodiments of systems may be designed to detect (via non-visible patterns) and not illuminate (with visible patterns) any objects closer than a certain range (e.g. protecting eyes that are too close, fast auto shut-off) enabling a critical additional laser eye safety feature. Ensuring system safety and allowing for stronger peak probe light for farther object detection).

10) Various embodiments may decrease any blinding affects associated with projection systems. For instance, when employing one or more non-visible NIR trigger or tracer beams, only objects in sufficiently close range are illuminated with scanning visible (RGB) light sources. The visible light sources may optionally included embedded coded or patterned light structures. Such auto dimming systems would prevent or reduce unwanted detection, blinding and/or interference in crowded airspaces or night driving situations.

Furthermore, foreground object edges may be detected instantaneously. The full object may be spot-illuminated by the same scanning beam. In at least some embodiments, by triggering instantaneous illumination with precisely measured doses of light, such a "3D cropped" spot illuminated object may be observed without blur, and in high resolution. An additional RGB camera may be added to the system to record the intensity of each primary color, creating a high resolution color sub image with each scanned line segment accurately cropped and annotated in 3D and assigned to the object it belongs to (high speed object specific Color Voxel detection).

Multi-View 3D Foveation, Image Stitching, and Synthesis by Active Illumination

Figure 29:
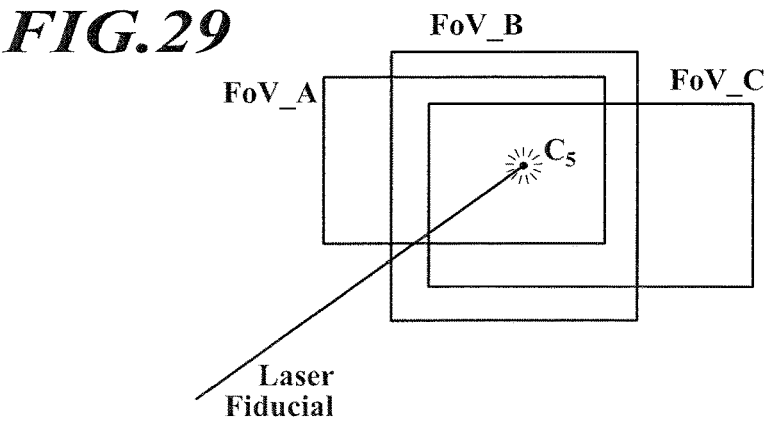
FIG. 29 illustrates multiple views generated by the embodiments of the various systems, wherein each view includes at least one pixel in common with the other views.

In multi-view systems, the moving beacon spot may be used to stitch multiple views by establishing instantaneous pixel correspondence across all the views (in the multi-view) that include the pixel being illuminated. For instance, FIG. 29 illustrates multiple views generated by the embodiments of the various systems, wherein each view includes at least one pixel in common with the other views. FIG. 29 shows three views that share a common illumination spot (or image pixel) at C5. Each of the three views has a separate FOV. The various embodiments enable establishing an instant pixel correspondence between the views and stitching the FOVs at various z-component depths or ranges.

Furthermore, ultra-fast autofocus or computational hyper-resolution filtering or image enhancement methods may be employed by using the instantaneous z-component value information for each scanned pixel.

Figure 30:
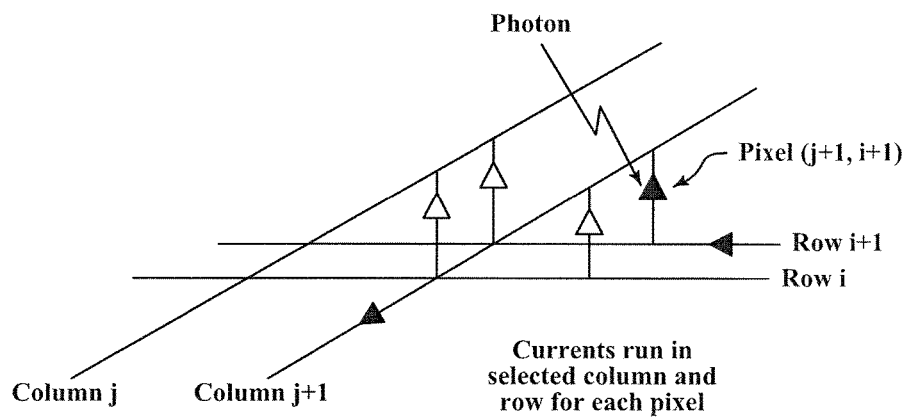
FIG. 30 illustrates a sensor array included in the various embodiments of photon receivers discussed herein.

FIG. 30 illustrates a sensor array 3000 included in the various embodiments of photon receivers discussed herein. Sensor array 3000 may be employed in a camera architecture that is used for fast asynchronous triangulation. Sensor array 3000 may asynchronously detect reflected beam spots. Sensor array 3000 includes an array or matrix of photodiodes. Each of the photodiodes is a sensor pixel. Each photodiode is connected to exactly one row sense line and one column sense line.

In addition to a photodiode, each sensor pixel in sensor array 3000 may include one or more gates (not shown). The gate may be implemented via a transistor. The gates control the connections between the sensing photodiode and the row/sense lines. The gates are controlled via separate control lines that enable and disable specific sensor rows and or columns.

In the various embodiments of sequential-pixel illumination discussed herein, only one position in sensor array 3000 (or any other sensor array discussed herein) is illuminated at any one time. Accordingly, only a single column and only a single row sense line will be active at any one time in sensor array 3000. The particular photodiode illuminated at that point in time will drive a current from row i+1 to column j+1. Accordingly, sensor array 3000 is enabled to detect which pixel is being illuminated. Optionally, a thresholding circuit included in sensor array 3000 in the sense line logic prevents background or dark current from triggering when no illumination above threshold occurs (clamping or thresholding the sense lines). The photodiodes used in sensor array 3000 may be a single avalanche photodiode (SPAD).

In at least one embodiment, a 4 transistor pinned photo diode CMOS pixel (low cost so-called "rolling shutter" mobile cameras have these type of small 1 to 1.5 micron pixels in 5 to 10 MP arrays) is employed. Each pixel (or SPAD) may serve a same column detection circuit. Rows may be selected, actively shuttered in analogous to standard CMOS camera pixels. A fast binary thresholded detection of a flying spot, and since the direction substantially orthogonal to the fast axis scan direction is known from the feedback in the scanners slow angle. In some embodiments, to determine the elevation angle ($\epsilon$), we only need to determine which sensor pixel is illuminated i.e. only a instantaneous (optionally asynchronous) column detection is needed.

Figure 31:
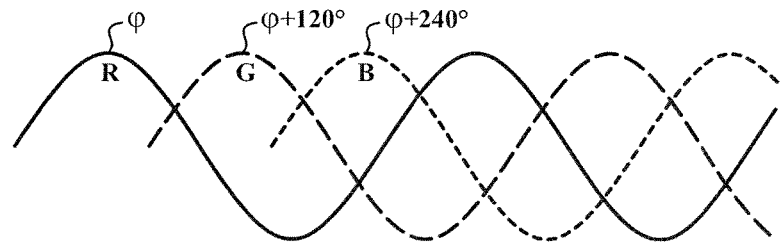
FIG. 31 illustrates modulating an RGB signal so that a photon receiver may determine the phase angles.

FIG. 31 illustrates modulating an RGB signal so that a photon receiver may determine the phase angles. More specifically, in FIG. 31, 3 visible light beams are sinusoidally modulated. One beam includes red photons (R), another beam includes green (G) photons, and the other beam includes blue (B) photons. The phase of each of the beams is offset by 120 degrees (2/3*Pi rads) from each of the other beams A photon receiver, such as the various embodiments of photon receivers discussed herein (such as but not limited to an RGB camera with a rolling shutter) may detect the modulations of each of the beams. Furthermore, the phase offset for each of the beams may be determined upon detecting the modulations. As discussed throughout, sequential-pixel projection systems do not introduce blur in the projected image due to relative motion between the photon transmitter, the target, or the photon receiver. Thus, all 3D voxel positions may be determined in real-time (or near real-time) from a single pixel detection.

Generating such modulation in multiple beams enables embedded coded information in the transmitted or projected beams. For instance, DeBruijn coded patterns may be embedded in the projected beams. In various embodiments, coded information is only embedded in the projected beams during selected scenarios. For instance, coded information is only embedded in the projected beams when the reflection of the beams from the target is going to be detected. Un-coded low energy continuous (or alternatively very low duty cycle rapid pinpricks) are projected to scan for the presence of significant objects within the range of the sequential-pixel projection system when operating in a 3D detection mode. These uncoded beams may be non-visible (NIR) and/or pulsed. When (and only when) reflections (from targets of interest) start being detected, then the modulation or coding sequences are triggered. For instance, the coding mechanisms discussed in the contact of at least FIGS. 16A-17B and FIG. 31 may be implemented. The benefit of employing "wait and see" coding methods, ad described herein, is that wasted energy is decreased, other parties may not be blinded by or at least detect the uncoded beams, less interference with other systems, and a decrease in code space or required code density.

Embedding codes within and/or modulating the projected beams may be dynamically updated or adjusted based on the desired range of the system, the detected target distance, and/or the temporal, spatial or color resolution of the system. For instance, one or more codes may be generated more frequently, or the beams may be modulated at a higher frequency when the target or object of interest is near and there is no light budget constraint (nor peak elimination restrictions for biological eye safety, or the target has no "eyes" to detect the projected beams).

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for determining motion of a target, comprising:
   one or more transmitters for transmitting one or more light beams at the target;
   one or more receivers for receiving reflection of the one or more light beams from the target;
   one or more memory devices for storing instructions; and
   one or more processor devices that execute the instructions that enable actions, including:
      employing the one or more transmitters to scan a pattern by the one or more light beams onto the target;
      employing the one or more receivers to generate one or more signals based on detection of reflection of the scanned pattern from the target;
      wherein employing the one or more receivers, further comprises employing a temporal discontinuity in the detection of the reflection of the scanned pattern or a discontinuity in the detection of the reflection of the scanned pattern by a sequence of sensors for the one or more receivers to identify a transition scanning the pattern from the target to one or more background objects; and
      providing one or more characteristics of the motion between the target and the one or more receivers based on the one or more signals.

2. The system of claim 1, further comprising employing the reflection of the scanned pattern from the target to detect a size of the target.

3. The system of claim 1, further comprising employing the one or more signals to detect one or more of a spatial elongation or a spatial contraction of the reflection of the scanned pattern to determine one or more of a texture of the target or motion characteristics.

4. The system of claim 1, wherein employing the one or more receivers to generate the one or more signals, further comprises employing different sensor arrays to detect two or more different orientations of the reflection of the scanned pattern to determine one or more motion characteristics.

5. The system of claim 1, further comprising:
   employing a first receiver to detect a first contrast for one or more portions of the target in a first field of view of the reflection of the scanned pattern from the target;
   employing a second receiver to detect a second contrast for the one or more portions of the target in a second field of view of the reflection of the scanned pattern from the target, wherein the first receiver and the second receiver are physically located at separate locations; and
   when the first contrast and the second contrast are unequal, employing the one or more transmitters to provide additional scanning of the pattern by the one or more light beams onto the one or more portions of the target to equalize the first contrast and the second contrast.

6. The system of claim 1, wherein the scanning of the pattern by the one or more light beams onto the target further comprises one or more of rotating the pattern, periodically pulsing the pattern, continuously scanning the pattern, or random pulsing the pattern.

7. A method for determining motion of a target, comprising:
   employing detection of one or more reflected light beams from the target, by one or more receivers, to use one or more transmitters to scan a pattern by one or more light beams onto the target;
   employing the one or more receivers to generate one or more signals based on detection of reflection of the scanned pattern from the target;
   wherein employing the one or more receivers, further comprises employing a temporal discontinuity in the detection of the reflection of the scanned pattern or a discontinuity in the detection of the reflection of the scanned pattern by a sequence of sensors for the one or more receivers to identify a transition scanning the pattern from the target to one or more background objects; and
   providing one or more characteristics of the motion between the target and the one or more receivers based on the one or more signals.

8. The method of claim 7, further comprising employing the reflection of the scanned pattern from the target to detect a size of the target.

9. The method of claim 7, further comprising employing the one or more signals to detect one or more of a spatial elongation or a spatial contraction of the reflection of the scanned pattern to determine one or more of a texture of the target or motion characteristics.

10. The method of claim 7, wherein employing the one or more receivers to generate the one or more signals, further comprises employing different sensor arrays to detect two or more different orientations of the reflection of the scanned pattern to determine one or more motion characteristics.

11. The method of claim 7, further comprising:
employing a first receiver to detect a first contrast for one or more portions of the target in a first field of view of the reflection of the scanned pattern from the target;
employing a second receiver to detect a second contrast for the one or more portions of the target in a second field of view of the reflection of the scanned pattern from the target, wherein the first receiver and the second receiver are physically located at separate locations; and
when the first contrast and the second contrast are unequal, employing the one or more transmitters to provide additional scanning of the pattern by the one or more light beams onto the one or more portions of the target to equalize the first contrast and the second contrast.

12. The method of claim 7, wherein the scanning of the pattern by the one or more light beams onto the target further comprises one or more of rotating the pattern, periodically pulsing the pattern, continuously scanning the pattern, or random pulsing the pattern.

13. A processor readable non-transitory storage media that includes instructions for determining motion of a target, wherein the execution of the instructions by one or more processors enable actions, comprising:
employing detection of one or more reflected light beams from the target, by one or more receivers, to use one or more transmitters to scan a pattern by one or more light beams onto the target;
employing the one or more receivers to generate one or more signals based on detection of reflection of the scanned pattern from the target;
wherein employing the one or more receivers, further comprises employing a temporal discontinuity in the detection of the reflection of the scanned pattern or a discontinuity in the detection of the reflection of the scanned pattern by a sequence of sensors for the one or more receivers to identify a transition scanning the pattern from the target to one or more background objects; and
providing one or more characteristics of the motion between the target and the one or more receivers based on the one or more signals.

14. The media of claim 13, further comprising employing the one or more signals to detect one or more of a spatial elongation or a spatial contraction of the reflection of the scanned pattern to determine one or more of a texture of the target or motion characteristics.

15. The media of claim 13, wherein employing the one or more receivers to generate the one or more signals, further comprises employing different sensor arrays to detect two or more different orientations of the reflection of the scanned pattern to determine one or more motion characteristics.

16. The media of claim 13, further comprising:
employing a first receiver to detect a first contrast for one or more portions of the target in a first field of view of the reflection of the scanned pattern from the target;
employing a second receiver to detect a second contrast for the one or more portions of the target in a second field of view of the reflection of the scanned pattern from the target, wherein the first receiver and the second receiver are physically located at separate locations; and
when the first contrast and the second contrast are unequal, employing the one or more transmitters to provide additional scanning of the pattern by the one or more light beams onto the one or more portions of the target to equalize the first contrast and the second contrast.

17. The media of claim 13, wherein the scanning of the pattern by the one or more light beams onto the target further comprises one or more of rotating the pattern, periodically pulsing the pattern, continuously scanning the pattern, or random pulsing the pattern.

* * * * *